United States Patent [19]
Nomura et al.

[11] Patent Number: 5,311,421
[45] Date of Patent: May 10, 1994

[54] PROCESS CONTROL METHOD AND SYSTEM FOR PERFORMING CONTROL OF A CONTROLLED SYSTEM BY USE OF A NEURAL NETWORK

[75] Inventors: Masahide Nomura; Tadayoshi Saito, both of Hitachi; Hiroshi Matsumoto, Ibaraka; Makoto Shimoda, Katsuta; Masakazu Kondoh, Hitachi; Hisanori Miyagaki, Ohta; Akira Sugano, Katsuta; Nobuyuki Yokokawa, Mito, all of Japan

[73] Assignee: Hitachi, Ltd., Tokyo, Japan

[21] Appl. No.: 625,096

[22] Filed: Dec. 10, 1990

[30] Foreign Application Priority Data

Dec. 8, 1989 [JP] Japan .................. 1-317496
Feb. 9, 1990 [JP] Japan .................. 2-30938
Feb. 13, 1990 [JP] Japan .................. 2-29606

[51] Int. Cl.$^5$ .................. G06F 15/18; G05B 13/02
[52] U.S. Cl. .................. 364/157; 395/906
[58] Field of Search .................. 364/162, 157, 148, 149, 364/150, 151, 158, 159, 160-164; 395/22, 23, 24, 21, 81, 94, 903, 904, 905, 906

[56] References Cited

U.S. PATENT DOCUMENTS

| | | | |
|---|---|---|---|
| 4,884,216 | 11/1989 | Kuperstein | 395/94 |
| 4,990,838 | 2/1991 | Kawato et al. | 395/11 |
| 5,041,976 | 8/1991 | Marko et al. | 364/424.03 |
| 5,063,492 | 11/1991 | Yoda et al. | 364/167.01 |
| 5,093,792 | 3/1992 | Taki et al. | 364/431.01 |
| 5,111,531 | 5/1992 | Grayson et al. | 395/23 |
| 5,119,468 | 6/1992 | Owens | 364/151 |
| 5,177,625 | 1/1993 | Nakashima | 358/468 |
| 5,224,203 | 6/1993 | Skeirik | 395/22 |

OTHER PUBLICATIONS

Fu-Chuang Chen, "Back-Propagation Neural Networks for Nonlinear Self-Tuning Adaptive Control", pp. 44-48, 1990.
Allon Guez et al., "Neural Network Architecture for Control" pp. 22-24, 1988.
Demetri Psaltis et al., "A Multilayered Neural Network Controller", pp. 17-20, Apr. 1988.
"A Practical Reference Model for Control System Design" by T. Kitamori, et al.
"An Automatic Control Basic Theory (Revised Edition)" date unknown.
A Method of Control System Design Based Upon Partical Knowledge About Controlled Processes, by T. Kitamori, et al. date unknown.
Theory & Practice of Adaptive Control Systems, "Tekio Seigyo System No Riron to Jissai", by I. D. Landau, et al. date unknown.
IEEE, "Steam Temperature Prediction Control for Thermal Power Plant", by Y. Sato, et al., IEEE/PES 1984 Winter Meeting, Dallas, Tex., Jan. 29 to Feb. 3 1984.
IEEE Transactions on Energy Conversion, "Adaptive Optimal Control of Steam Temperatures for Thermal Power plants", by M. Nomura, IEEE/ASME 1988 Joint Power Generation Conference, Philadelphia, Pa., Sep. 25 to Sep. 29, 1988.

Primary Examiner—Jerry Smith
Assistant Examiner—Jim Trammell
Attorney, Agent, or Firm—Antonelli, Terry, Stout & Kraus

[57] ABSTRACT

A method for controlling a controlled system by a controller such that a controlled variable can be brought into conformity with a desired value. With respect to at least one of input/output variables for a combined controlling-controlled system, which includes in combination the controller and the controlled system, and input/output variables for the controlled system, information containing its characteristics is taken out from the combined controlling-controlled system. The information with the characteristics contained therein is inputted to a neural network which has been caused beforehand to learn a correlation between the information containing the characteristics and control parameters. From the neural network, one or more of the control parameters, said one or more control parameters corresponding to a corresponding number of inputs to the neural network, are outputted to the controller.

23 Claims, 41 Drawing Sheets

FIG. 15

| NAME OF REFERENCE MODEL | COEFFICIENT | | |
|---|---|---|---|
| | $\alpha_2$ | $\alpha_3$ | $\alpha_4$ |
| KITAMORI | 0.5 | 0.15 | 0.03 |
| BUTTER WORTH | 0.5030 | 0.1479 | 0.02188 |
| ITAE MINIMUM | 0.4664 | 0.1067 | 0.01882 |
| BINOMIAL | 0.3750 | 0.06250 | 0.00306 |
| TRANSFER FUNCTION OF REFERENCE MODEL $Wr(s)$ | $\dfrac{1}{1+\sigma S+\alpha_2 \sigma^2 S^2+\alpha_3 \sigma^3 S^3+\alpha_4 \sigma^4 S^4 +\cdots}$ | | |

OVERSHOOT : $E = \dfrac{e_2}{e_1}$

DAMPING RATIO : $D = \dfrac{e_2 + e_4}{e_1 + e_3}$

SETTLING TIME RATIO : $R = \dfrac{\text{VALUE OF T IN THE PRECEDING MEASUREMENT}}{\text{VALUE OF T IN THE PRESENT MEASUREMENT}}$

NON-LINEAR REGRESSION MODEL

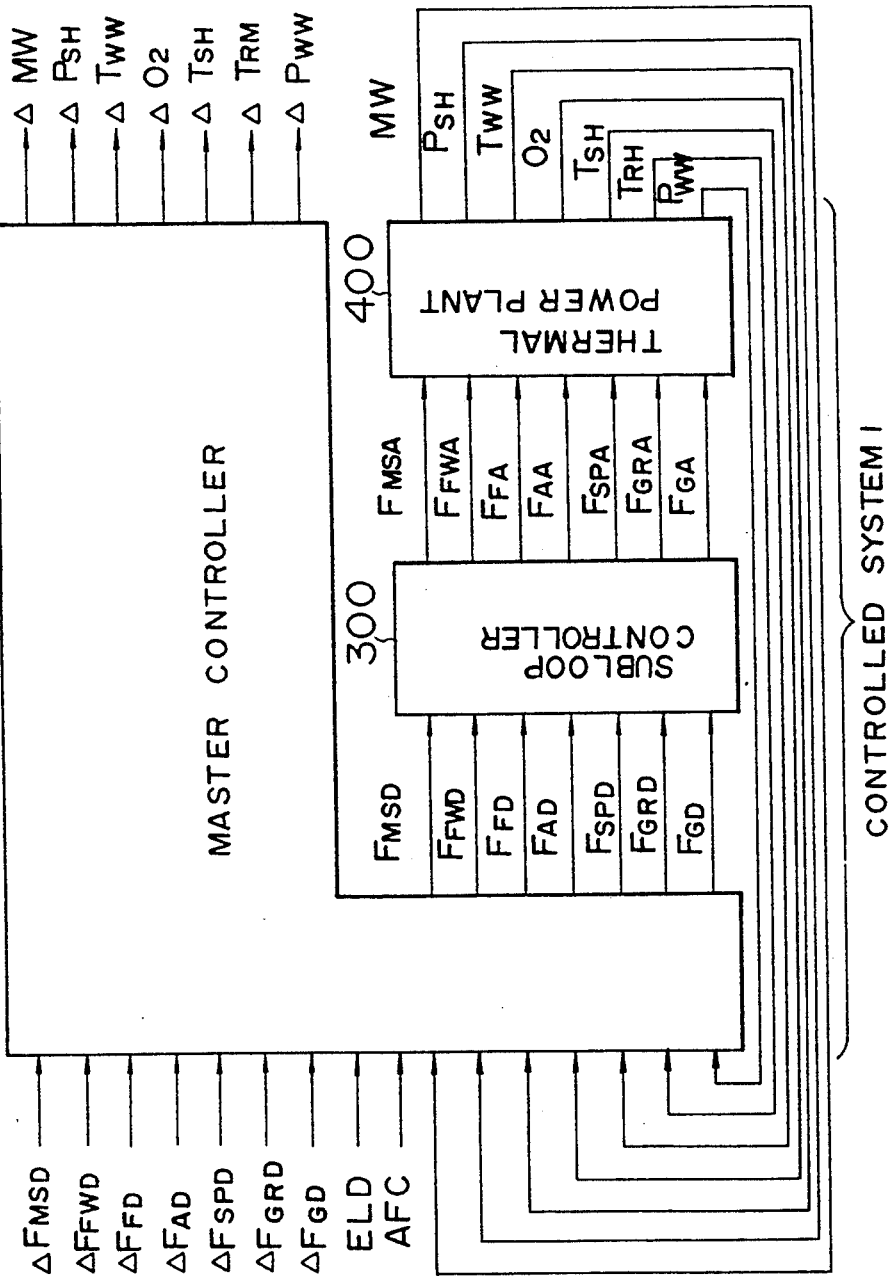

PROCESS CONTROL METHOD AND SYSTEM FOR PERFORMING CONTROL OF A CONTROLLED SYSTEM BY USE OF A NEURAL NETWORK

FIELD OF THE INVENTION

The present invention relates to a method and a system for performing control which is in conformity with characteristics of a controlled system, and particularly to a control method and a control system, said method and system including tuning of a controller which determines one or more manipulated variables conforming with the characteristics of the controlled system.

BACKGROUND OF THE INVENTION

Upon control of a controlled system by a controller, it is necessary to tune one or more control parameters of the controller in the light of the characteristics of the controlled system. As one method therefor, there is the tuning method described in "Fuzzy Suiron o Oyoshita PID Controller yo Autotuning Hoshiki (Autotuning Method for PID Controller, Using Fuzzy Inference)", the Thirteenth Symposium of the Measurement and Automatic Control Society, November 1987. The outline of this conventional tuning method will hereinafter be described.

FIG. 16 is a block diagram showing the construction of an autotuner for realizing the conventional tuning method.

The combined controlling-controlled system shown in FIG. 16 comprises a controlled system 101, a PID controller 102 for sending a manipulated variable to the controlled system, an adder 103 for calculating the difference between a controlled variable y of the controlled system 101 and a desired value r, and an autotuner 104 for performing tuning of a control parameter of the PID controller 102.

The autotuner 104 in turn comprises a characteristic quantity extraction unit 105 for extracting a characteristic quantity with respect to each of the desired value r and the controlled variable y, a tuning rule storage unit 106 for storing, as a qualitative tuning rule, empirical knowledge and know-how of skilled operators on the tuning of the control parameter, and a fuzzy inference unit 107 for determining the control parameter for the thus-extracted characteristic quantity by using fuzzy inference on the basis of the tuning rule.

Such conventional tuning of a parameter by an autotuner is carried out by extracting characteristic quantities such as overshoot E, damping ratio D and oscillation period ratio R, which are shown in FIG. 17, from a response waveform of the controlled variable when the desired value is changed stepwise and then determining a control parameter by fuzzy inference on the basis of these characteristic quantities.

According to fuzzy inference, a tuning rule which is qualitatively expressed, for example, as will be shown next is defined by a fuzzy rule and a control parameter is then determined from characteristic quantities by fuzzy computation while using the fuzzy rule.

If the overshoot E and the damping ratio D are large, proportional gain $K_p$ and derivative time $T_d$ are set smaller.

The control parameter which has been obtained as described above is fed to the PID controller 102, whereby the controller 102 performs control on the basis of the parameter so supplied.

In the above-described conventional autotuner, as an element or requirement for appropriately performing the tuning of the parameter, development of a tuning rule is mentioned. This tuning rule prepares IF-THEN type rules for various variations of a process. Several tens or more of fuzzy rules have heretofore been required, with a further requirement that they should not involve contradiction as a whole. Moreover, a major portion of the preparation of such fuzzy rules has to be performed by man power.

Accordingly, the above-described conventional technique involves the problem that a lot of time is required for the development of fuzzy rules for tuning, in other words, of tuning rules.

The above-described conventional technique uses, as characteristic quantities of the process, characteristic quantities of a response waveform of the controlled variable y for stepwise changes of the desired value r. The characteristic quantities of the process are prerequisite for fuzzy inference. An operation in which a desired value is not changed stepwise is however accompanied by the problem that tuning of a controller is difficult, because extraction of such characteristic quantities are infeasible.

Reference may also be had, as a related prior art publication, to U.S. Pat. No. 4,602,326 entitled "Pattern-Recognition Self-Tuning Controller", although no fuzzy inference is used therein.

As another method for tuning a control parameter of a controller in accordance with characteristics of a controlled system, there is the tuning method described in "Tekio Seigyo System no Riron to Jissai (Theory and Practice of Adaptive Control Systems)" coauthored by I. D. Landau and Masayoshi Tomizuka, The Ohmsha Co., Ltd. (published Dec. 10, 1982). The outline of this conventional tuning method will hereinafter be described.

FIG. 30 is a block diagram showing the details of the conventional tuning method. According to this method, a controller 108 is tuned such that characteristics of a combined controlling-controlled system, namely, of a system composed in combination of the controller 108 and the controlled system 101 can be brought into conformity with characteristics of a reference model 109 with desired response characteristics. This tuning method is therefore called the "model-reference-type adaptive control method". In this method, a tuning algorithm for the controller can be given by a formula when a controlled system is a linear system, in other words, has linear characteristics. Formation of such a formula has however been difficult when a controlled system has non-linear characteristics.

To control a plant, it is necessary to understand characteristics of the plant and then to determine an optimal manipulated variable on the basis of the characteristics. As a method for this purpose, there has been the prediction adaptive control method for plants, which is described in (1) "Steam Temperature Prediction Control for Thermal Power Plant", IEEE, Trans. on Power Apparatus and Systems, PAS-103 (9), 2382-2387, September 1984 or (2) "Adaptive Optimal Control of Steam Temperatures for Thermal Power Plants", IEEE, Trans. on Energy Conversion, 4(1), 25-33, March 1989. The prediction adaptive control method for plants is applied to a thermal power plant in these publications. Namely, a model of a thermal power plant is built in a control system, parameters of the model are identified based on operation data of the plant, operation of the plant in the near future is predicted using the thus-identified model, and a manipulated variable is then determined based on the results of the prediction.

Incidentally, characteristics of a thermal power plant are expressed by a non-linear differential equation as shown by the following equation:

$$\left.\begin{array}{l} \dfrac{dx_1}{dt} = f_1(x_1, x_2, \ldots, x_n, u_1, u_2, \ldots, u_m) \\ \dfrac{dx_2}{dt} = f_2(x_1, x_2, \ldots, x_n, u_1, u_2, \ldots, u_m) \\ \quad \vdots \\ \dfrac{dx_n}{dt} = f_n(x_1, x_2, \ldots, x_n, u_1, u_2, \ldots, u_m) \end{array}\right\} \quad (80)$$

where
$x_i$: state variable representing temperature, pressure or the like,
$u_i$: manipulated variable indicating fuel quantity, feedwater quantity or the like, and
$f_i$: non-linear function.

As a model for a thermal power plant defined by equation (80), (i) a physical model and (ii) a linear regression model have conventionally be used. The physical model (i) makes use of a mathematical formula representing physical phenomena such as mass balance, energy balance and momentum balance and simulates a part of the characteristics of the thermal power plant represented by the equation (80). A feature of such a physical model resides in that it permits simulation of non-linear characteristics which vary depending on the load level. It is however difficult to realize a large and complex physical model because of the difficulties in tuning model parameters.

The linear regression model (ii) has simulated a part of characteristics of a thermal power plant, which is represented by equation (80), by using a mathematical formula which estimates an output variable of the thermal power plant by linear connection of time-series signals of an input/output variable of the thermal power plant. A feature of the linear regression model resides in that a relatively large and complex model can be realized. It is however difficult for the linear regression model to simulate a non-linear characteristic which varies depending on the load level.

Regarding the conventional techniques described above, it is difficult to realize, with the physical model (i), a model capable of simulating the entirety thermal power plant. There is hence no choice other than using a model which can simulate only a part of a thermal power plant, such as a secondary superheater. This inherently poses a limitation on the prediction of the behavior or state of a thermal power plant, which is a multi-input/multi-output system, in the near future, thereby also posing a limitation on the improvement of controllability. The linear regression model (ii) permits simulation of most of a thermal power plant. It is however necessary to identify a model parameter responsive to each change in load because the thermal power plant has non-linear characteristics that varies depending on the load level. The speed of the identification cannot follow changes in load when the changes in load take place at high speed, resulting in the problem that a limitation is imposed on the improvement of controllability.

SUMMARY OF THE INVENTION

A first object of the present invention is therefore to provide a control method which can shorten the time for the development of a tuning rule, can tune a control parameter without being limited by the type of time response of an input/output variable for a combined controlling-controlled system, can determine an optimal manipulated variable in the light of characteristics of a controlled system, and can hence improve the controllability, and also to provide a system suitable for use in the practice of the control method.

A second object of the present invention is to provide a control method which can determine an optimal manipulated variable in the light of characteristics of a controlled system and can hence improve the controllability even when the controlled system has non-linear characteristics or is a multi-input/multi-output system.

To achieve the first object described above, the present invention provides, in one aspect thereof, a method for controlling a controlled system by a controller such that a controlled variable can be brought into conformity with a desired value, which comprises receiving information containing characteristics of at least one of an input variable for a combined controlling-controlled system, which comprises a controller and the controlled system in combination, and an input/output variable for the controlled system; inputting the information with the characteristic contained therein to a neural network which has been caused to learn in advance a correlation between the information containing the characteristics and the control parameter, thereby determining the control parameter of the controller; and then controlling the controlled system.

In another aspect of the present invention, there is also provided, as a system for practicing the above method, a control system having a controller adapted to control a controlled system to bring a controlled variable into conformity with a desired value, which comprises a tuning system for the controller. The tuning system in turn comprises a neural network having a plurality of units connectable to each other and capable of obtaining an output signal from an input signal in accordance with the state of connection among the units, a means for receiving information containing characteristics of at least one of an input/output variable for a combined controlling-controlled system comprising in combination the controller and the controlled system and an input/output variable for the controlled system, and a means for inputting the information with the characteristics contained therein to the neural network to output a control parameter of the controller.

Employed as the above neural network is a neural network which has beforehand stored the state of connection among units such that a control parameter can be obtained as an output signal when information containing characteristics is inputted.

The neural network can perform learning, for example, by obtaining time responses with respect to various characteristics of a model of a combined controlling-controlled system while using the model of the combined controlling-controlled system and using, as information being available from the time responses and containing the characteristic of an input/output variable of the model of the combined controlling-controlled system, for example, time-series signals or signal waveform patterns indicative of the characteristics as learning input data and also by determining an optimal control parameter corresponding to each characteristic of the model of the combined controlling-controlled system and using the parameter as learning teacher data.

It is also possible to cause the neural network to learn by storing in advance information containing characteristics of an input/output variable of a combined controlling-controlled system, said information being available from time responses of good characteristics out of time responses of a controlled system and using as learning input data the information containing the characteristics of the input/output variable and also by storing in advance control parameters corresponding to the time responses of the good characteristics and using the control parameters as learning teacher data.

The present invention makes it possible to achieve the automatic development of a tuning rule in a short time of period, because the neural network is caused to learn by determining the time response of the model of the combined controlling-controlled system through the use of models of controlled systems of various characteristics, using as learning input data information containing characteristics of an input/output variable of the model of the combined controlling-controlled system, said information being available from the time response, determining an optimal control parameter corresponding to the characteristic of the model of the combined controlling-controlled system and then using the optimal control parameter as learning teacher data.

Further, information containing characteristics of an input/output variable of a controlled system is inputted and a control parameter of a controller is tuned by a neural network on the basis of the information. Even when characteristics of a process change, this change can be detected as a change in time-series signals of an input/output variable. It is therefore possible to tune the parameter of the controller online responsive to changes in the characteristics of the process without being limited by the type of the time response of the input/output variable of the combined controlling-controlled system, whereby the characteristics of the combined controlling-controlled system can be maintained in good state.

To achieve the second object of the present invention, in another aspect of the present invention, there is also provided a method for controlling a controlled system to bring a controlled variable into conformity with a desired value, which comprises receiving information containing characteristics of an input/output variable for the controlled system, inputting the information to a neural network, identifying a model of the controlled system through the use of learning function of the neural network, determining a manipulated variable through the use of the model and then controlling the controlled system.

A reverse system model of the controlled system is identified by causing the neural network to learn while using, for example, time-series signals of an output variable and time-series signals of an input variable as information containing characteristics of an input/output variable of the above controlled system and then using the time-series signals of the output variable as learning input data and the time-series signals of the output variable as learning teacher data.

As a result, the model of the controlled system can be identified, and a controller can be tuned to bring the characteristics of the combined controlling-controlled system into conformity with the corresponding characteristics of a reference model.

Further, a controller is tuned by forming the controller with a neural network, determining time-series signals of an input variable of a controlled system from time-series signals of an output variable of a reference model through the use of a reverse system of the controlled system, and then performing learning such that the time-series signals of the input variable are brought into conformity with the time-series signals of the output variable of the controller.

Since the neural network for the identification of the reverse system model of the controlled system is caused to learn by using, as learning input data, the time-series signals of the output variable of the controlled system and, as learning teacher signals, time-series signals of the input variable of the controlled system, the reverse system model can be easily identified even if it has non-linear characteristics.

Using time-series signals of the output variable of the reference model as inputs to the reverse system model of the controlled system, time-series signals of the input variable of the controlled system at that time are obtained as outputs from the reverse system model. Time-series signals of the input variable of the controlled system, said time-series signals corresponding to time-series signals of the output variable of the reference model, can therefore be determined with ease. Further, the controller can be easily tuned to bring the characteristics of the combined controlling-controlled system into conformity with those of the reference model even if the controlled system has non-linear characteristics because the neural network for the controller model is caused to learn by using, as learning input data, time-series signals of the input variable of the reference model and, as learning teacher data, time-series signals of the input variable of the controlled system, the latter time-series signals corresponding to the time-series signals of the output variable of the reference model.

It is also possible to determine an optimal manipulated variable in response to each change in the characteristics of the controlled system by causing the neural network to learn and then inputting signals of the input and output variables of the controlled system to develop a model capable of outputting an estimated value of the output variable of the controlled system.

It is therefore possible to simulate the entirety of a multi-input/multi-output plant and further to realize a model capable of simulating non-linear characteristics which vary depending on the output level. The controllability can be improved by determining an optimal manipulated variable in response to each change in the characteristics of the plant, said change taking place along the passage of time or being caused by a disturbance or the like, while using the above model.

For the learning by the neural network, namely, for the identification of the non-linear regression model, operation data of the plant are used as learning data.

The neural network has the function to subject an input to non-linear conversion and to output its results. Accordingly, using this function, the non-linear regression model of the plant can be realized. Namely, the non-linear regression model which can output an estimated value of the output variable of the plant by inputting time-series signals of the input/output variable of the plant and subjecting these signals to non-linear conversion can be realized by the non-linear conversion function of the neural network. This makes it possible to realize a model capable of simulating each characteristic of a plant, said characteristics varying depending on the output level, in other words, each non-linear characteristic of the plant. Use of the model permits determination of an optimal manipulated variable in response to each change in the characteristics of the plant, whereby the controllability can be improved. Since the neural network is caused to learn by using operation data of the plant, the non-linear regression model can be identified on-line, thereby making it possible to cope with each change in the characteristics of the plant which change takes place along the passage of time or occurs by a disturbance or the like.

BRIEF DESCRIPTION OF THE DRAWINGS

FIG. 15 is a table of reference models usable for the preparation of teaching data in the invention;

FIG. 39 is a schematic illustration of a still further embodiment of the prediction control system applicable to a system which has a master controller, a subloop controller and a thermal power plant;

DETAILED DESCRIPTION OF PREFERRED EMBODIMENTS OF THE INVENTION

Figure 1:
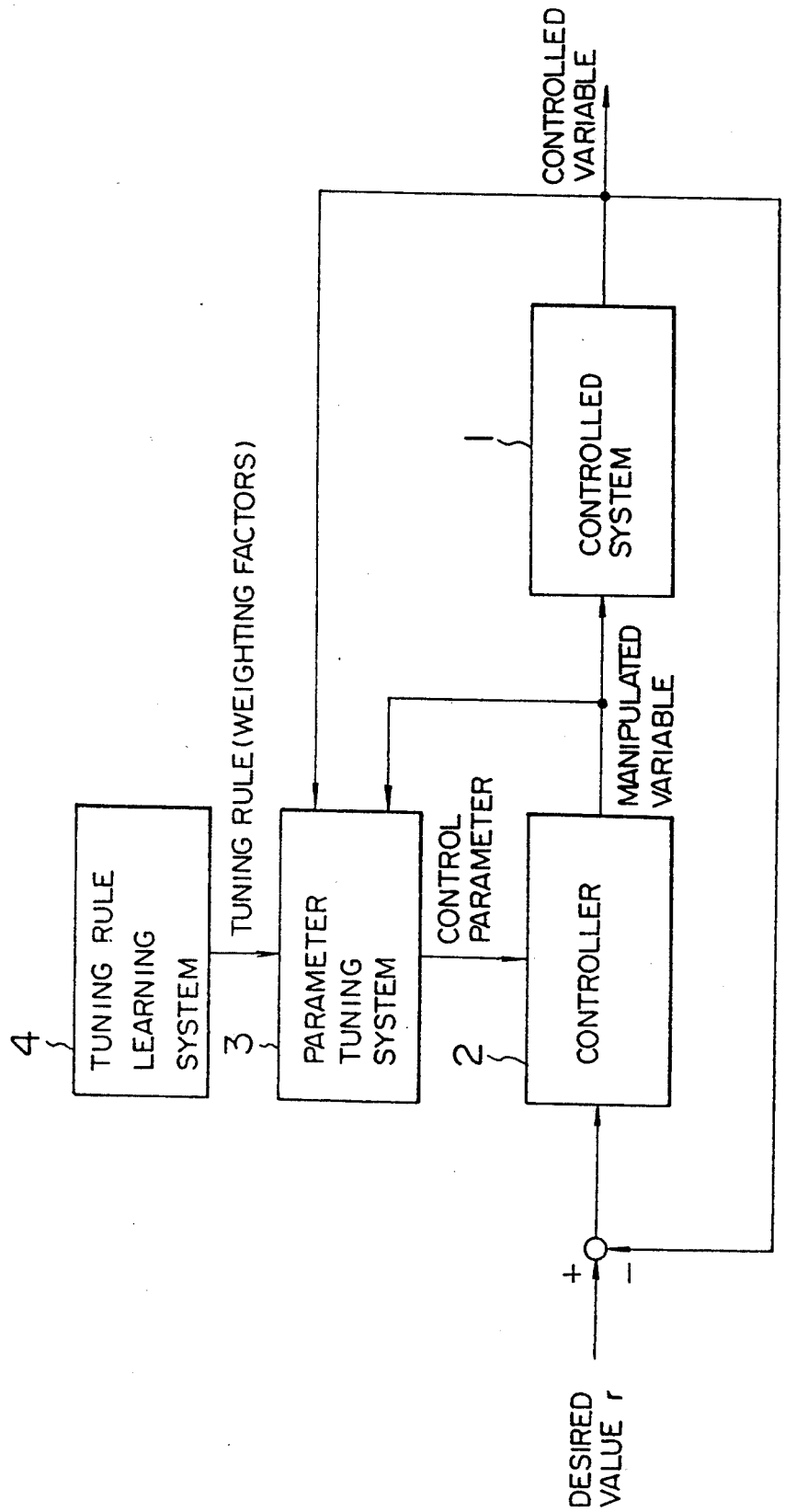
FIG. 1 is a block diagram of one embodiment of a control system which is useful in the practice of a control parameter tuning method of the invention.

The construction of one embodiment of a control system useful in the practice of the control parameter tuning method of the invention is illustrated in FIG. 1.

This embodiment is constructed of a controller 2 for a controlled system 1, a parameter tuning system 3 for tuning each control parameter of the controller 2, and a tuning rule learning system 4 for developing, by learning, a tuning rule for the parameter tuning system 3.

Assume that a PID (proportional plus integral plus derivative) controller is used as the controller 2. The transfer function $G_c(s)$ of the PID controller is given by the following equation:

$$G_c(s) = K_p \left( 1 + \frac{1}{T_i s} + T_d s \right) \tag{1}$$

where
- $K_p$: proportional gain,
- $T_i$: integral time, and
- $T_d$: derivative time.

Also assume that the controlled system 1 can be approximated by a first-order lag+dead time system whose transfer function $G_p(s)$ can be defined by the following equation:

$$G_p(s) = \frac{K}{1 + T_s} e^{-Ls} \tag{2}$$

where
- K: gain,
- T: time constant, and
- L: dead time.

The parameter tuning system 3 receives time-series signals of an input/output variable of the controlled system 1 and tunes the control parameter of the controller 2 based on the time-series signals. This tuning process can be expressed by the following equation:

$$C = F(z) \tag{3}$$

where
- C: control parameter,
- z: time-series signals, and
- F: tuning function.

In the case of the PID controller, the control parameter C can be modified as follows:

$$C = [K_p, T_i, T_d]^T \tag{4}$$

where
- T: symbol indicating a transposition.

Where the controlled system 1 can be approximated by a first-order lag+dead time system, the time-series signals z of the input/output variable can be expressed by the following equation:

$$z = [y(t)y(t-1) \ldots y(t-L')x(t)x(t-1) \ldots x(t-L')]^T \tag{5}$$

where
- $y(t-L')$: controlled variable at the time of $(t-L')^{th}$ sampling,
- $x(t-L')$: manipulated variable at the time of $(t-L')^{th}$ sampling, and
- $L'$: degree.

Figure 2:
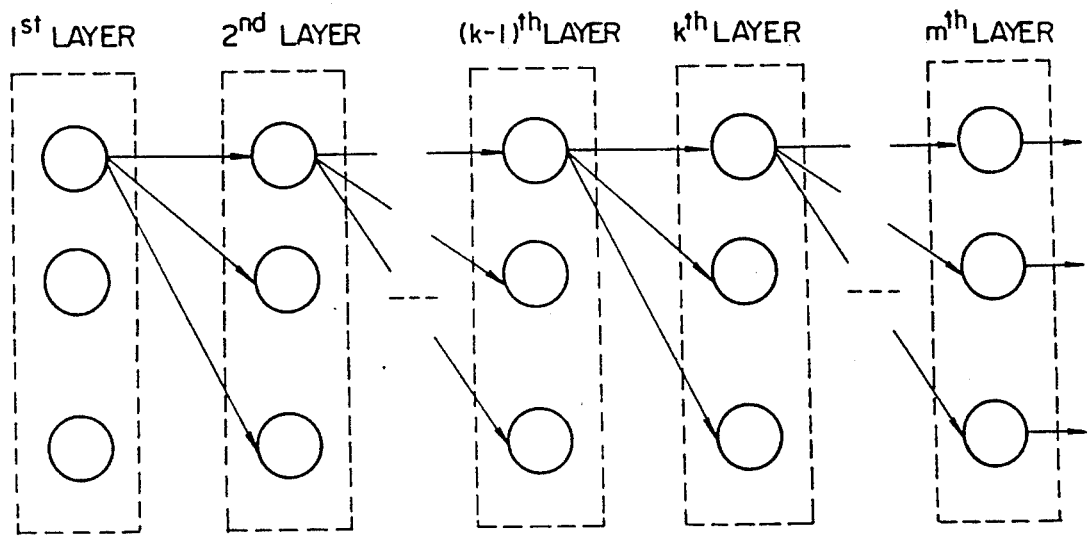
FIG. 2 schematically illustrates the construction of a multilayer neural network.
Figure 3:
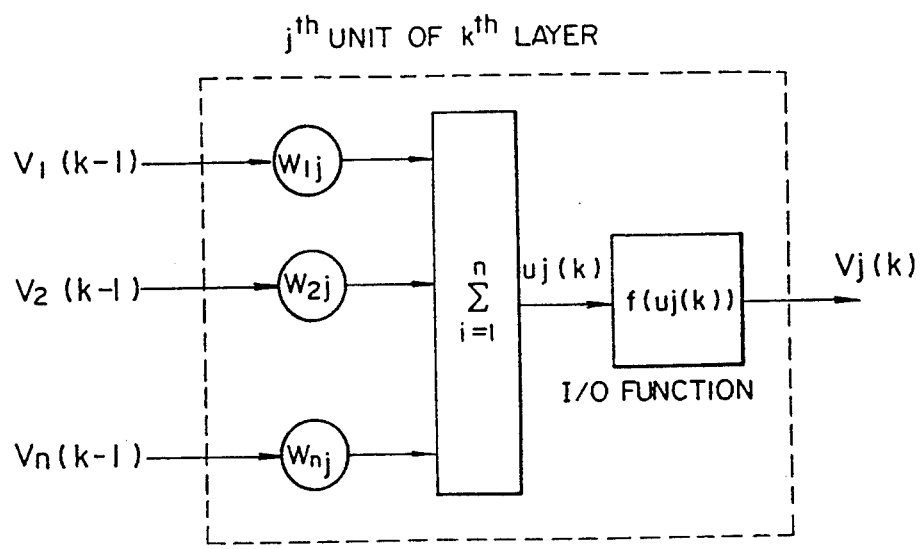
FIG. 3 is a schematic block diagram of the functional construction of one of units of a hidden unit layer in the neural network.

The tuning function F(z) is produced, for example, a multilayer (m layers) neural network illustrated in FIG. 2. One example of the construction of units, elements constituting the neural network, is depicted in FIG. 3.

An input-output correlation of each unit is represented by the following equations:

$$v_j(k) = f(u_j(k)) \tag{6}$$

$$u_j(k) = \sum_i w_{ij}(k-1, k) \cdot v_i(k-1) \tag{7}$$

where
- $u_j(k)$: sum of inputs to the $j^{th}$ unit in the $k^{th}$ layer,
- $v_j(k)$: output from the $j^{th}$ unit in the $k^{th}$ layer,
- $w_{ij}(k-1,k)$: weighting factor of the connection from the $i^{th}$ unit in the $(k-1)^{th}$ layer to the $j^{th}$ unit in the $k^{th}$ layer, and
- f: function defining an input-output correlation of each unit.

The first layer of the neural network is an input layer. Each output from each unit in the first layer becomes an input signal to the neural network. In this embodiment of the invention, input signals to the neural network are time-series signals z of the input/output variable of the controlled system 1. Their correlation can be indicated by the following equation:

$$\begin{bmatrix} v_1(1) \\ v_2(1) \\ \cdot \\ \cdot \\ v_{L'+1}(1) \\ v_{L'+2}(1) \\ v_{L'+3}(1) \\ \cdot \\ \cdot \\ v_{2L'+2}(1) \end{bmatrix} = \begin{bmatrix} y(t) \\ y(t-1) \\ \cdot \\ \cdot \\ y(t-L') \\ x(t) \\ x(t-1) \\ \cdot \\ \cdot \\ x(t-L') \end{bmatrix} \tag{8}$$

On the other hand, the last layer (the $m^{th}$ layer in this embodiment) of the neural network is an output layer. Each output from the output layer is an output signal from the neural network. In this embodiment, each output signal from the neural network is the control parameter C of the controller. Their correlation can be indicated by the following equation:

$$\begin{bmatrix} v_1(m) \\ v_2(m) \\ v_3(m) \end{bmatrix} = \begin{bmatrix} K_p \\ T_i \\ T_d \end{bmatrix} \tag{9}$$

The tuning function F(z) represented by equation (3) varies as the input-output correlation of each unit represented by equations (6) and (7) changes. Namely, the tuning function F(z) varies when the number of layers in the neural network, the number of units in each layer, the weighting factor $w_{ij}(k-1,k)$ for each unit, and/or the function f defining the input-output correlation of each unit changes. A tuning function F(z) which conforms with for an object can therefore be developed by tuning the number of layers, the number of units in each layer, the weighting factor $w_{ij}(k-1,k)$ for each unit and/or the function f defining the input-output correlation of each unit.

The tuning rule learning system 4 develops, through learning, a tuning rule for the parameter tuning system 3.

A description will next be made of the algorithm of this learning.

When an input-output combination (z,c) or combinations are given firstly as learning data, the square of an error which is expressed by the following equation is defined as a "loss function R".

$$R = \frac{1}{2} \sum_j \{v_j(m)(w,z) - c_j\}^2 \tag{10}$$

where
- w: sum of all the weighting factors of connections is neural network, and
- $v_j(m)$ (w,z): output of the $j^{th}$ unit in the $m^{th}$ layer (output layer), obtained finally from the input z and the summed weighting factor w.

A correction quantity $\Delta w$ for w is determined from the gradient of w in the loss function R and is expressed by the following equation:

$$\Delta w_{ij}(k-1,k) = \frac{\partial R}{\partial w_{ij}(k-1,k)} \tag{11}$$

where
- $\Delta w_{ij}(k-1,k)$: correction quantity for the weighting factor $w_{ij}(k-1,k)$ of the connection from the $i^{th}$ unit in the $(k-1)^{th}$ layer to the $j^{th}$ unit in the $k^{th}$ layer, and
- $\epsilon$: positive constant.

The right side, $\partial R/\partial w_{ij}(k-1,k)$, of equation (11) can be modified into the following equation:

$$\frac{\partial R}{\partial w_{ij}(k-1,k)} = \frac{\partial R}{\partial u_j(k)} \frac{\partial u_j(k)}{\partial w_{ij}(k-1,k)} \tag{12}$$

Upon substitution of equation (7) into the equation (12) and subsequent rearrangement, the following equation can be derived:

$$\frac{\partial R}{\partial w_{ij}(k-1,k)} = \frac{\partial R}{\partial u_j(k)} v_i(k-1) \tag{13}$$

When $k \neq m$, the right side, $\partial R/\partial u_j(k)$, of the equation (13) can be determined by the following equation:

$$\frac{\partial R}{\partial u_j(k)} = \sum_l \frac{\partial R}{\partial u_l(k+1)} \frac{\partial u_l(k+1)}{\partial v_j(k)} \frac{\partial v_j(k)}{\partial u_j(k)} \tag{14}$$

Substitution of equation (6) and (7) into the equation (14) and subsequent rearrangement give the following equation:

$$\frac{\partial R}{\partial u_j(k)} = \sum_l \frac{\partial R}{\partial u_l(k+1)} w_{jl}(k,k+1) f'(u_j(k)) \tag{15}$$

where
- f': derivative of the function f defining the input-output correlation of each unit.

Next, representing $$\frac{\partial R}{\partial u_j(k)} = d_j(k),$$

equations (11) and (15) can be expressed by the following equations:

$$\Delta w_{ij}(k-1,k) = -\epsilon d_j(k) \cdot v_i(k-1) = -\epsilon v_i(k-1) \cdot d_j(k) \tag{16}$$

$$\begin{aligned} d_j(k) &= \left\{ \sum_l d_l(k+1) \cdot w_{jl}(k,k+1) \right\} \cdot f'(u_j(k)) \\ &= \left\{ \sum_l w_{jl}(k,k+1) \cdot d_l(k+1) \right\} \cdot f'(u_j(k)) \end{aligned} \tag{17}$$

When k=m, $\partial R/\partial u_j(m)$ is determined from the equation (10) in accordance with the following equation:

$$\begin{aligned} d_j(m) &= \{v_j(m) - c_j\} \frac{\partial v_j(m)}{\partial u_j(m)} \\ &= \{v_j(m) - c_j\} f'(u_j(m)) \end{aligned} \tag{18}$$

Using the above equations (10), (17) and (18), the correction for the weighting factor $w_{ij}(k-1,k)$ of the connections can be recursively calculated from k=m toward k=2. Namely, using as an input the error between an ideal output $c_j$ and an actual output $v_j(m)$ (w,z), propagation is carried out from the output layer toward the input layer, that is, in the direction opposite to the propagation of signals while taking the sum weighted by $v_j(k,k+1)$. This is the back error propagation learning algorithm.

Assume that the function f defining the input-output correlation of each unit is common to all the units and is given by the following equation:

$$f(u) = \frac{1}{1 + \exp(-u + \theta)} \tag{19}$$

From equation (19), the following equation is obtained:

$$f'(u) = f(u)\{1 - f(u)\} \tag{20}$$

From equation (6) and equation (20), the following equation is derived:

$$f'(u_j(k)) = v_j(k)\{1 - v_j(k)\} \tag{21}$$

For smooth and prompt completion of the learning, equation (16) can be modified as follows:

$$\Delta w_{ij}(k-1,k)(\tau) = \tag{16a}$$
$$-\epsilon v_i(k-1)(\tau) \cdot d_j(k)(\tau) + \alpha \Delta w_{ij}(k-1,k)(\tau - 1)$$

where
- $\alpha$: positive constant ($\alpha$ may be set equal to $1-\beta$), and
- $\tau$: number of corrections.

In each input-output combination (z,c) of the learning data, the input z will be called "learning input data" while the output c will be called "learning teacher data".

A description will next be made of a method for obtaining learning data in this embodiment.

When each control parameter of the controller 2 is tuned, the tuning is conducted in accordance with a particular evaluation standard. A reference model can be mentioned as the evaluation method. There is also a tuning method in which the transfer function of the combined controlling-controlled system is brought into partial agreement with the transfer function of the reference model, namely, the partial model matching method. Control of the controlled system 1, which can be approximated by a first-order lag+dead time system, by a PID controller will therefore be described with reference to FIG. 4.

Figure 4:
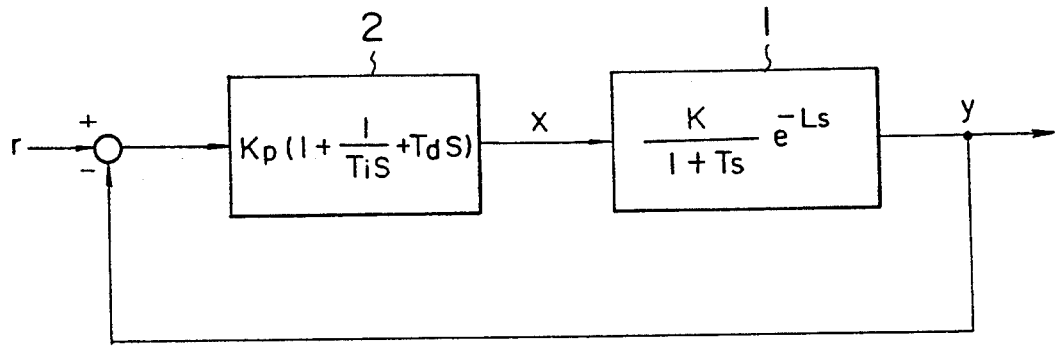
FIG. 4 is a block diagram of a control model in which the above embodiment has been incorporated.

In FIG. 4, the closed loop transfer function W(s) of a controlled variable y(s) for a desired value r(s) can be expressed by the following equation:

$$W(s) = \frac{G_c(s)G_p(s)}{1 + G_c(s)G_p(s)} \quad (22)$$

Substitution of equations (1) and (2) into equation (22) yields the following equation:

$$W(s) = \frac{K_p\left(1 + \frac{1}{T_i s} + T_d s\right) \cdot \frac{K}{1 + Ts} e^{-Ls}}{1 + K_p\left(1 + \frac{1}{T_i s} + T_d s\right) \cdot \frac{K}{1 + Ts} e^{-Ls}} \quad (23)$$

When subjected to the MacLaurine's expansion, the dead time transfer function $e^{-Ls}$ can be expressed by the following equation:

$$e^{-Ls} = \frac{1}{1 + Ls + \frac{1}{2!}(Ls)^2 + \frac{1}{3!}(Ls)^3 + \ldots} \quad (24)$$

On the other hand, the transfer function $W_r(s)$ of the reference model can be given by the following equation:

$$W_r(s) = \frac{1}{1 + \sigma s + \alpha_2(\sigma s)^2 + \alpha_3(\sigma s)^3 + \alpha_4(\sigma s)^4 + \ldots} \quad (25)$$

where $\alpha_i$: coefficient, and $\sigma$: time scale factor.

To achieve partial matching between the closed loop transfer function W(s) of the controlled variable y(s) for the desired value r(s), said closed loop transfer function being available by the substitution of equation (24) into equation (23), and the transfer function $W_r(s)$ of the reference model represented by equation (25), the following equations must be established:

$$T_i = KK_p\sigma \quad (26)$$
$$T_i(L + T) = KK_p\alpha_2\sigma^2 + KK_pT_i\sigma$$

$$T_i\left(\frac{L^2}{3!} + TL\right) = KK_p\alpha_3\sigma^3 + KK_pT_i\alpha_2\sigma^3 + KK_pT_iT_d\sigma$$

$$T_i\left(\frac{L^3}{3!} + \frac{TL^2}{2!}\right) = KK_p\alpha_4\sigma^4 + KK_pT_i\alpha_3\sigma^3 + KK_pT_iT_d\alpha_2\sigma^2$$

From equations (26), the following equations can be obtained. The control parameters $K_p$, $T_i$ and $T_d$ and the time scale factor $\sigma$ of the PID controller 2 can be determined based on these equations.

$$K_p = \frac{T_i}{K\sigma} \quad (27)$$

$$T_i = L + T - \alpha_2\sigma \quad (28)$$

$$T_d = \frac{1}{T_i}\left(\frac{L^2}{2!} + TL - (L + T)\alpha_2\sigma + (\alpha_2^2 - \alpha_3)\sigma^2\right) \quad (29)$$

$$f(\sigma) = (2\alpha_2\alpha_3 - \alpha_2^3 - \alpha_4)\sigma^3 + (L + T)(\alpha_2 - \alpha_3)\sigma^2 - \quad (30)$$

$$\left(\frac{L^2}{2!} + TL\right)\alpha_2\sigma + \left(\frac{L^3}{3!} + \frac{TL^2}{2!}\right) = 0$$

Solving equation (30), the minimum positive real root is determined as the time scale factor $\sigma$, and $K_p$, $T_i$ and $T_d$ can be determined from equations (27), (28) and (29). Where the reference model is a Kitamori model ($\alpha_2=0.5$, $\alpha_3=0.15$, $\alpha_4=0.03$, . . . ) on the other hand, the minimum positive real root of equation (30) can be approximated by the following equation. Using this approximate value of $\sigma$, $K_p$, $T_i$ and $T_d$ can also be determined in accordance with equations (27), (28) and (29).

$$\sigma \approx 1.37L \quad (31)$$

An example of learning of a tuning rule and an example of tuning of a parameter will next be described more specifically.

The tuning rule learning system 4 develops a tuning rule (weighting factors) for the parameter tuning system 3 through learning.

An input-output combination (z,c) of learning data is determined by off-line simulation. A description will next be made of development of a tuning rule, for example, for a case in which a controlled system permitting approximation by a first-order lag+dead time system is controlled by a PID controller.

Figure 18:
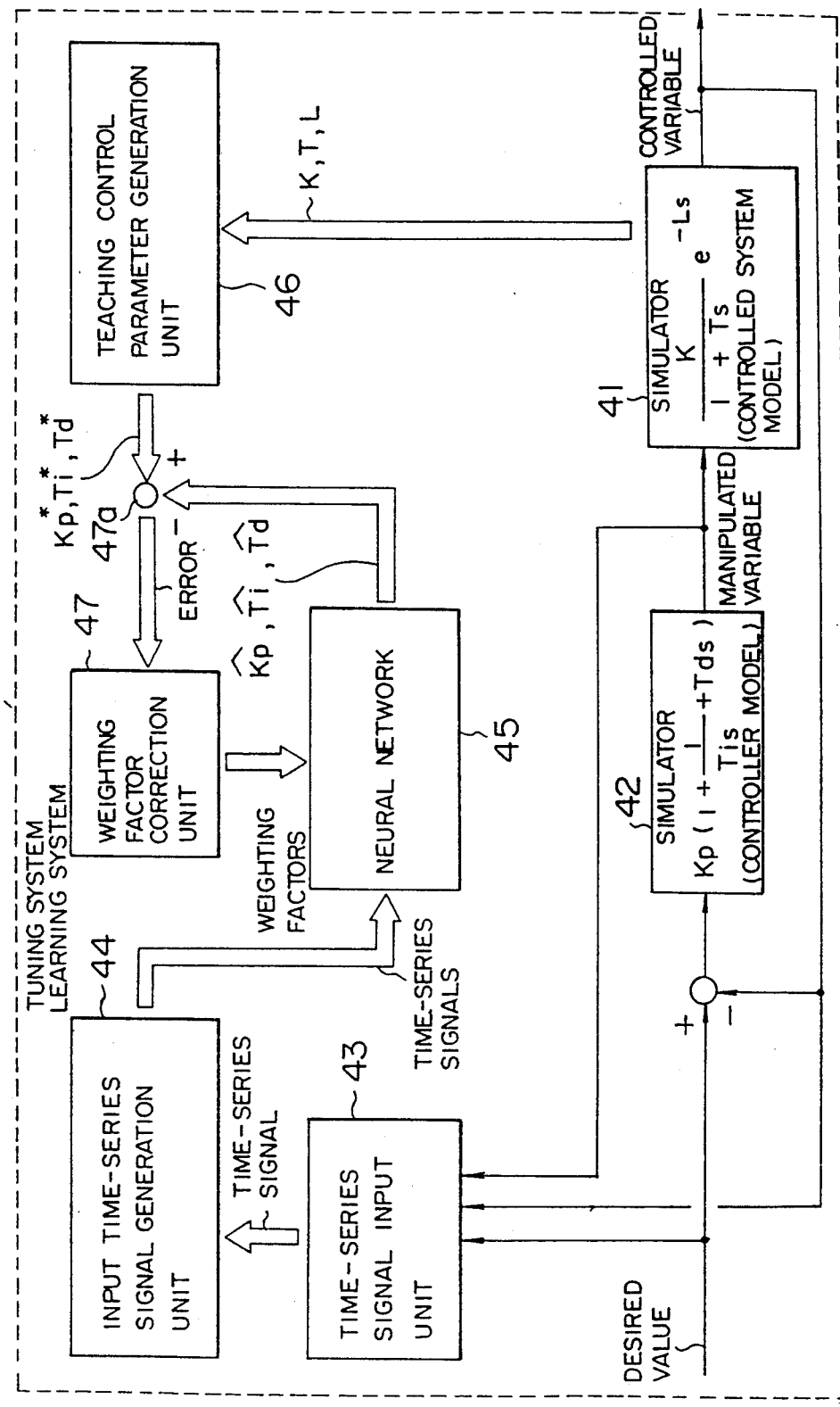
FIG. 18 is a block diagram of one embodiment of a tuning rule learning system useful in the practice of the invention.

FIG. 18 illustrates the functional construction of one embodiment of the tuning rule learning system 4.

The tuning rule learning system 4 of this embodiment is equipped with simulators 41,42 which function as means for realizing as models the controlled system 1 and controller 2 of FIG. 4.

The learning system 4 also has a time-series signal input unit 43 for receiving a simulated manipulated variable to a desired value and a simulated controlled variable from the simulators 41,42 and outputting them as time-series signals; an input time-series signal generation unit 44 for storing the time-series signals and fetching and outputting them as needed; a neural network 45 for performing inference of a control parameter on the basis of a weighting factor in response to the time-series signals from the input time-series signal input unit 44; a teaching control parameter generating unit 46 for calculating teaching control parameters $K_p^*, T_i^*, T_d^*$ based on characteristics (K,T,L) of the controlled model realized as a result of the simulation by the simulator 41, storing the results of the calculation and fetching them as needed; an error computing unit 47a for determining the error between the teaching control parameter and the parameter inferred by the neural network 45; and a weighting factor correction unit 47 for performing correction of the weighting factor on the basis of the error and setting the thus-corrected weighting factor in the neural network 45.

In the tuning rule learning system 4 of the above-described construction, simulation is performed using the simulators 41 and 42 which serve as a model for a combined controlling-controlled system of the type that a controlled system, which can be approximated by a first-order lag+dead time system, is controlled by a PID controller. At this time, collection of input signals is conducted by the time-series signal input unit 43 and input time-series signal generation unit 44. Namely, the time-series signal input unit 43 obtains various time responses by changing the characteristics (K,T,L) of the model of the controlled system and also the characteristics ($K_p, T_i, T_d$) of the controller in various ways, and collects, as learning input data z, time-series signals of the manipulated variable x and controlled variable y from these time responses.

On the other hand, the teaching control parameter generation unit 46 determines the time scale factor $\sigma$ from the parameters K,T,L of the model of the controlled system at the time of receipt of the learning input data, for example, in accordance with equation (30) or (31). The teaching control parameter generation unit 46 also introduces the time scale factor $\sigma$ into equations (27), (28) and (29) to determine the control parameters $K_p^*$, $T_i^*$ and $T_d^*$, which will then be used as learning teacher data.

Using an input-output combination (z,c) of the learning data obtained as described above, the weighting factor correction unit 47 causes the neural network 45 to learn in accordance with the back error propagation learning algorithm so that the tuning function F(z) or tuning rule (weighting factors) is developed.

Figure 5:
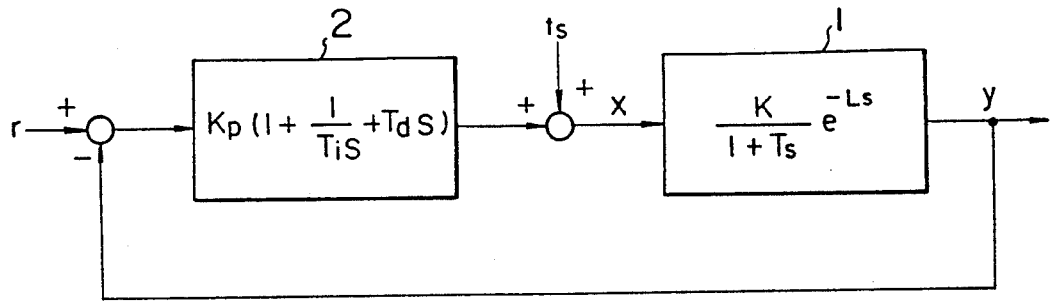
FIG. 5 is a block diagram showing superposition of a test signal onto a manipulated variable in the combined controlling-controlled system of FIG. 4.

When the various time responses are determined by changing the characteristics (K,T,L) of the model of the controlled system and the characteristics ($K_p, T_i, T_d$) of the controller (i.e., simulator 42) in various ways as in the above simulation, a test signal ts may be superposed onto the manipulated variable as illustrated in FIG. 5. As the test signal ts, various signals can be used including a pseudo-random signal, a sinusoidal signal and a ramp signal.

Upon changing the characteristics (K,T,L) of the model of the controlled system and the characteristics ($K_p, T_i, T_d$) of the controller (i.e., simulator 42) in various ways, they may be changed using uniform random numbers.

Tuning of each control parameter of the controller 2 by the parameter tuning system 3 will next be described.

Figure 19:
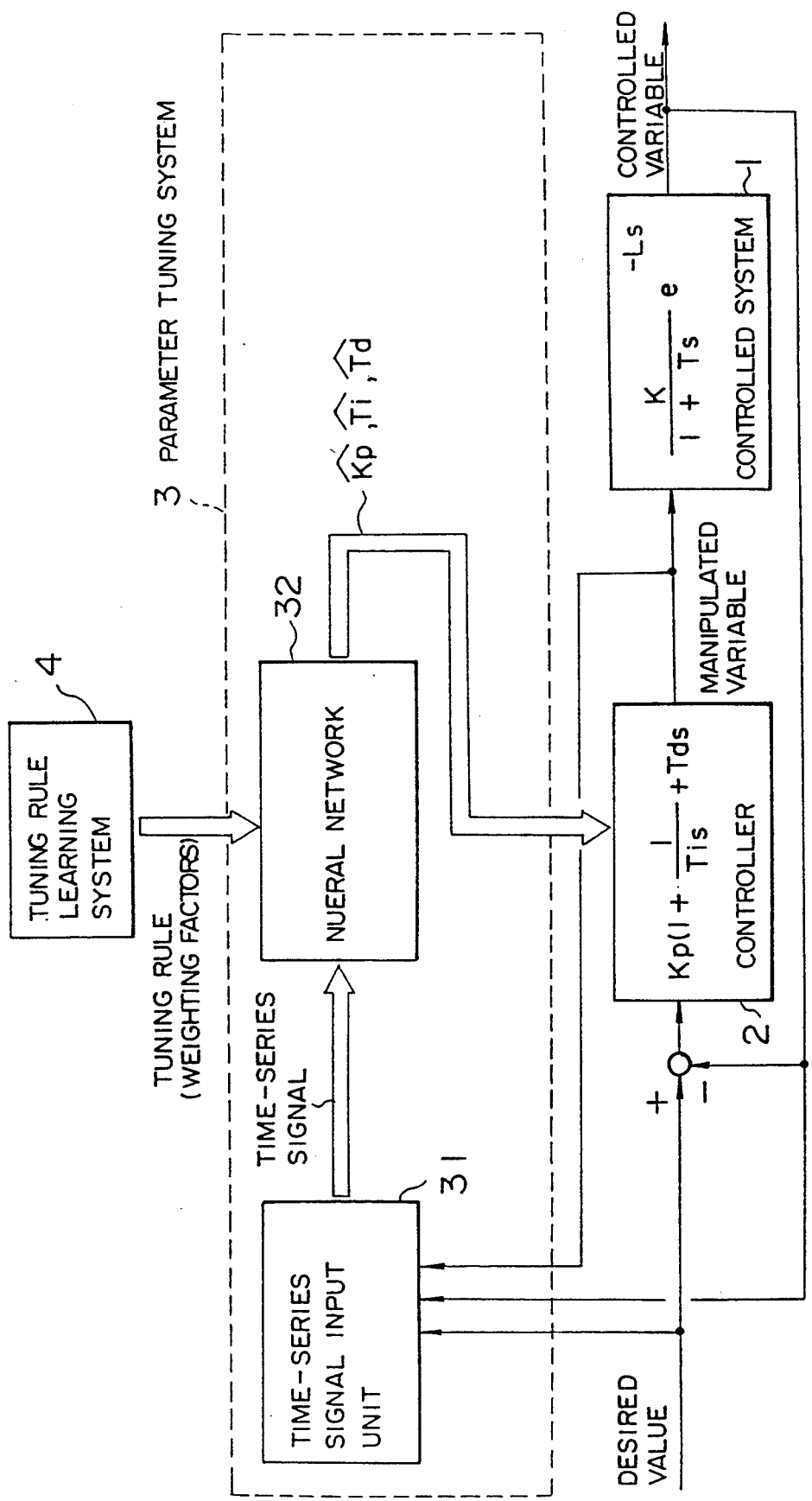
FIG. 19 is a block diagram of one embodiment of a parameter tuning system useful in the practice of the invention.

As is depicted in FIG. 19, the parameter tuning system 3 has, as primary functional units, a time-series signal input unit 31 for receiving a manipulated variable to a desired value and a controlled variable from the controlled system 1 and controller 2, which constitute the actual combined controlling-controlled system, and outputting them as time-series signals and a neural network 32 for performing inference of control parameters ($\hat{K}_p, \hat{T}_i, \hat{T}_d$) with respect to the time-series signals on the basis of the tuning rule (weighting factors) set up by the tuning rule learning system 4.

The tuning rule (weighting factors) set up at the neural network 45 is transferred to the neural network 32 to realize interunit connection states commensurate with the tuning rule. Described specifically, as the neural network 32, the same neural network as the neural network 45 employed in the tuning rule learning system 4 can be used in common. This permits direct use of the results of the tuning rule learning for the tuning of the corresponding parameter. When a different neural network is employed, it is only necessary to transplant the results of the learning.

The parameter tuning system 3 constructed as described above receives on line at the time-series signal input unit 31 time-series signals of the input-output variable of the controlled system 1 in the actual process and tunes each control parameter of the controller 2 on the basis of the time-series signals by using the neural network 32. In the case of the PID controller by way of example, its control parameters are $K_p, T_i$ and $T_d$. Using the tuning rule (weighting factors) developed through off-line learning, they are tuned at the neural network 32.

A description will next be made of an illustrative method for the on-line learning of a tuning rule.

In the above off-line learning, the tuning function F(z) or tuning rule (weighting factors) is developed using the data obtained by simulation while using the model of the controlled system. In this case, it has been assumed that characteristics of the controlled system are known to some extent. For example, each tuning function F(z) is developed assuming that the corresponding characteristic of the controlled system can be approximated by a first-order lag+dead time system.

If the characteristic of the controlled system is deviated from the assumed characteristic, the tuning function therefore involves a deviation so that some time is required until tuning is completed to give a desirable controlled response.

To overcome this problem, on-line learning of a tuning function is indispensable. A description will next be made of this on-line learning method.

Figure 20:
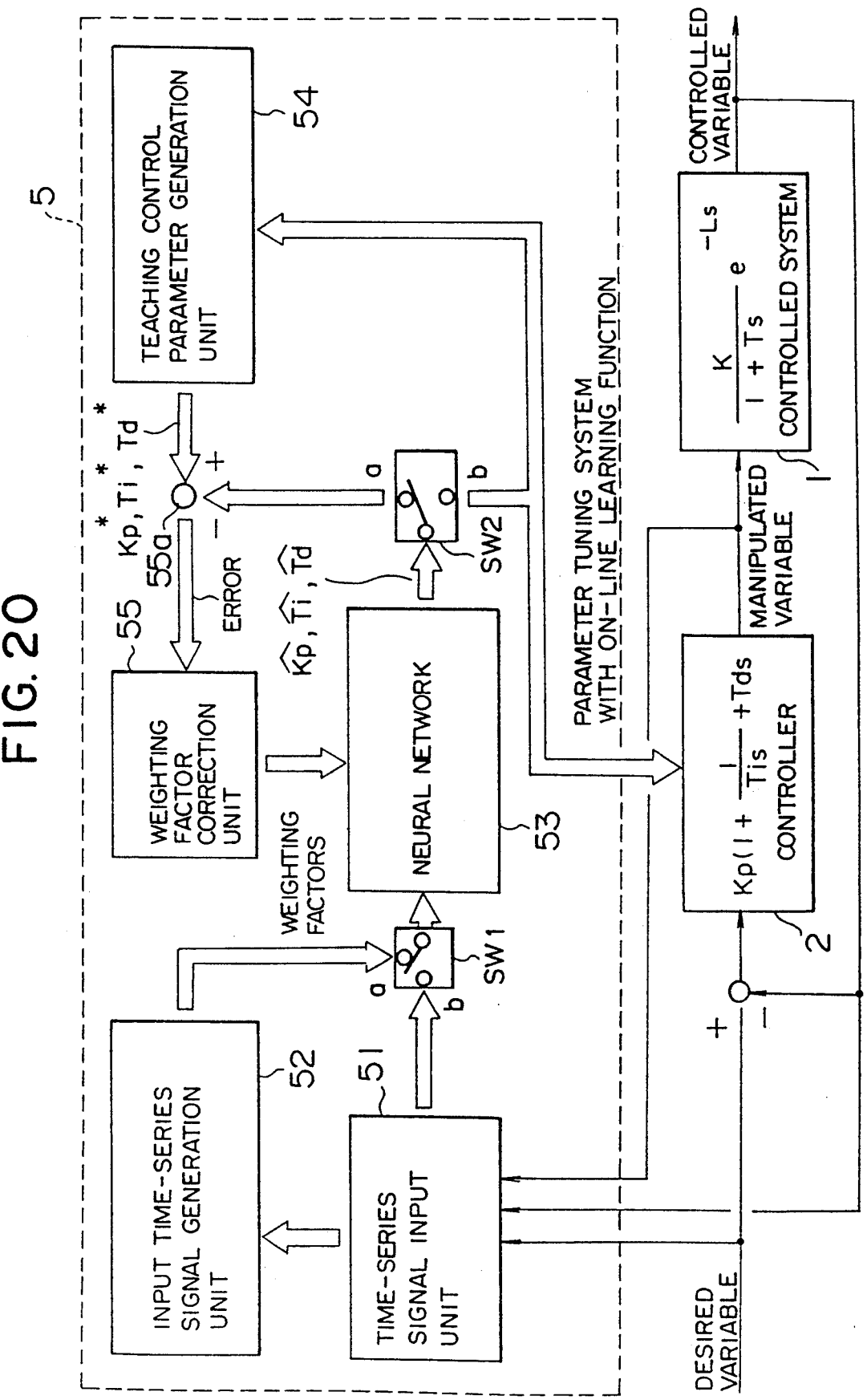
FIG. 20 is a block diagram of one embodiment of a parameter tuning system equipped with an on-line learning function, said system being useful in the practice of the invention.

FIG. 20 depicts a parameter tuning system equipped with an on-line learning function, while FIG. 21 schematically illustrates an on-line tuning process.

The parameter tuning system 5 with the on-line learning function, which is depicted in FIG. 20, comprises, similarly to that shown in FIG. 19, time-series signal input unit 51 for receiving a manipulated variable and a controlled variable from the controlled system 1 and controller 2, said controlled system 1 and controller 2 being an actual combined controlling-controlled system, and a desired value and outputting them as time-series signals; a input time-series signal generation unit 52 for storing the time-series signals and outputting them as needed; a neural network 53 for performing inference of control parameters ($\hat{K}_p, \hat{T}_i, \hat{T}_d$) with respect to the time-series signals on the basis of weighting factors; a teaching control parameter generation unit 54 for storing control parameters, which have given a desirable response in the course of tuning of the parameters of the controller 2, and outputting them as teaching control parameters as needed; an error computing unit 55a for determining errors between the teaching control parameters and their corresponding parameters inferred by the neural network 53; and a weighting factor correction unit 55 for correcting the weighting factors on the basis of the error and setting the thus-corrected weighting factors in the neural network 53.

The system 5 also has switches $SW_1$ and $SW_2$ for changing over the learning state and the tuning state, respectively. When the switches $SW_1$ and $SW_2$ have both been changed over to a side a, the system 5 is in an on-line learning state. The system 5 is however in an off-line tuning state when the switches $SW_1$ and $SW_2$ have both been changed over to a side b.

The neural network 53 of the system 5 is first caused to learn off line by using simulators such as the simulators 41, 42 described above with reference to FIG. 18. This learning may be effected by a separate system or by providing the present system with simulators.

Operation of the system will next be described.

First of all, to perform tuning of the controller 2, the switches $SW_1$ and $SW_2$ are changed over to the side b to input time-series signals on line from the combined controlling-controlled system to the neural network 53 via the time-series signal input unit 51. At the neural network 53, inference of the control parameters is performed using the results of the past learning. The results of the inference are delivered to the controller 2 to perform its tuning. The results of the inference are also simultaneously sent to the teaching control parameter generation unit 54 and are once stored there.

Figure 21A:
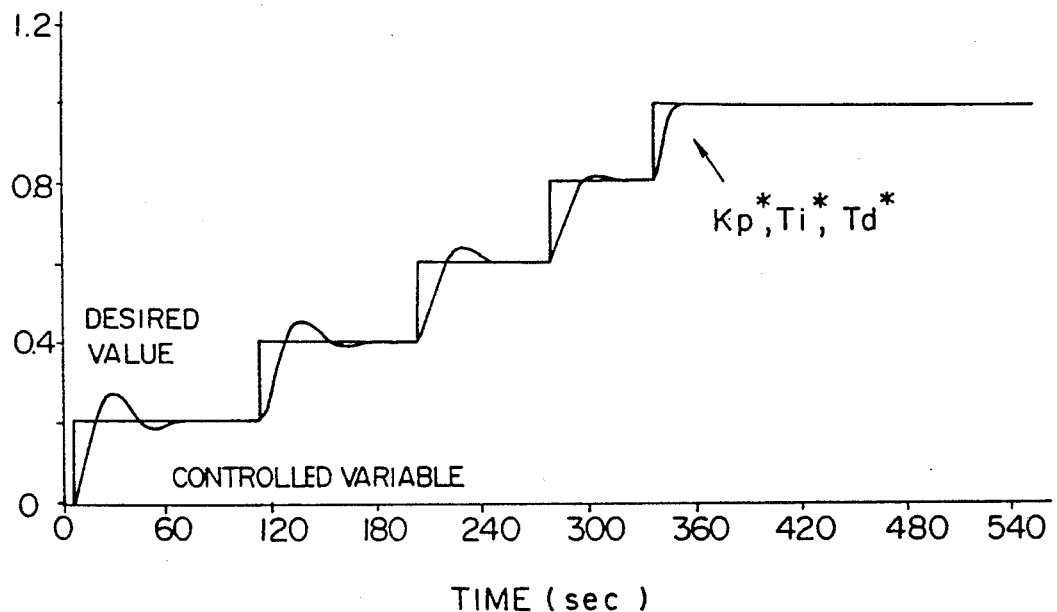
FIG. 21A and FIG. 21B are waveform diagrams showing on-line tuning processes, respectively.
Figure 21B:
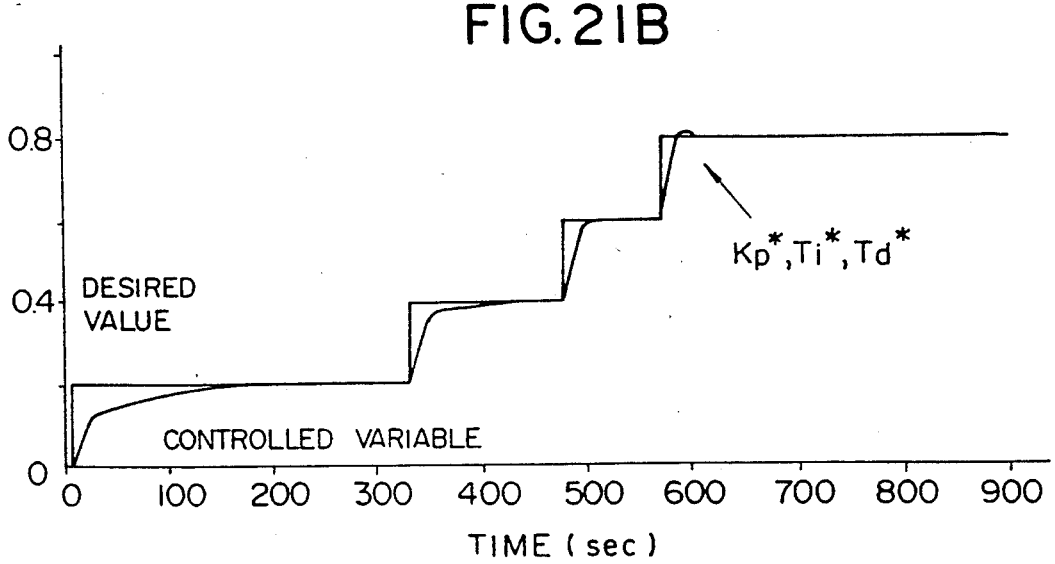

Now assume that a tuning process as shown in FIG. 21A or FIG. 21B has been obtained as a result of the tuning of the control parameters on the basis of the time-series signal in the on-line tuning state. FIG. 21A indicates a case in which large overshoot appears in an initial control response, while FIG. 21B indicates another case in which overdamping occurs in an initial control response. Because the characteristics of the controlled system are somewhat deviated from the assumed characteristics, some time is required to obtain a desired control response, in other words, to tune the control parameters so that the control parameters can correspond to $K_p^*$, $T_i^*$ and $T_d^*$, respectively.

The parameter tuning system 5 equipped with the on-line learning function stores data in the course of the tuning and corrects the tuning function by on-line learning making use of these data. Namely, the parameter tuning system 5 performs learning using, as teaching control parameter (learning teacher data), the control parameters $K_p^*$, $T_i^*$, $T_d^*$ at the time of achievement of the desired control response and, as input time-series signals (learning input data), time-series signals of the input/output variables of the combined controlling-controlled system, the latter time-series signals having been received in the course of the tuning. At this time, the change-over switches $SW_1$, $SW_2$ in FIG. 20 are on the side a.

Figure 22:
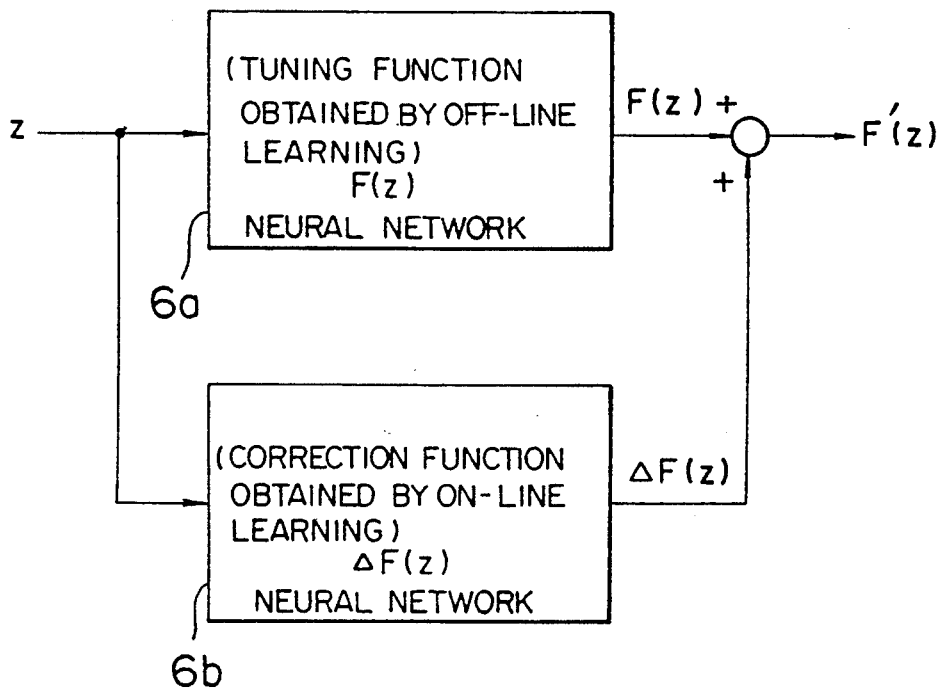
FIG. 22 is a block diagram illustrating, by way of example, preparation of a correction function for a tuning function, which is obtained by off-line learning, from data by using another neural network, said data having been obtained through an on-line tuning process.

According to the on-line learning in the above embodiment, the tuning function F(z) or tuning rule (weighting factors) obtained by the off-line learning is corrected directly by the data obtained in the course of the on-line tuning. As an alternative, as illustrated in FIG. 22, a correction function $\Delta F(z)$ for the tuning function F(z) obtained through the off-line learning by the neural network 6a may be developed from the data, which have been obtained in the course of the on-line tuning, by using a separate neural network 6b.

Namely, the correction function $\Delta F(z)$ is developed by conducting learning while using, as learning teacher data, the differences $\Delta K_p^*$, $\Delta T_i^*$, $\Delta T_d^*$ between the control parameters $K_p^*$, $T_i^*$, $T_d^*$ at the time of achievement of the desired control response and the corresponding control parameters $\hat{K}_p$, $\hat{T}_i$, $\hat{T}_d$ inferred off line and, as learning input data, the time-series signals of the input/output variables of the combined controlling-controlled system, said time-series signals having been received in the course of the tuning. In this case, on-line tuning after the learning is to obtain control parameters in accordance with a corrected tuning function F'(z) represented by the following equation:

$$F'(z) = F(z) + \Delta F(z)$$

In addition, where the characteristics of the controlled system are substantially deviated from the assumed characteristics, it may be difficult, in some instances, to make the controlled variable close to the desired control response even when the controller 2 is tuned by using the tuning function F(z) developed through the off-line learning. In such a case, it is possible to gradually make the controlled variable closer to the desired control response (control parameters: $K_p^*$, $T_i^*$, $T_d^*$) by using the climbing method in which the control parameters $K_p$, $T_i$, $T_d$ are corrected by $\Delta K_p$, $\Delta T_i$, $\Delta T_d$ repeatedly.

In this case, the parameter tuning system 5 equipped with the on-line learning function also stores the data in the course of the tuning and corrects the tuning function F(z) by using these data through on-line learning. Namely, the parameter tuning system 5 performs learning by using, as learning teacher data, the control parameters $K_p^*$, $T_i^*$, $T_d^*$ at the time of achievement of the desired control response and, as the learning input data, the time-series signals of the input/output variables of the combined controlling-controlled system, said time-series signals having been received in the course of the tuning.

Figure 23A:
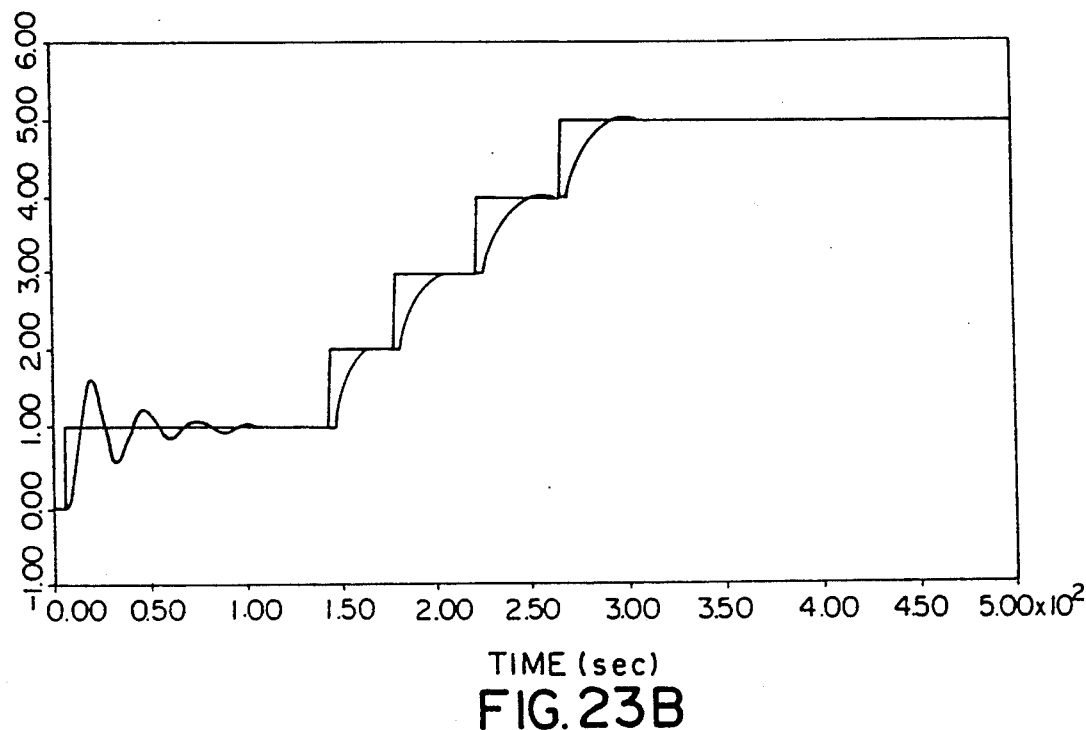
FIG. 23A and FIG. 23B are waveform diagrams showing results of simulations conducted using a simulator of a tuning rule learning system, respectively.
Figure 23B:
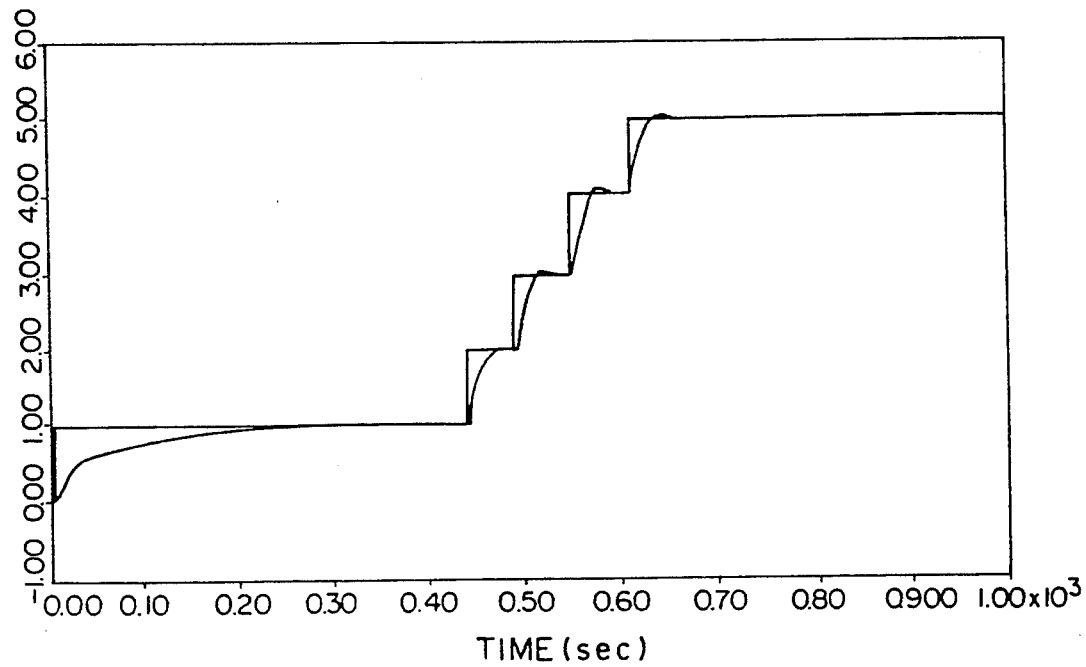

FIG. 23A and FIG. 23B show the results of simulations in which the above-described on-line tuning was conducted using simulators such as those illustrated in FIG. 18 instead of the actual combined controlling-controlled system.

As is envisaged from these figures, the on-line tuning by the above-described embodiment can achieve tuning to give a desired response through only one or two trials no matter whether a large overshoot is contained in an initial control response as shown in FIG. 23A or an initial control response is in an overdamped state as depicted in FIG. 23B.

Figure 24A:
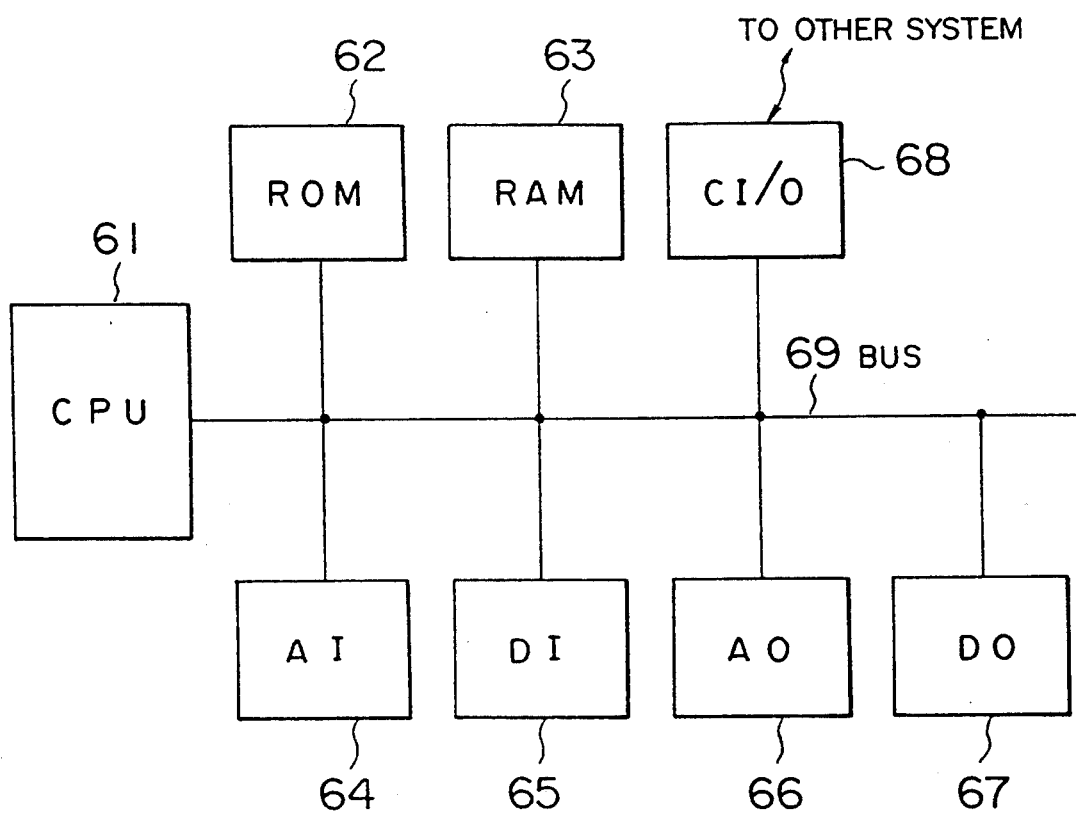
FIG. 24A and FIG. 24B are block diagrams of the system constructions of hardware which can be used to construct systems for each example of the invention, respectively.

FIG. 24A shows one example of a hardware system construction which can make up various systems in each of the embodiments described above and other embodiments to be described subsequently, such as the tuning rule learning system 4, the parameter tuning system 3, the parameter tuning system 5 equipped with the on-line learning function, an inverse system model identification system 15, a controller 14, a model identification system 24, a controlled variable prediction system 25, and a prediction control system 22.

The hardware system shown in FIG. 24A is composed of a computing unit (CPU) 61 for realizing the function of each unit; a read only memory (ROM) 62 for storing fixed data to be processed by CPU 71, such as programs and coefficients; a read/write memory (RAM) 63 for temporarily storing the results of various computations, which are to be performed by CPU 61, and data making up a neural network; analog input unit (AI) 64 and digital input unit (DI) 65 for receiving data from the outside; analog output unit (AO) 66 and digital output unit (DO) 67 for outputting data to the outside; and a communication interface (CI/O) 68 for performing communication with other systems.

Individual units such as CPU 61, ROM 62 and RAM 63 are connected to one another via an internal bus (BUS) 69. Each signal from the combined controlling-controlled system is inputted via AI 64 or DI 65. On the other hand, each control parameter is outputted to the controller via AO 66 or DO 67.

Although not shown in the figure, an input device for inputting instructions or the like from an operator, such as a keyboard, a display for indicating the details of processing or the like, a printer for outputting and printing the results of the processing or the like, etc. can be connected to the above hardware system as needed.

For example, the display can show such response waveforms as depicted in FIGS. 21A, 21B, 23A and 23B and can perform graphic display of the details learned by the neural network.

The above hardware system can make up the above-described systems independently. Needless to say, it is also possible to construct plural systems by a single hardware system.

It is also possible to construct simulators such as the simulators 41, 42 by using this hardware system.

Figure 24B:
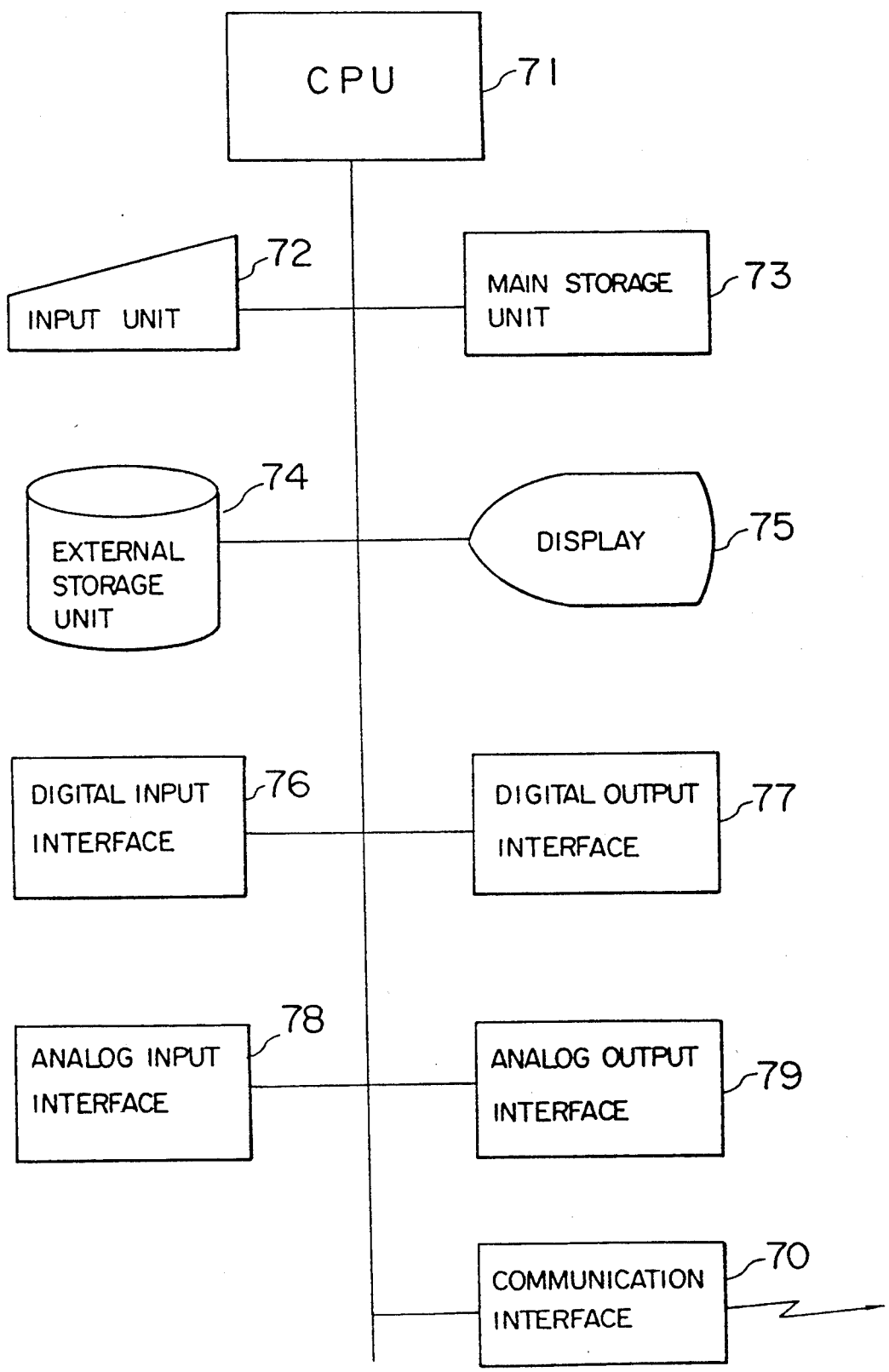

One example of a hardware system will now be described with reference to FIG. 24B.

The hardware system illustrated in the figure is equipped with a central processing unit (CPU) 71 capable of performing mass rapid processing; and input device 72, such as a keyboard; a main storage unit 73; an external storage unit 74; a digital input interface 76 for receiving input of digital data; an analog input interface 78 for converting analog data to digital data and receiving the latter; a digital output interface 77 for converting the results of processing to digital signals and outputting the latter; an analog output interface 79 for converting digital data to analog signals and outputting the latter; and a communication interface 70.

The external storage unit 74 is constructed, for example, by a magnetic disk unit, and is employed to store programs such as a control program for CPU 71, a program for describing various algorithms to be employed in this invention and programs for constructing neural networks, simulators and the like, and various groups of data such as weighting factors of the neural networks. Parts of these programs and data are stored in the main storage unit 73.

A description will next be made of various embodiments other than those described above, to which the present invention can also be applied. The embodiments to be described below can be used either independently or in combination. They can also be used in combination with one or more of the above-described embodiments.

The specific construction, operation and advantages of each of the following embodiments will be understood easily in view of the description of the above embodiments. Their detailed description are therefore omitted herein to avoid superfluous repetition.

The above embodiments were described using a PID controller, which had the transfer function represented by equation (1), as a controller by way of example. It is to be noted that the present invention is not limited to the use of such a PID controller but is also applicable to cases where a controller of a different type is used. Examples of such different controllers will hereinafter be described.

Firstly, this invention can be applied when a PI (proportional plus integral) controller having a transfer function $G_c(s)$ represented by the following equation is used:

$$G_c(s) = K_p\left(1 + \frac{1}{T_i s}\right) \tag{32}$$

Secondly, this invention can also be applied when either one of I-PD controller and I-P controller whose characteristics are represented by the following equations, respectively, is used:

$$x(s) = \frac{K_i}{s}\{r(s) - y(s)\} + (K_p + K_d s)y(s) \tag{33}$$

where
  $x(s)$: manipulated variable,
  $r(s)$: desired value,
  $y(s)$: controlled variable,
  $K_i$: integral gain,
  $K_p$: proportional gain, and
  $K_d$: derivative gain.

$$x(s) = \frac{K_i}{s}\{r(s) - y(s)\} + K_p \cdot y(s) \tag{34}$$

Figure 6:
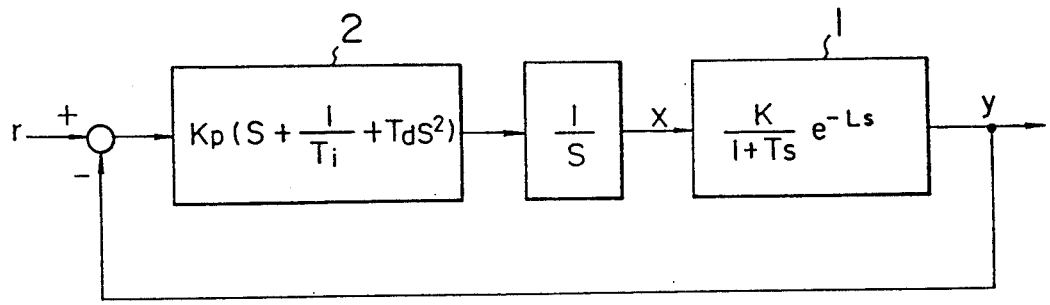
FIG. 6 and FIG. 7 are block diagrams of other exemplary control models useful in the practice of the invention, respectively.
Figure 7:
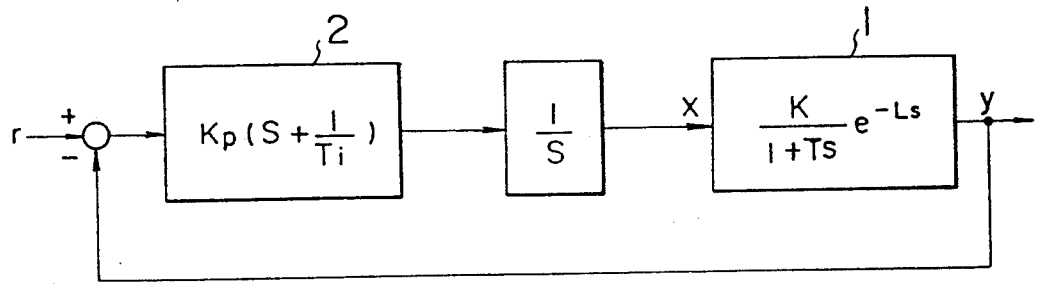

Thirdly, although the above embodiments were described using as the controller 2 a position-type PID controller represented by the equation (1), the present invention can also be applied when a velocity-type PID controller or a velocity-type PI controller is employed as shown in FIGS. 6 or 7.

Fourthly, although the above embodiments were described using as the controller 2 a continuous-time PID controller as represented by equation (2), this invention can also be applied when a discrete-time controller such as either one of discrete-time PID controller and discrete-time PI controller represented by the following equations, respectively, is employed:

$$u(t+1) = K_p\{r(t+1) - y(t+1)\} + \tag{35}$$
$$K_i \sum_{i=0}^{t+1}\{r(i) - y(i)\} + K_d[\{r(t+1) - y(t+1)\} - \{r(t) - y(t)\}]$$

(Position-type PID)

where
  $K_p$: proportional gain,
  $K_i$: integral gain, and
  $K_d$: derivative gain.

$$u(t+1) = u(t) + K_p[\{r(t+1) - y(t+1)\} - \{r(t) - y(t)\}] + \tag{36}$$
$$K_i\{r(t+1) - y(t+1)\} + K_d[\{r(t+1) - y(t+1)\} - 2\{r(t) - y(t)\} + \{r(t-1) - y(t-1)\}]$$

(Velocity-type PID)

$$u(t+1) = K_p\{r(t+1) - y(t+1)\} + K_i \sum_{i=0}^{t+1}\{r(i) - y(i)\} \tag{37}$$

(Position-type PI)

$$u(t+1) = u(t) + K_p[\{r(t+1) - y(t+1)\} - \{r(t) - y(t)\}] + K_i\{r(t+1) - y(t+1)\} \tag{38}$$

(Velocity-type PI)

Namely, this invention is not limited to the use of a continuous-time position-type PID controller as the controller 2 but is also applicable when controllers of various types are used.

In the above embodiments, the description was made with respect to the case in which the transfer function of the controlled system was successfully approximated by the first-order lag+dead time system. This invention is however not limited to such cases but is applicable to other controlled systems having a transfer function different from that mentioned above. Examples of such other controlled systems will hereinafter be described.

Firstly, the present invention can also be applied when a controlled system can be approximated by a second-order lag+dead time system represented by the following transfer function $G_p(s)$:

$$G_p(s) = \frac{K}{(1 + T_1 s)(1 + T_2 s)} e^{-Ls} \quad (39)$$

wherein $T_1, T_2$: damping time constants.

Secondly, this invention can also be applied when a controlled system can be approximated by either one of integral+dead time system and integral+first-order lag+dead time system represented by the following equations $G_p(s)$, respectively:

$$G_p(s) = \frac{K}{s} e^{-Ls} \quad (40)$$

$$G_p(s) = \frac{K}{s(1 + T_s)} e^{-Ls} \quad (41)$$

Namely, this invention is not limited to cases in each of which the transfer function of the controlled system can be approximated by a first-order lag+dead time system but can also be applied cases in which the controlled systems can be approximated by various types of transfer functions, respectively.

The above embodiments were each described using, as input signals to the neural network, time-series signals Z which were absolute values of the input/output variable of the controlled system as represented by equation (8). The present invention is however not limited to such input signals but can also be applied when time-series signals of a different type are used.

Firstly, this invention can also be applied when time-series signals of changes of an input/output variable of a controlled system are used as shown by the following equation:

$$\begin{bmatrix} v_1(1) \\ v_2(1) \\ \cdot \\ \cdot \\ \cdot \\ v_{L'+1}(1) \\ v_{L'+2}(1) \\ v_{L'+3}(1) \\ \cdot \\ \cdot \\ \cdot \\ v_{2L'-2}(1) \end{bmatrix} = \begin{bmatrix} y(t) - y(t-1) \\ y(t-1) - y(t-2) \\ \cdot \\ \cdot \\ \cdot \\ y(t-L') - y(t-L'-1) \\ x(t) - x(t-1) \\ x(t-1) - x(t-2) \\ \cdot \\ \cdot \\ \cdot \\ x(t-L') - x(t-L'-1) \end{bmatrix} \quad (42)$$

Secondly, this invention can also be applied when, as input signals to a neural network, a desired value and time-series signals of an input/output variable of a controlled system are used as represented by the following equation:

$$\begin{bmatrix} v_1(1) \\ v_2(1) \\ \cdot \\ \cdot \\ \cdot \\ v_{L'+1}(1) \\ v_{L'2}(1) \\ v_{L'+3}(1) \\ \cdot \\ \cdot \\ \cdot \\ v_{2L'+2}(1) \\ v_{2L'+3}(1) \\ v_{2L'+4}(1) \\ \cdot \\ \cdot \\ \cdot \\ v_{3L'+3}(1) \end{bmatrix} = \begin{bmatrix} r(t) \\ r(t-1) \\ \cdot \\ \cdot \\ \cdot \\ r(t-L') \\ y(t) \\ y(t-1) \\ \cdot \\ \cdot \\ \cdot \\ y(t-L') \\ x(t) \\ x(t-1) \\ \cdot \\ \cdot \\ \cdot \\ x(t-L') \end{bmatrix} \quad (43)$$

Thirdly, this invention can also be applied when, as input signals to a neural network, time-series signals of the control deviation and an input/output variable of a controlled system are used as represented by the following equation:

$$\begin{bmatrix} v_1(1) \\ v_2(1) \\ \cdot \\ \cdot \\ \cdot \\ v_{L'+1}(1) \\ v_{L'+2}(1) \\ v_{L'+3}(1) \\ \cdot \\ \cdot \\ \cdot \\ v_{2L'+2}(1) \\ v_{2L'+3}(1) \\ v_{2L'+4}(1) \\ \cdot \\ \cdot \\ \cdot \\ v_{3L'+3}(1) \end{bmatrix} = \begin{bmatrix} r(t) - y(t) \\ r(t-1) - y(t-1) \\ \cdot \\ \cdot \\ \cdot \\ r(t-L') - y(t-L') \\ y(t) \\ y(t-1) \\ \cdot \\ \cdot \\ \cdot \\ y(t-L') \\ x(t) \\ x(t-1) \\ \cdot \\ \cdot \\ \cdot \\ x(t-L') \end{bmatrix} \quad (44)$$

Namely, the present invention can be applied when, as input signals to a neural network, one or more suitable variables are selected from input/output variables of a combined controlling-controlled system and time-series signals of their absolute values or changes are used.

Fourthly, this invention can also be applied when, as input signals to a neural network, the control parameters $K_p, T_i, T_d$ of a controller and time-series signals of an input/output variable of a controlled system are used as represented by the following equation:

$$\begin{bmatrix} v_1(1) \\ v_2(1) \\ v_3(1) \\ v_4(1) \\ v_5(1) \\ \cdot \\ \cdot \\ \cdot \\ v_{L'+4}(1) \\ v_{L'+5}(1) \\ v_{L'+6}(1) \\ \cdot \\ \cdot \\ \cdot \\ v_{2L'+5}(1) \end{bmatrix} = \begin{bmatrix} K_p \\ T_i \\ T_d \\ y(t) \\ y(t-1) \\ \cdot \\ \cdot \\ \cdot \\ y(t-L') \\ x(t) \\ x(t-1) \\ \cdot \\ \cdot \\ x(t-L') \end{bmatrix} \quad (45)$$

Fifthly, this invention can also be applied when, as input signals to a neural network, the control parameters $K_p, T_i, T_d$ of a controller, a desired value and time-series signals of an input/output variable of a controlled system are employed as shown by the following equation:

$$\begin{bmatrix} v_1(1) \\ v_2(1) \\ v_3(1) \\ v_4(1) \\ v_5(1) \\ \cdot \\ \cdot \\ v_{L'+4}(1) \\ v_{L'+5}(1) \\ v_{L'+6}(1) \\ \cdot \\ \cdot \\ v_{2L'+5}(1) \\ v_{2L'+6}(1) \\ v_{2L'+7}(1) \\ \cdot \\ \cdot \\ v_{3L'+6}(1) \end{bmatrix} = \begin{bmatrix} K_p \\ T_i \\ T_d \\ r(t) \\ r(t-1) \\ \cdot \\ \cdot \\ r(t-L') \\ y(t) \\ y(t-1) \\ \cdot \\ \cdot \\ y(t-L') \\ x(t) \\ x(t-1) \\ \cdot \\ \cdot \\ x(t-L') \end{bmatrix} \quad (46)$$

Sixthly, this invention can also be applied when, as input signals to a neural network, the control parameters $K_p, T_i, T_d$ of a controller, a control deviation and time-series signals of an input/output variable of a controlled system are employed as shown by the following equation:

$$\begin{bmatrix} v_1(1) \\ v_2(1) \\ v_3(1) \\ v_4(1) \\ v_5(1) \\ \cdot \\ \cdot \\ v_{L'+4}(1) \\ v_{L'+5}(1) \\ v_{L'+6}(1) \\ \cdot \\ \cdot \\ v_{2L'+5}(1) \\ v_{2L'+6}(1) \\ v_{2L'+7}(1) \\ \cdot \\ \cdot \\ v_{3L'+6}(1) \end{bmatrix} = \begin{bmatrix} K_p \\ T_i \\ T_d \\ r(t) - y(t) \\ r(t-1) - y(t-1) \\ \cdot \\ \cdot \\ r(t-L') - (t-L') \\ y(t) \\ y(t-1) \\ \cdot \\ \cdot \\ y(t-L') \\ x(t) \\ x(t-1) \\ \cdot \\ \cdot \\ x(t-L') \end{bmatrix} \quad (47)$$

Namely, the present invention can also be applied when, as input signals to a neural network, suitable variables are selected out of input/output variables of a combined controlling-controlled system and time-series signals of their absolute values or changes and control parameters of the controller 2 are used.

In the above embodiments, the description was made with respect to the case in which absolute values of the control parameters $K_p, T_i, T_d$ of the controller 2 are used as output signals from the neural network as indicated by equation (9). This invention is however not limited to the above embodiments but is also applicable to cases in which outputs are made in other forms. Examples of such cases will hereinafter be described.

Firstly, the present invention can also be applied when changes of the control parameters $K_p, T_i, T_d$ of the controller 2 are used as indicated by the following equation:

$$\begin{bmatrix} v_1(m) \\ v_2(m) \\ v_3(m) \end{bmatrix} = \begin{bmatrix} \Delta K_p \\ \Delta T_i \\ \Delta T_d \end{bmatrix} \quad (48)$$

In this case, the control parameters $K_p, T_i, T_d$ can be determined by the following equations:

$$\begin{aligned} K_p(t) &= K_p(t-1) + \Delta K_p \\ T_i(t) &= T_i(t-1) + \Delta T_i \\ T_d(t) &= T_d(t-1) + \Delta T_d \end{aligned} \quad (49)$$

Seventhly, this invention can also be applied when, as output signals from a neural network, correction ratios $C_p, C_i, C_d$ of the control parameters $K_p, T_i, T_d$ of the controller 2 are used as indicated by the following equation:

$$\begin{bmatrix} v_1(m) \\ v_2(m) \\ v_3(m) \end{bmatrix} = \begin{bmatrix} C_p \\ C_i \\ C_d \end{bmatrix} \quad (50)$$

In this case, the control parameters $K_p, T_i, T_d$ can be determined by the following equations:

$$K_p(t) = C_p \cdot K_p(t - 1) \quad (51)$$
$$T_i(t) = C_i \cdot T_i(t - 1)$$
$$T_d(t) = C_d \cdot T_d(t - 1)$$

Figure 8:
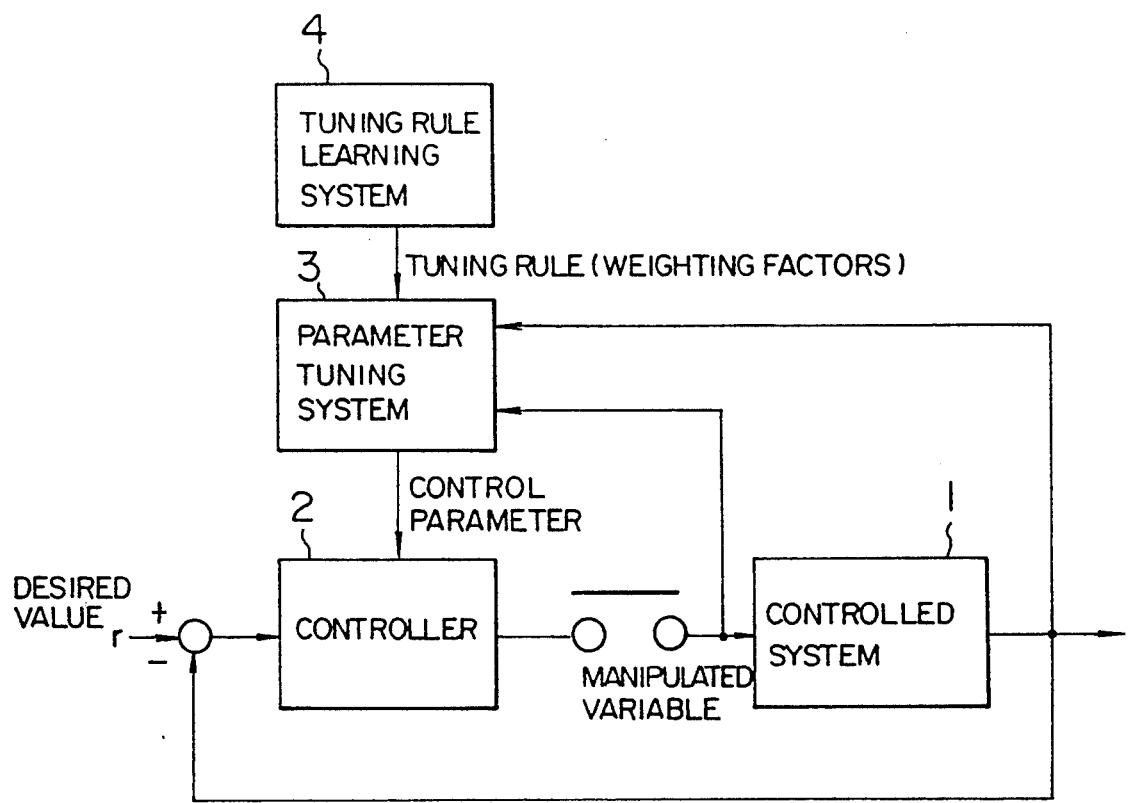
FIG. 8 is a block diagram of another embodiment of a combined controlling-controlled system, which is in the form of an open loop and is useful in the practice of the invention.

In the above embodiments, the description was made with respect to the case in which the combined controlling-controlled system was constructed as a closed loop as shown in FIG. 3. However, the present invention can also be applied when a combined controlling-controlled system is in the form of an open loop as illustrated in FIG. 8.

In this case, as input/output signals to/from a neural network, time-series signals of absolute values or changes of an input/output variable of the controlled system 1 are used as shown by equation (8) or (42). This permits tuning of control parameters even at the time of a trial operation of a process.

Figure 9:
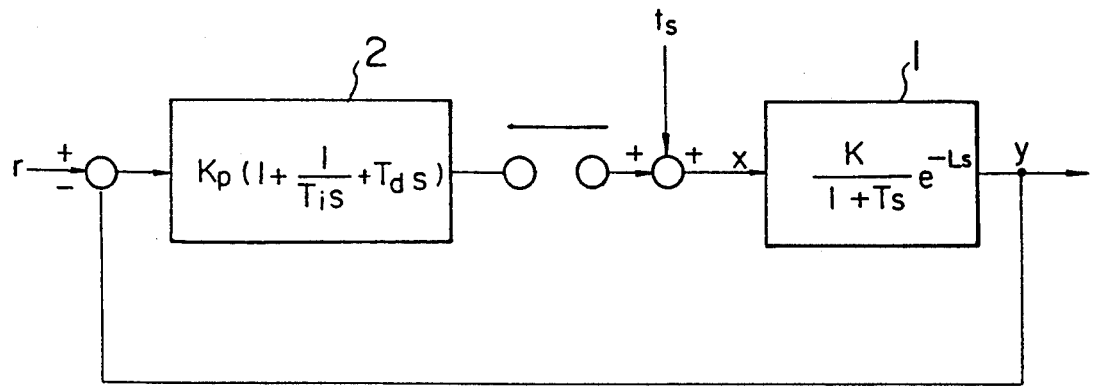
FIG. 9 is a block diagram of a control model which is in the form of an open loop.

When a controlled system is in the form of an open loop, learning input data z are obtained by a simulation making use of the open-loop combined controlling-controlled system model depicted in FIG. 9. On the other hand, learning teacher data are obtained in a similar manner to learning teacher data for a closed loop. Namely, using the parameters K,T,L of the controlled system 1 at the time of acquisition of the learning input data z, a time scale factor $\sigma$ is determined by equation (30) or (31). Substitution of $\sigma$ into equations (27), (28) and (29) gives control parameters $K_p, K_i, T_d$. These control parameters are $K_p, K_i, T_d$ are then used as learning teacher signals.

Figure 10:
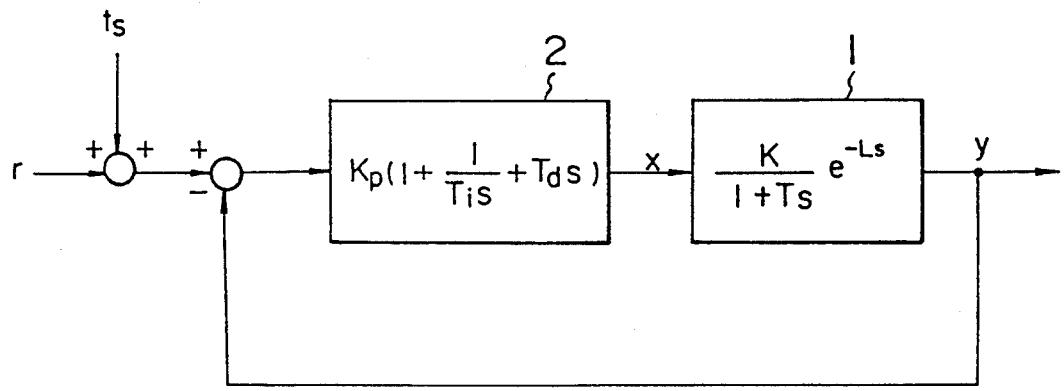
FIG. 10 is a block diagram depicting superposition of a test signal onto a desired value in the control model of FIG. 4.
Figure 11:
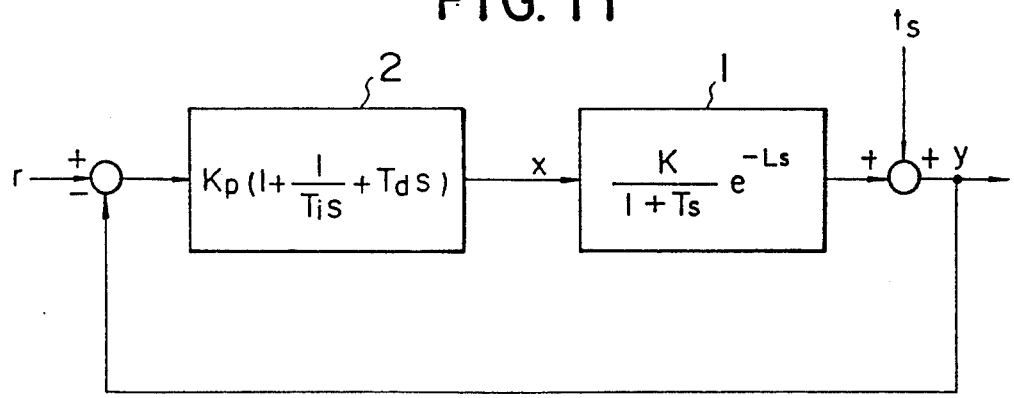
FIG. 11 is a block diagram showing superposition of a test signal onto a manipulated variable in the combined controlling-controlled system of FIG. 4.
Figure 12:
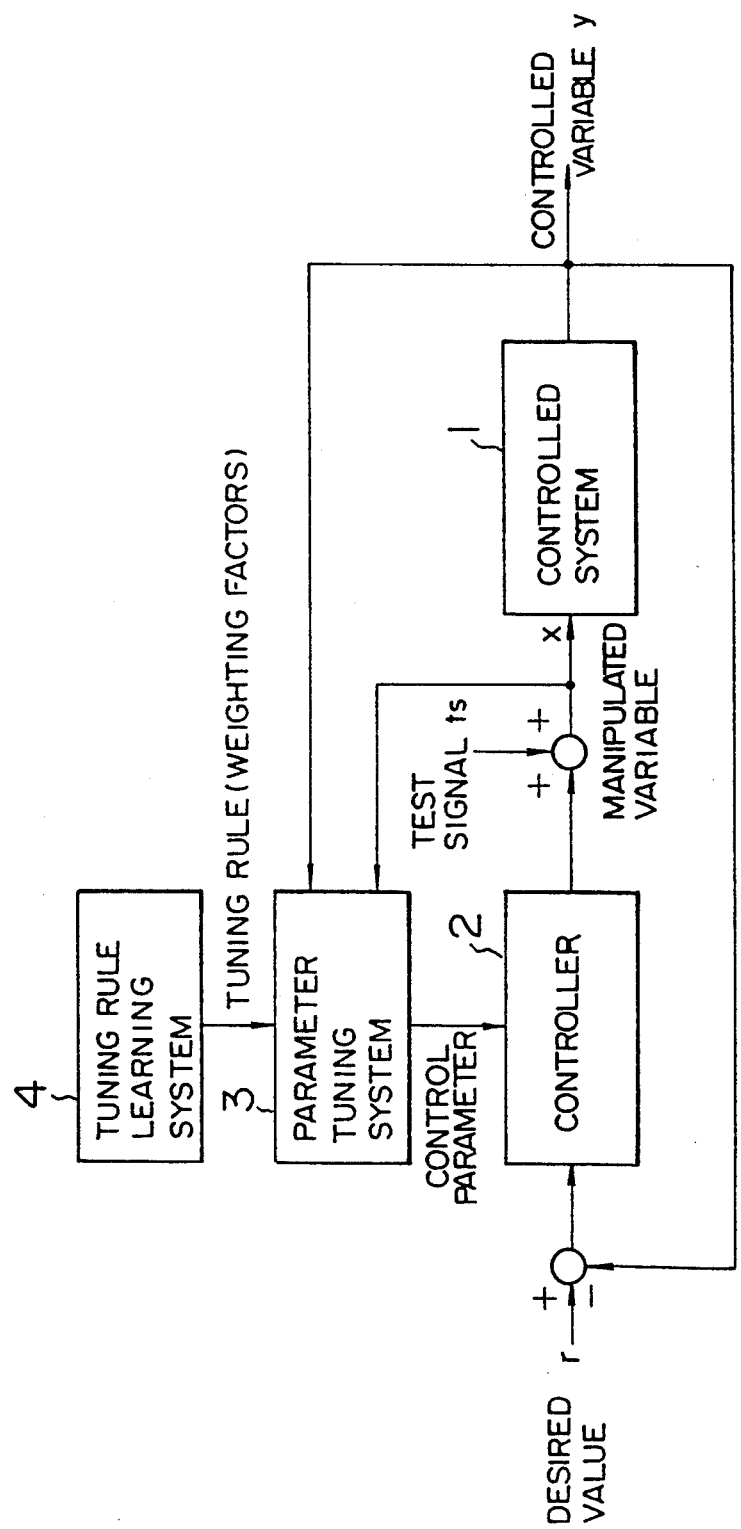
FIG. 12, FIG. 13 and FIG. 14 are block diagrams of illustrative systems useful for the superposition of a test signal, respectively.
Figure 13:
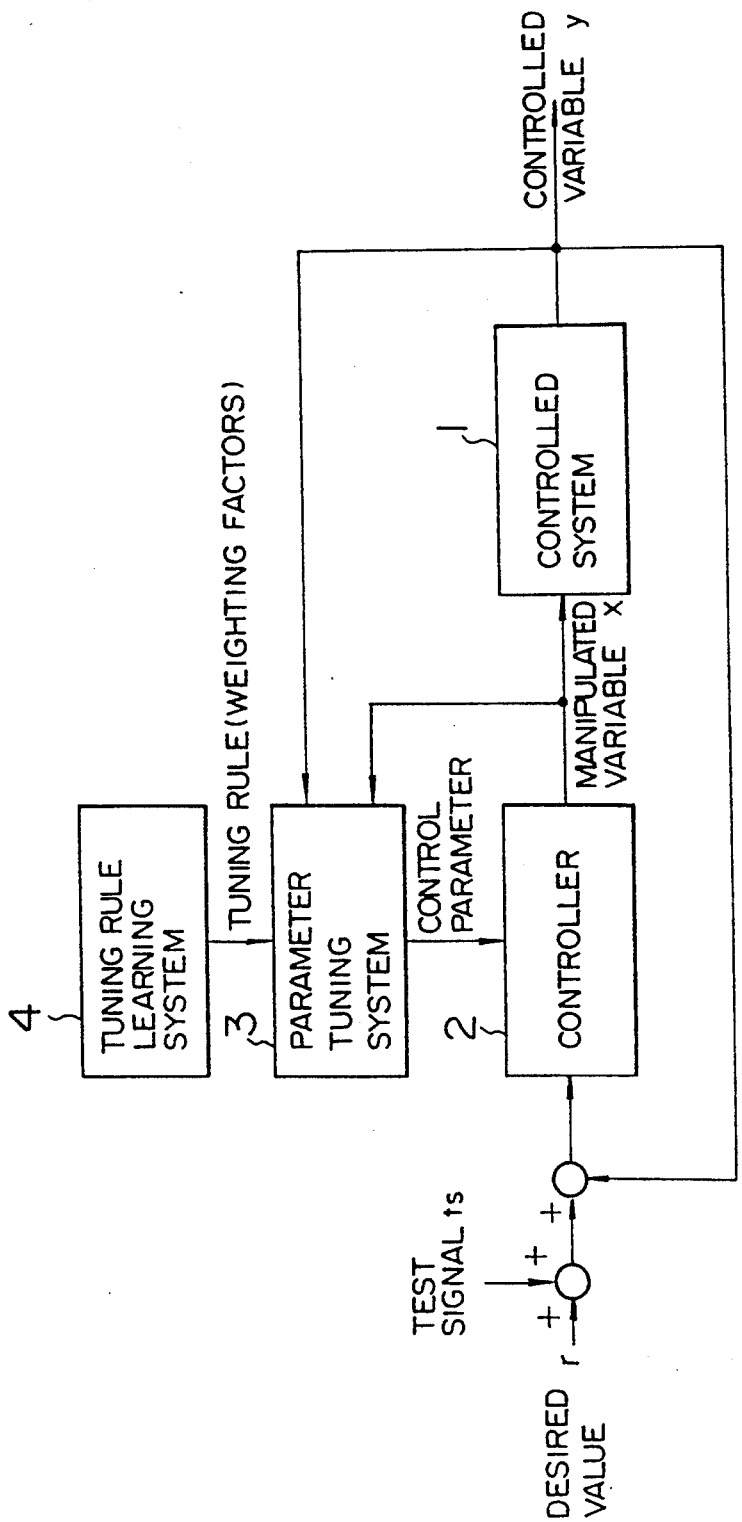

In the above embodiments, the description was made with respect to the case in which, upon determination of the learning input data by the simulation, the test signal $t_s$ was superposed onto the manipulated variable as shown in FIG. 5. However, this invention can also be applied when the test signal $t_s$ is superposed onto a desired value or a controlled variable as depicted in FIG. 10 or 11. Incidentally, one of various signals such as quasi-random signals, sinusoidal signals, step signals and ramp signals can be used as the test signal $t_s$.

Figure 14:
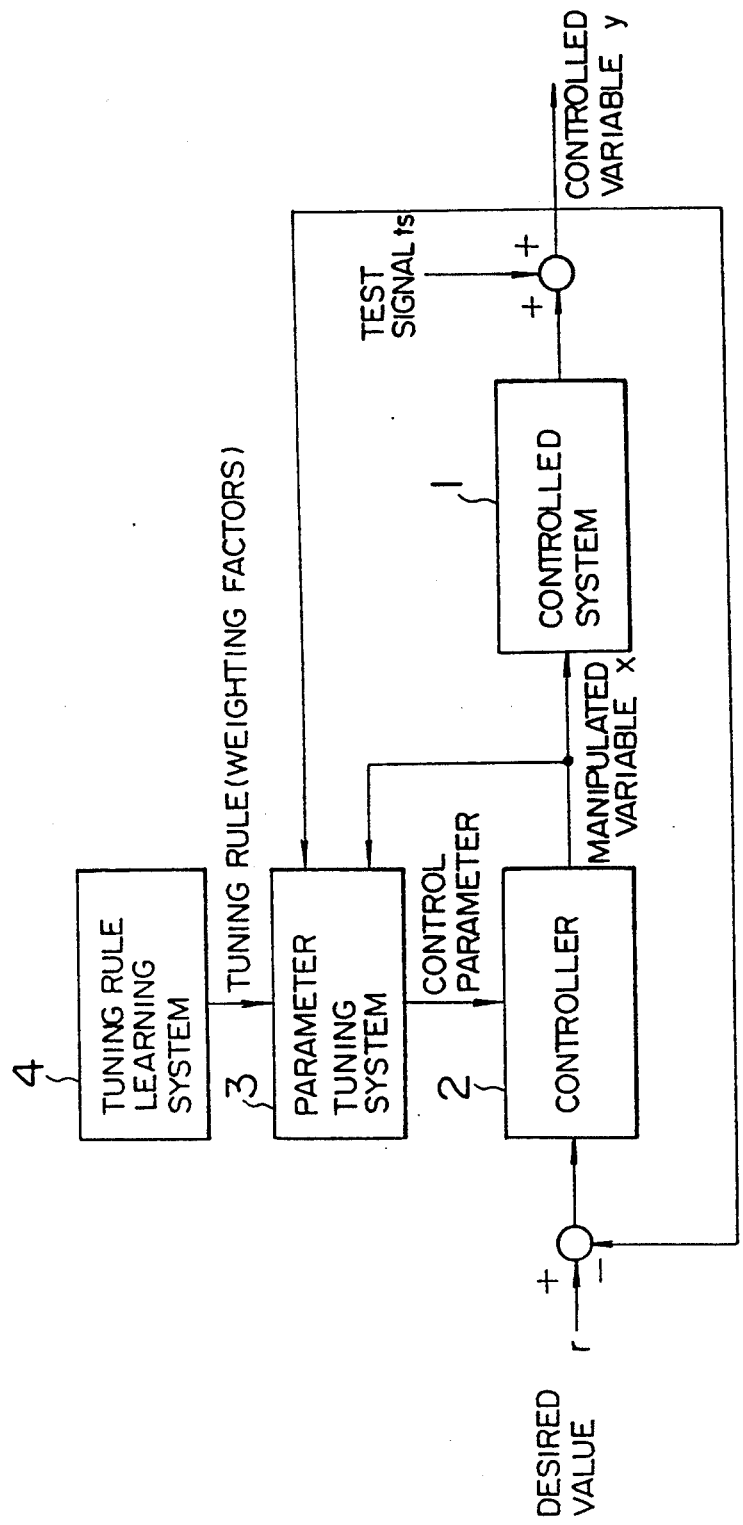
Figure 16:
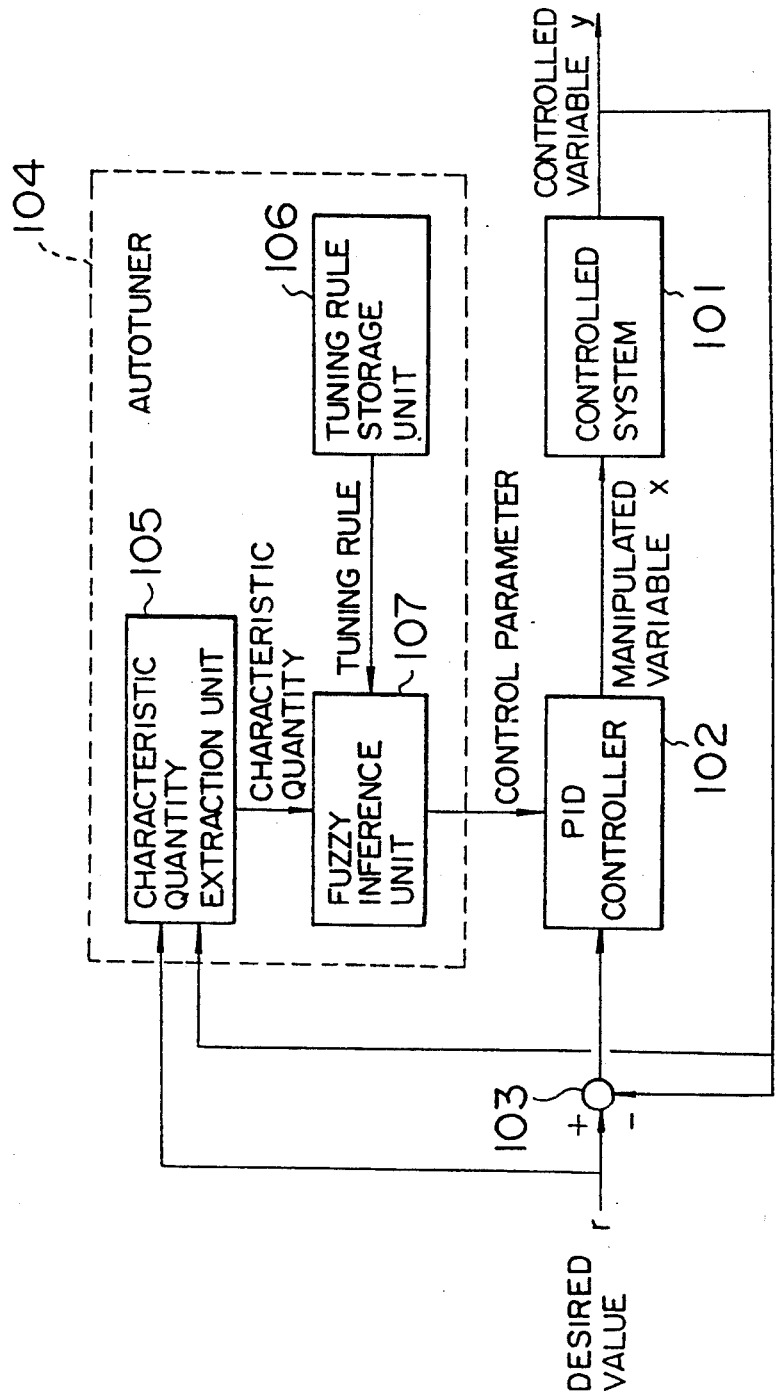
FIG. 16 is a block diagram depicting tuning of a control parameter by a conventional autotuner.
Figure 17:
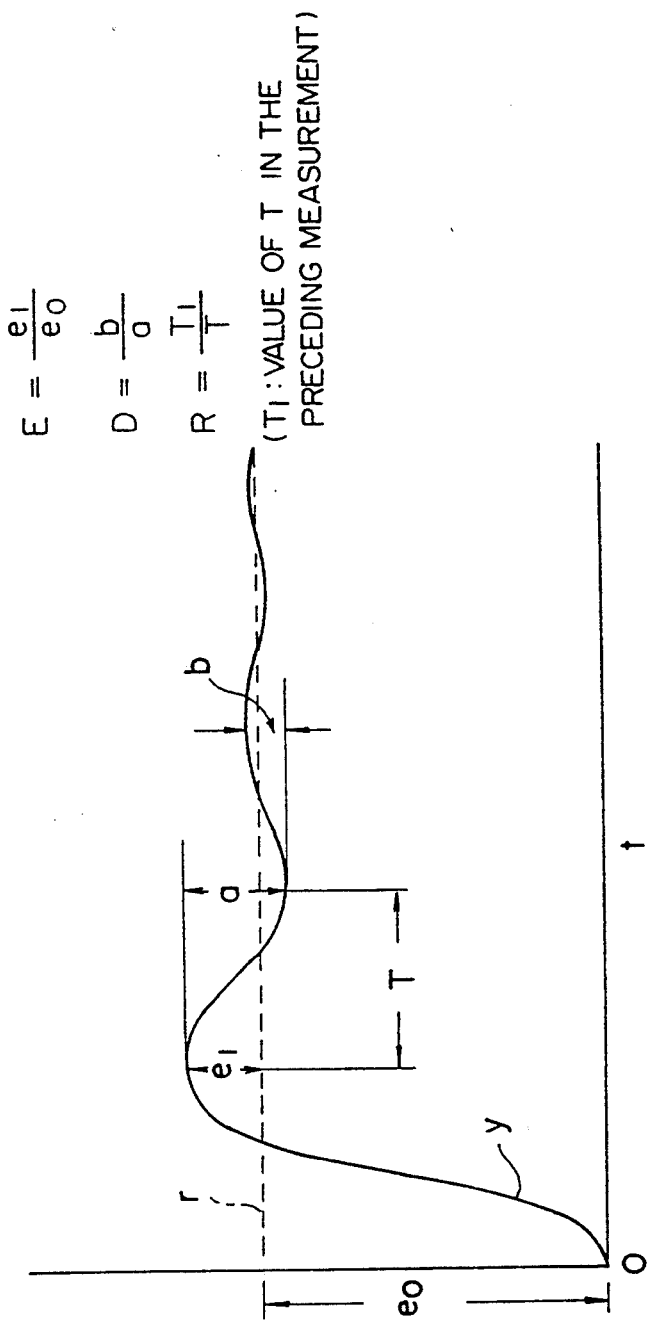
FIG. 17 diagrammatically shows a response waveform of a characteristic quantity when a desired value is changed stepwise.

In the above embodiments, the description was made with respect to the case in which, upon tuning the control parameters of the controller 2, the operation data of the controlled system 1 were used as shown in FIG. 3. This invention can also be applied when a test signal $t_s$ is superposed onto a manipulated variable, a desired value or a controlled variable as shown in FIG. 14, 15 or 16. Incidentally, one of various signals such as quasi-random signals, sinusoidal signals, step signals and ramp signals can be used as the test signal $t_s$.

In the above embodiments, the description was made with respect to the case in which, upon learning the tuning rule for the control parameters, the partial model matching method was used to prepare the teacher data and the Kitamori model was employed as the reference model therefor. This invention is however not limited to the use of the Kitamori model as a reference model but is also applicable when various reference models are used. Examples of other reference models are shown in FIG. 15.

In the above embodiments, the description was made with respect to the case in which, upon learning the tuning rule for the control parameters, the partial model matching method was used to prepare the teacher data. The present invention is however not limited to the use of this method but can also be applied when one of various tuning methods [see Masami Masubuchi: "Kaitei Jidoseigyo Kiso Riron (Fundamental Theorems of Contemporary Automatic Control), Coronasha, June, 1977], for example, such as (1) the Ziegler-Nichols method or (2) the Chien-Hrones-Reswick method is used.

In the above embodiments, the description was made with respect to the case in which one type of a PID controller represented by equation (1) was used as the controller 2. However, the present invention can also be applied when various controllers such as PI controller, I-PD controller and I-P controller and tuning rules therefor are provided and one controller and its corresponding tuning rule are selected for use from these controllers and tuning rules.

Here, the selection can be made by (1) a method in which tuning rules for various controllers are provided as discrete weighting factors in correspondence to the controllers or by (2) another method in which tuning rules for various controllers are provided using a single type of weighting factors. In the latter method, as input signals to a neural network, a variable $C_T$ indicating the type of a selected controller and time-series signals of an input/output variable of a controlled system are used as shown by the following equation:

$$\begin{bmatrix} v_1(1) \\ v_2(1) \\ v_3(1) \\ \vdots \\ v_{L'+2}(1) \\ v_{L'+3}(1) \\ v_{L'+4}(1) \\ \vdots \\ v_{2L'+3}(1) \end{bmatrix} = \begin{bmatrix} C_T \\ y(t) \\ y(t-1) \\ \vdots \\ y(t-L') \\ x(t) \\ x(t-1) \\ \vdots \\ x(t-L') \end{bmatrix} \quad (52)$$

In the above embodiments, the description was made primarily with respect to the case in which, upon learning the tuning rule for the control parameters, the partial model matching method was used for the preparation of the teacher data and the Kitamori model whose overshoot and damping ratio, characteristic quantities of its response waveform, were fixed was used as the reference model for the partial model matching method. This invention is however not limited to the above case but can also be used when a reference model having a response waveform whose characteristic quantities, such as overshoot and damping ratio, are variable is employed and the characteristic quantities of the response waveform, such as overshoot and damping ratio, can be specified upon tuning the control parameters.

Here, there is (1) a method in which the tuning rule for the controller can be provided as discrete weighting factors in correspondence to various overshoots, damping ratios and the like or (2) another method in which the tuning rule for the controller can be provided by dealing with various overshoots, damping ratios and the like on the basis of a single kind of weighting factors. In the latter method, as input signals to a neural network, variables O,A designating the overshoot, damping ratio and the like and time-series signals of an input/output variable of a controlled system are used as shown by the following equation:

$$\begin{bmatrix} v_1(1) \\ v_2(1) \\ v_3(1) \\ v_4(1) \\ \vdots \\ v_{L'+3}(1) \\ v_{L'+4}(1) \\ v_{L'+5}(1) \\ \vdots \\ v_{2L'+4}(1) \end{bmatrix} = \begin{bmatrix} O \\ A \\ y(t) \\ y(t-1) \\ \vdots \\ y(t-L') \\ x(t) \\ x(t-1) \\ \vdots \\ x(t-L') \end{bmatrix} \qquad (53)$$

In the above embodiments, the description was made with respect to the case in which the controlled system 1 was a single-input/single-output system capable of being approximated by a first-order lag+dead time system. This invention can also be applied when the controlled system 1 is a multiple-input/multiple-output system. In this case, tuning rules are provided corresponding to controllers for multiple-input/multiple-output systems such as various chemical plants and boilers and a suitable tuning rule is selected from these tuning rules.

In the above embodiments, the description was made with respect to the case in which the learning input data were obtained by simulation. This invention can also be applied when, out of time responses (operation data) of various characteristics from a combined controlling-controlled system of a plant, the time responses of good characteristics are recorded and time-series signals of an input/output variable of the combined controlling-controlled system, said signals being available from the last-mentioned time responses, are used as learning input data, and control parameters corresponding to the time responses of good characteristics are recorded and a neural network is caused to learn using the parameters as learning teacher data.

In the above embodiments, time-series signals of an input/output variable of a combined controlling-controlled system are received and parameters of a controller are tuned by a neural network on the basis of these signals. A description will hereinafter be made of a further embodiment in which characteristic quantities of a combined controlling-controlled system are extracted and parameters of a controller are tuned by a neural network on the basis of these signals.

Although the basic construction of this embodiment is similar to that described above with reference to FIG. 1, there are differences in the internal functions of the tuning rule learning system 4 and parameter tuning system 3. This embodiment will therefore be described, focusing upon these differences.

Figure 25:
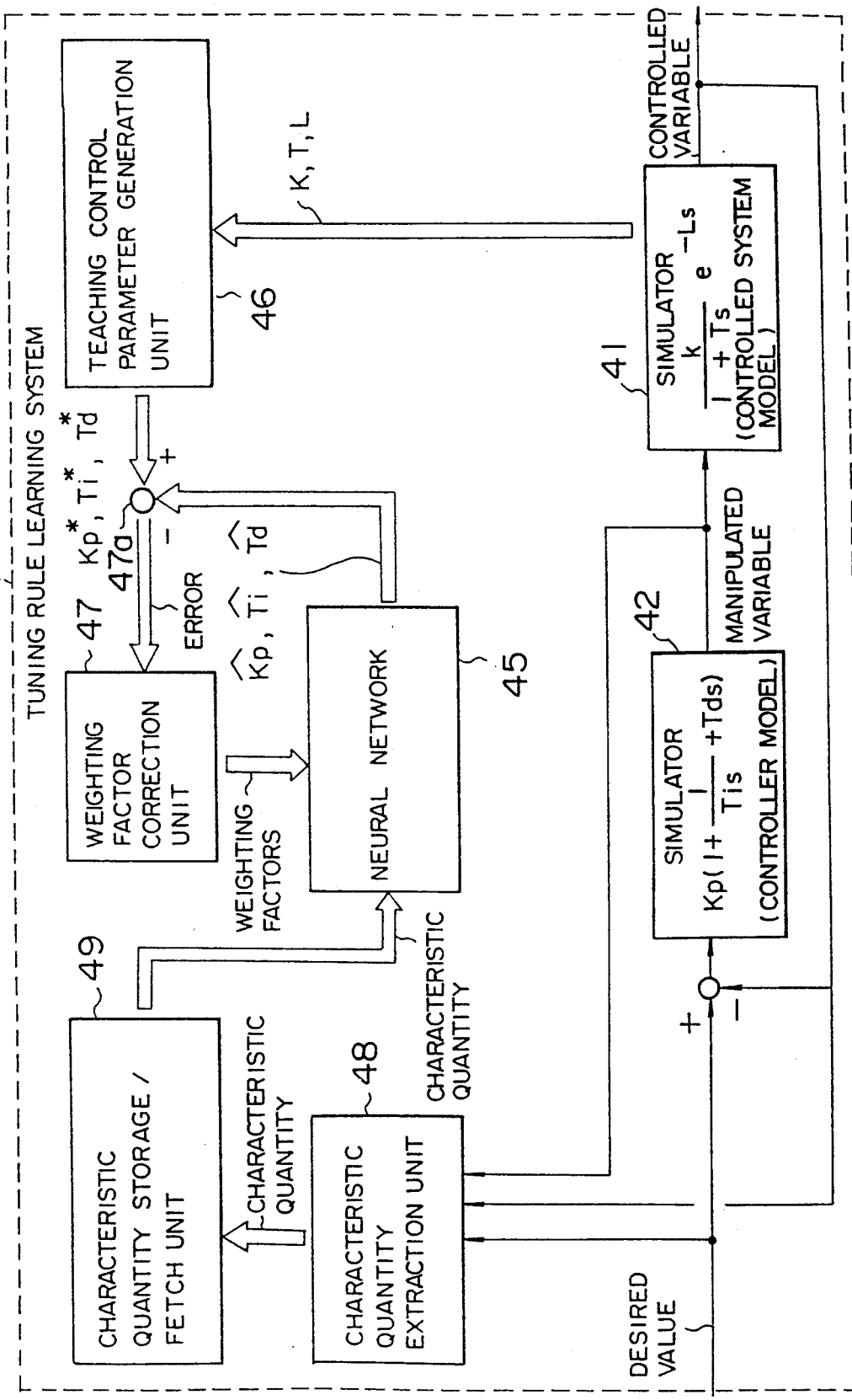
FIG. 25 is a block diagram showing an illustrative functional construction of a tuning rule learning system which is used when tuning of a control parameter is conducted using a characteristic quantity.

One example of the functional construction of the tuning rule learning system 4 employed in this embodiment is illustrated in FIG. 25. Including the system to be described subsequently with reference to FIG. 27, a system, for example, similar to that described above with reference to FIG. 24A or FIG. 24B can be used as a hardware system for constructing such systems.

The tuning rule learning system 4 of the present embodiment has simulators 41,42 which model the controlled system 1 and controller 2 illustrated in FIG. 4. The models of these simulators 41,42 are however not limited to those depicted in FIG. 4 but the other models already described above can also be used.

The learning system 4 also has a characteristic quantity extraction unit 48 for receiving a manipulated variable and a controlled variable, both, corresponding to a desired value from these simulators 41,42 and extracting their characteristic quantities and a characteristic quantity storage/fetch unit 49 for storing the characteristic quantities so extracted and fetching and outputting them as needed. Also provided are a neural network 45 for estimating control parameters with respect to characteristic quantities from the characteristic quantity storage/fetch unit 49 in accordance with their respective weighting factors, a teaching control parameter generation unit 46 for calculating teaching control parameters $K_p^*, T_i^*, T_d^*$ based on characteristics (K,T,L) of the controlled system model (simulator 41), storing the results and taking them out as needed, an error computing unit 47a for determining errors between the above teaching control parameters and the corresponding parameters estimated by the neural network 45, and a weighting factor correction unit 47 for performing correction of the weighting factors on the basis of the errors and setting the thus-corrected weighting factors in the neural network 45.

The present embodiment is similar in construction to the learning system 4 described above with reference to FIG. 18 except that input signals to the neural network 45 are not time-series signals of input/output variables but are characteristic quantities. Accordingly, the learning operation of a tuning rule is similar to that carried out by the system shown in FIG. 18. Further, modifications such as superposition of a test signal $t_s$ are also similar and their description is not repeated herein.

Figure 26:
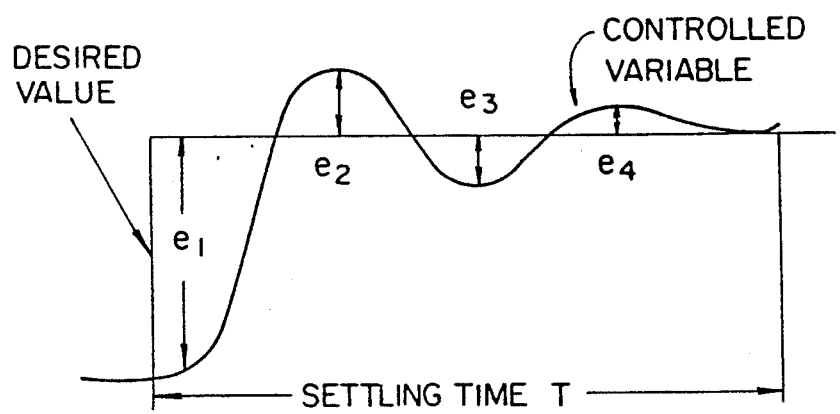
FIG. 26 diagrammatically depicts an illustrative response waveform useful for the extraction of the characteristic quantity which is used in the tuning rule learning system.

Characteristic quantities which can be used here include, for example, overshoot E, damping ratio D and settling time ratio R as illustrated in FIG. 26.

Figure 27:
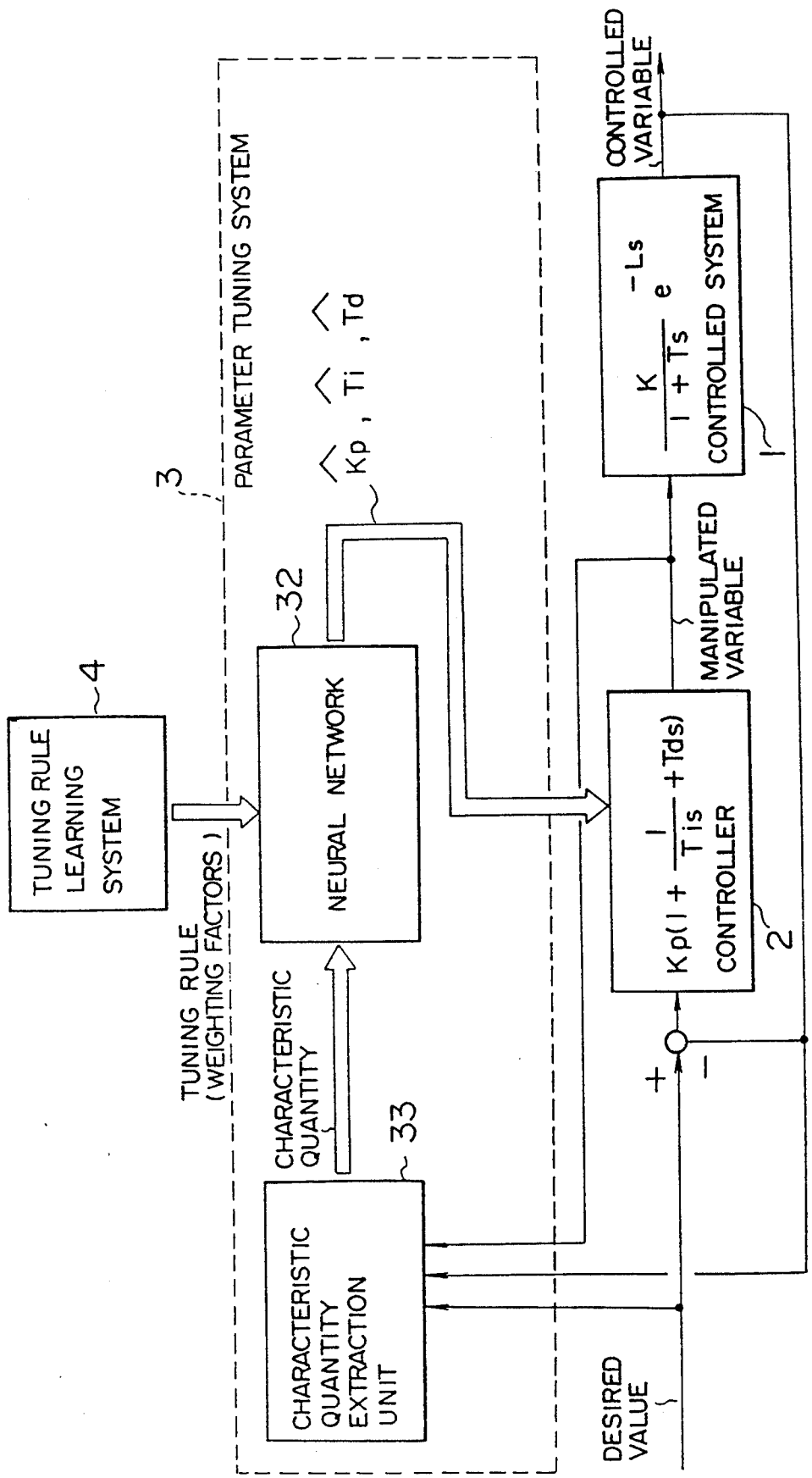
FIG. 27 is a block diagram illustrating one embodiment of the functional construction of a parameter tuning system which is usable when tuning of a control parameter is conducted using a characteristic quantity.

Next, one example of the functional construction of the parameter tuning system 3 useful in the present invention is shown in FIG. 27.

As is illustrated in FIG. 27, the parameter tuning system 3 has, as principal functional units, a characteristic quantity extraction unit 33 for receiving a manipulated variable and a controlled variable from the controlled system 1 and controller 2 making up an actual combined controlling-controlled system, said variables corresponding to a desired value, and outputting them as characteristic quantities, and a neural network 32 for estimating control parameters $(\hat{K}_p, \hat{T}_i, \hat{T}_d)$ on the basis of a tuning rule (weighting factors) preset by the tuning rule learning system 4.

As the neural network 32, it is possible to use the same neural network as the neural network 45 employed in the tuning rule learning system 4.

This embodiment has a construction similar to the parameter tuning system 3 described above with reference to FIG. 19 except that input signals to the neural network 32 are not time-series signals of an input/output variable but are the characteristic values.

Further, the parameter tuning operation is similar to that performed by the system of FIG. 19 except for the use of the characteristic quantities. The modifications of the system of FIG. 19 can be equally applied to their corresponding parts of this embodiment.

Incidentally, the characteristic quantities dealt with at the characteristic quantity extraction unit 33 are similar to those of the embodiment described above with reference to FIG. 25. Those shown in FIG. 26 can be used by way of example.

Figure 28:
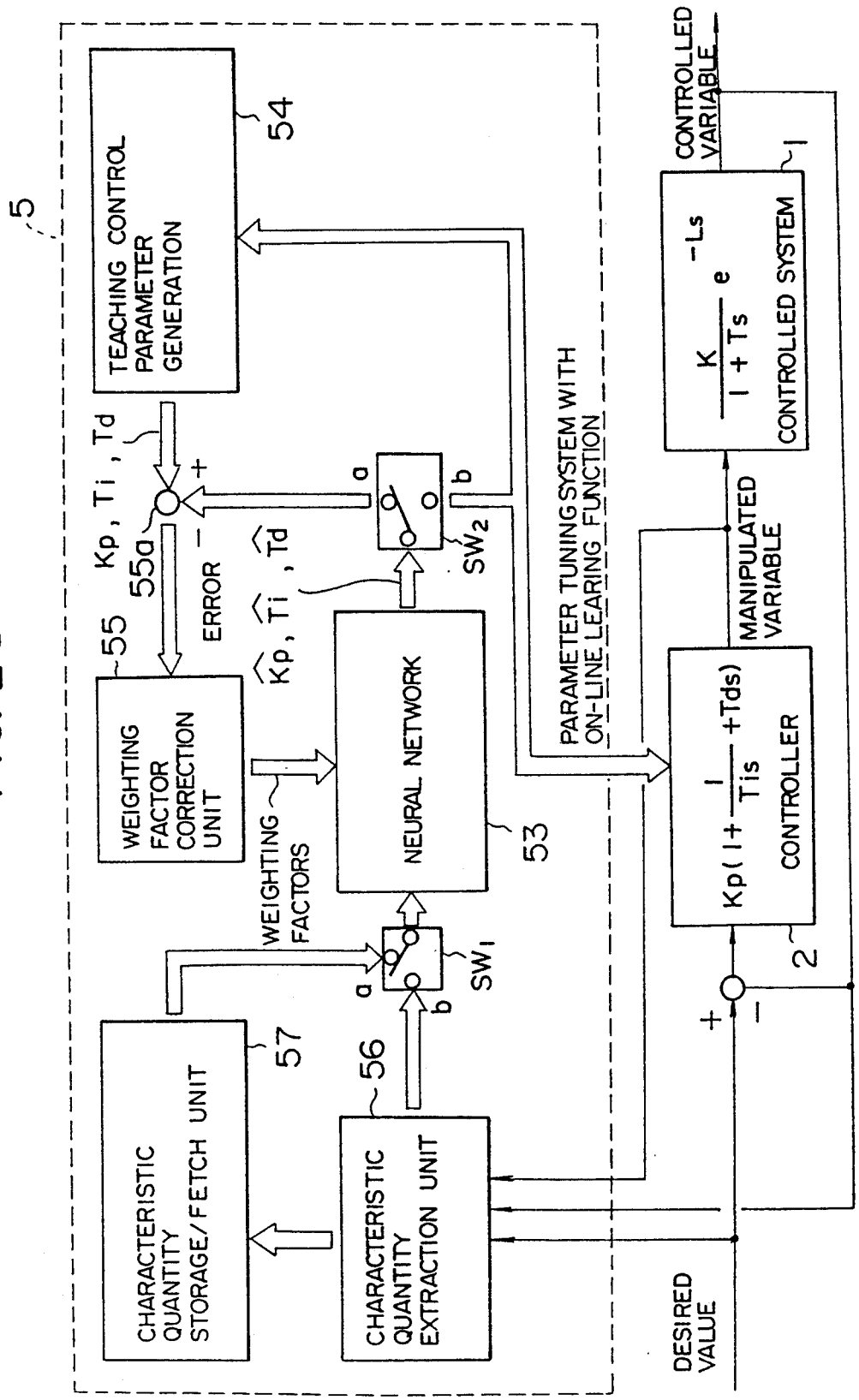
FIG. 28 is a block diagram of another embodiment of the parameter tuning system equipped with an on-line learning function, which is useful in the invention.

With reference to FIG. 28, a description will next be made of one embodiment of a system which is equipped with a system similar to the parameter tuning system shown in FIG. 20, the latter system being equipped with the on-line learning function, and tunes control parameters in accordance with actual process data while learning a tuning rule.

As is depicted in FIG. 28, this embodiment is constructed by providing the controlled system 1 and controller 2, which are employed in an actual process, with the parameter tuning system 5 having the on-line learning function.

Similarly to the system illustrated in FIG. 27, the parameter tuning system 5 shown in FIG. 28, said system being equipped with the on-line learning function, has a characteristic quantity extraction unit 56 for receiving a manipulated variable and a controlled variable from the controlled system 1 and controller 2 making up an actual combined controlling-controlled system, said variables corresponding to a desired value, and extracting their characteristic quantities, a characteristic quantity storage/fetch unit 57 for storing the characteristic quantities and outputting them as needed, a neural network 53 for estimating, with respect to the characteristic quantities, control parameters $(\hat{K}_p, \hat{T}_i, \hat{T}_d)$ on the basis of weighting factors, a teaching control parameter generation unit 54 for storing control parameters which gave a desired response in the course of tuning of the parameters of the controller 2 and outputting it as teaching control parameters as needed, an error computing unit 55a for determining errors between the teaching control parameters and their corresponding parameters estimated by the neural network 53, and a weighting factor correction unit 55 for correcting the weighting factors on the basis of the errors and setting the thus-corrected weighting factors in the neural network 53.

In addition, the system 5 has switches $SW_1, SW_2$ for changing from a learning state to a tuning state and vice versa. An on-line learning state is established when the switches $SW_1, SW_2$ are changed over to the side of a, while an on-line tuning state is brought about when they are changed over to the side b.

The neural network 53 of the system 5 is caused to learn off-line in advance by using simulators 41,42 similar to those described above with reference to FIG. 25. This learning can be performed by a separate system or by providing the system with simulators.

This embodiment is similar to the system described above with reference to FIG. 20 except that the characteristic quantities are used for tuning the control parameters. Its parameter tuning operation and its learning operation of a tuning rule are also similar to the system illustrated in FIG. 20. Accordingly, the modifications of the system of FIG. 20 can be similarly applied to their corresponding parts of the system of this embodiment.

Figure 29:
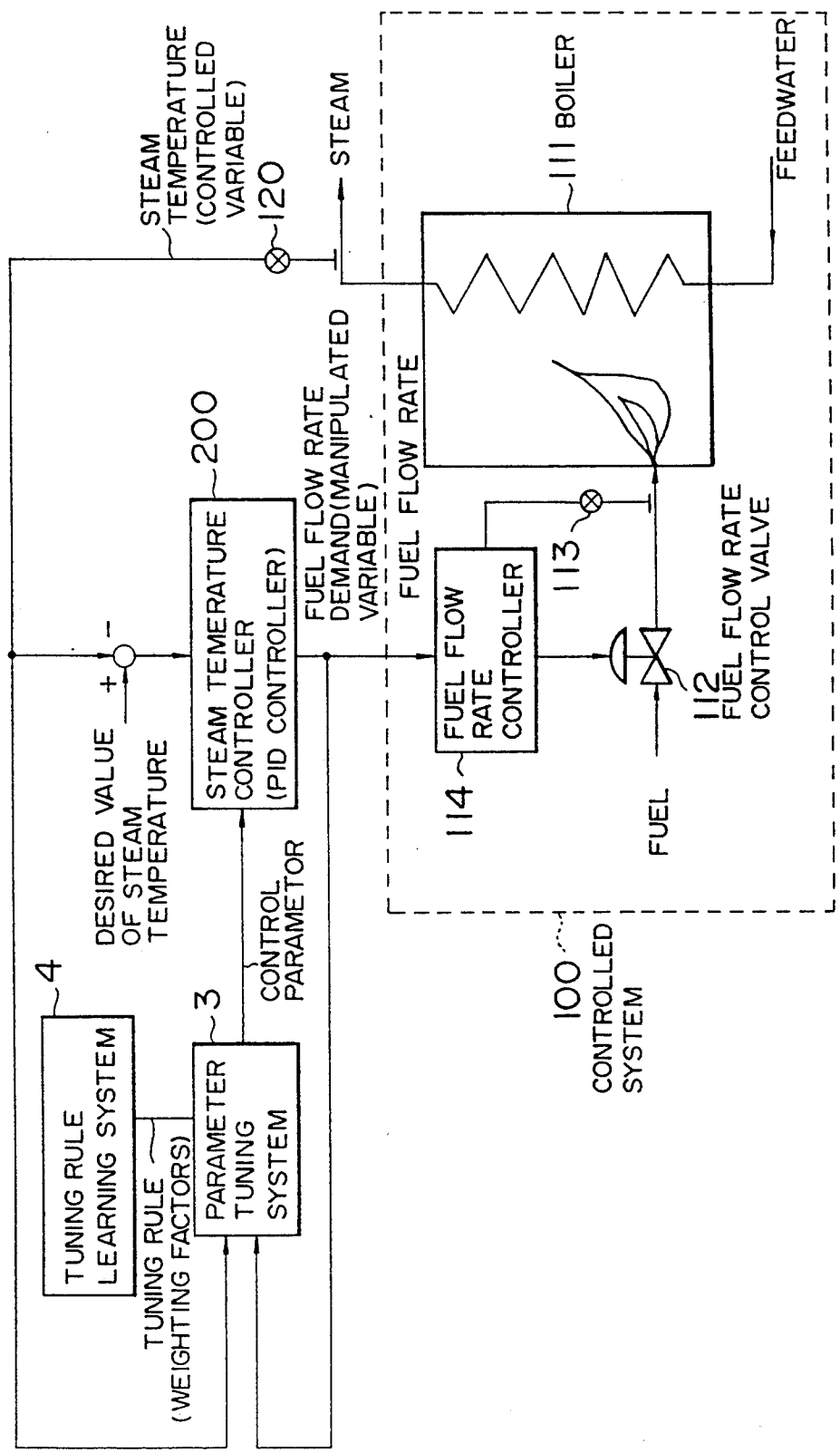
FIG. 29 is a block diagram of a still further embodiment of the combined controlling-controlled system useful upon application of the invention for the control of a process.
Figure 30:
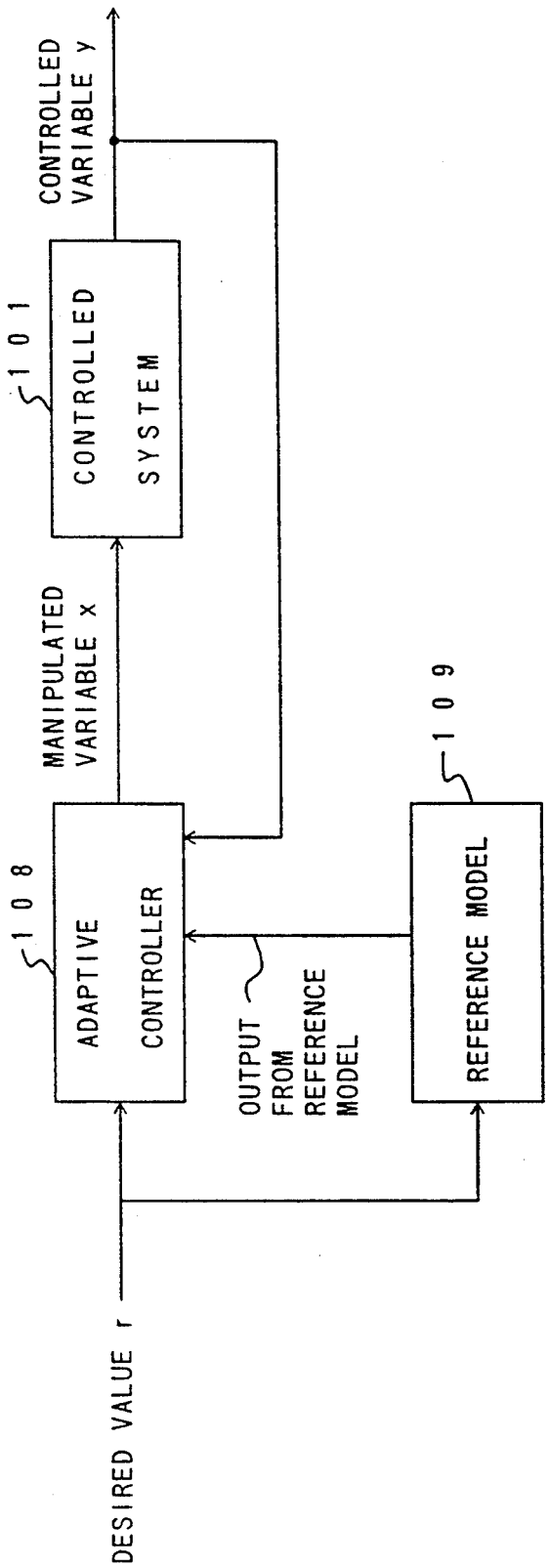
FIG. 30 is a block diagram showing a conventional model reference adaptive control.

With reference to FIG. 29, a description will next be made of a still further embodiment in which the present invention is applied for the control of a process.

As has been described above, this invention can be applied extensively to controlled systems and controllers, which show various transfer functions. The embodiment illustrated in FIG. 29 is merely one example of them. For example, this invention can be applied for the control of power generation plants, manufacturing plants, chemical plants and various other automatically operated apparatus and equipment.

FIG. 29 is a block diagram which conceptually shows a combined controlling-controlled system for controlling the steam temperature of a boiler.

The embodiment shown in FIG. 29 has a controlled system 100, a steam temperature controller 110 for controlling the system 100, the parameter tuning system 3 for performing tuning of control parameters of the controller 110, the tuning rule learning system 4, and a steam temperature sensor 120.

Arranged in the controlled system 100 are a boiler 111, a fuel flow rate control valve 112 for controlling the flow rate of fuel to a burner section of the boiler 111, a flow meter 113 for detecting the flow rate of the fuel, and a fuel flow rate controller 114 for controlling the opening degree of the fuel flow rate control valve 112.

The steam temperature controller 110 performs such PID control as described above. With respect to the deviation of the steam temperature (controlled variable), which is sent from the sensor 120, from a desired value, it performs PID-controlled computation in accordance with the control parameters and outputs a fuel flow rate demand (manipulated variable).

This fuel flow demand is delivered to the fuel flow rate controller 114. The fuel flow rate controller 114 then computes an opening degree command for the fuel flow rate control valve 112 on the basis of a fuel flow rate from the flow rate meter 113 and the fuel flow rate demand and outputs the opening degree command. Upon receipt of the opening degree command, the opening degree of the fuel flow rate control valve 112 is changed to control the flow rate of the fuel. Accordingly, the burning state of the burner of the boiler 111 is changed so that the steam temperature varies.

Further, the steam temperature (controlled variable) and the fuel flow rate demand (manipulated variable) are inputted to the parameter tuning system 3. As has been described above, they are inputted to the neural network as time-series signals or after extraction of their characteristic quantities, whereby control parameters are estimated by the neural network. The control parameters are then sent to the steam temperature controller 110. The control parameters of the steam temperature controller 110 are therefore tuned on-line.

A tuning rule (weighting factors) employed in the parameter tuning system 3 is determined by the tuning rule learning system 4, namely, through off-line learning making use of the neural network as described above.

As has been described above, this embodiment permits on-line tuning of control parameters of the steam temperature controller 110 in accordance with the manipulated variable and controlled variable, thereby making it possible to perform optimal control in correspondence to variations of the combined controlling-controlled system. Further, the tuning rule to be employed at the parameter tuning system 3 can be automatically learned in the tuning rule learning system 4 by using a neural network system as described above. Accordingly, unlike conventional systems, it is no longer necessary to prepare a tuning rule by man power while spending lots of time.

Incidentally, the parameter tuning system 3 and tuning rule learning system 4 were employed in the embodiment depicted in FIG. 29. It is however possible to construct the system such that tuning of control parameters and learning of a tuning rule can be performed using the parameter tuning system 4 shown in FIG. 20 or FIG. 28, said tuning system 4 being equipped with the on-line learning function.

As has been described above, each of the above embodiments of the present invention allows a neural network to learn by using a model of a controlled system 5 having various characteristics, obtaining time responses of the model, using as learning input data time-series signals or characteristic quantities of an input/output variable of the model, said signals or quantities being available from the time responses, determining optimal control parameters for the characteristics of the model and then using them as learning teacher data.

Development of a tuning rule can therefore be achieved automatically in a short period of time.

According to each of the above-described embodiments of the present invention, time-series signals or characteristic quantities of an input/output variable of a combined controlling-controlled system are received and control parameters of a neural network are tuned based on these signals. Even when a characteristic of a process varies, this variation can be detected as a change in the time-series signals or characteristic quantities of the input/output variable. The parameters of the controller can therefore be tuned on-line responsive to variations in the characteristic of the process without being limited by the type of time responses of the input/output variable of the combined controlling-controlled system, so that the characteristics of the combined controlling-controlled system can be maintained under favorable conditions.

In addition, according to each embodiment which permits on-line learning of a tuning rule, a neural network is allowed to learn by using, as learning input data, actual time-series signals or characteristic quantities of an input/output variable at the time that appropriate control has been successfully performed in an actual combined controlling-controlled system while using control parameters at that time as teacher data. Tuning of control parameters can therefore be performed suitably and promptly even when the characteristics of a controlled system deviate from those of an assumed model thereof.

As has been described above, each of the above embodiments has the advantages that it can shorten the time required for the development of a tuning rule and it can perform tuning of control parameters without being limited by the type of time responses of an input/output variable of a combined controlling-controlled system.

A description will next be made of embodiments on adaptive control of the model reference type which is suitable for tuning a controller while maintaining characteristics of a combined controlling-controlled system in conformity with the corresponding characteristics of a reference model even when a controlled system has non-linear characteristics.

Figure 31:
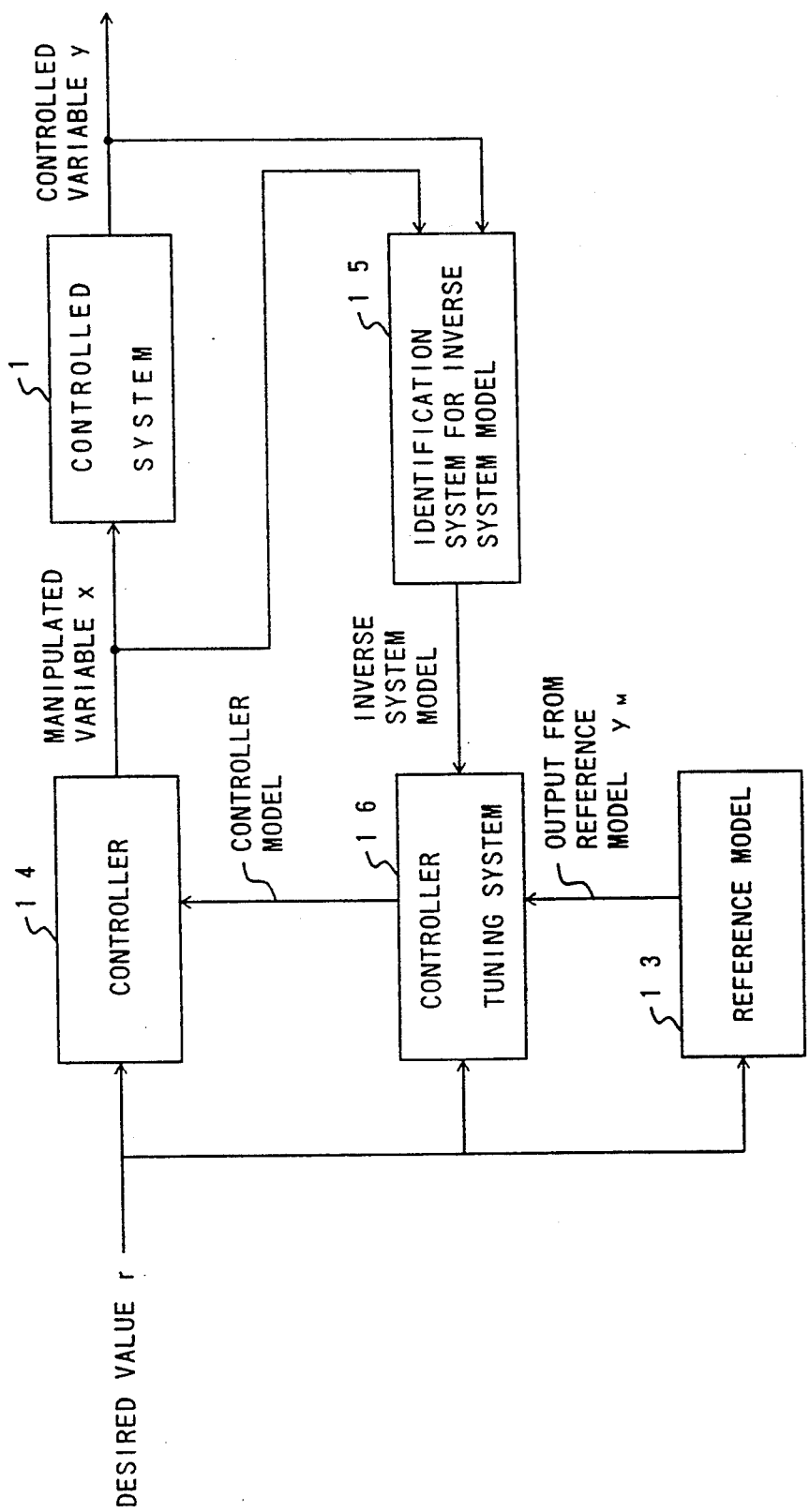
FIG. 31 is a block diagram of a hardware construction for an exemplary controller tuning method which makes use of a model reference adaptive control according to the invention.

FIG. 31 is a block diagram of a still further embodiment of the present invention.

The embodiment of FIG. 31 is constructed of a controller 14 for controlling the controlled system 1, an inverse system model identification system 15 for identifying an inverse system model of the controlled system 1, a controller tuning system 16 for tuning the controller 14 by using the inverse system so identified, and a reference model 13 having desired response characteristics.

The inverse system model identification system 15 can be constructed using a similar neural network to those employed in the embodiments described above.

$$C' = F'(Z') \quad (54)$$

where
- $C'$: time-series signals of an input variable of the controlled system 1,
- $Z'$: time-series signals of an output variable of the controlled system 1, and
- $F'$: model function of the inverse system.

The time-series signals $C'$ of the input variable of the controlled system 1 are represented by the following equation:

$$C' = [x(t)x(t-1) \ldots x(t-L')]^T \quad (55)$$

where
- $x(t-1)$: manipulated variable of the controlled system 1 at the time of $(t-1)^{th}$ sampling,
- $L'$: degree, and
- $T$: symbol indicating transposition.

On the other hand, the time-series signals $Z'$ of the output variable of the controlled system 1 are given by the following equation:

$$Z' = [y(t)y(t-1) \ldots y(t-L')]^T \quad (56)$$

where
- $y(t-1)$: manipulated variable of the controlled system 1 at the time of $(t-1)^{th}$ sampling.

The inverse system function $F'(Z')$ is constructed by a similar multilayer ($m'$ layers) neural network to that shown in FIG. 2. The construction of each unit, one of elements making up the neural network, is illustrated in FIG. 3. The input-output relationship of the unit is represented by equation (6) or (7) described above.

In the present embodiment, the input signals from the inverse system model identification system 15 to the neural network are the time-series signals $Z'$ of the output variable of the controlled system 1. Their correlation is represented by the following equation:

$$\begin{bmatrix} v_1(1) \\ v_2(1) \\ \cdot \\ \cdot \\ v_{L'+1}(1) \end{bmatrix} = \begin{bmatrix} y(t) \\ y(t-1) \\ \cdot \\ \cdot \\ y(t-L') \end{bmatrix} \quad (57)$$

Further, the last layer (the $m'^{th}$ layer in this embodiment) of the neural network is an output layer. Outputs from the units of the last layer are therefore output signals from the neural network. In the present embodiment, the output signals from the neural network are the estimated value $C'$ of the time-series signals of the input variable of the controlled system 1. Their correlation is defined by the following equation:

$$\begin{bmatrix} v_1(m) \\ v_2(m) \\ \cdot \\ \cdot \\ v_{L'+1}(m) \end{bmatrix} = \begin{bmatrix} \hat{x}(t) \\ x(t-1) \\ \cdot \\ \cdot \\ x(t-L') \end{bmatrix} \quad (58)$$

where
- $\hat{x}(t-1)$: estimated value of $x(t-1)$.

The inverse system model function $F'(Z')$ represented by equation (54) changes as the input-output relationship represented by equations (6) and (7) varies. In other words, the inverse system model function $F_1(Z_1)$ changes as the number of layers of the neural network, the number of units in each layer, the weighting factor $w_{ij}(k-1,k)$ of each unit and/or the function f defining the input-output relationship of each unit varies. Accordingly, the inverse system model function $F'(Z')$ conforming with an objective can be constructed by modifying the number of layers, the number of units in each layer, the weighting factor $w_{ij}(k-1,k)$ of each unit and/or the function f defining the input-output relationship of each unit.

The inverse system model identification system 15 develops the inverse system model function $F'(Z')$ through learning by the above-described learning algorithm, whereby an inverse system model for the controlled system is identified.

When an input-output combination $(Z',C')$ is given as learning data, the loss function R is defined by the following equation:

$$R = \frac{1}{2} \sum_j \{v_j(m')(w,Z') - C_j\}^2 \qquad (59)$$

In the input-output combination $(Z',C')$ of the learning data, the input $Z'$ and output $C'$ are called "learning input data" and "learning teacher data", respectively as in the above embodiments.

The learning data in this embodiment will next be described.

For the identification of an inverse system model, operation data of the controlled system 1 are used as learning data. In this case, time-series signals of the output variable (controlled variable) of the controlled system 1 are used as learning input data while time-series signals of the input variable (manipulated variable) of the controlled system 1 are employed as learning teacher signals. As input-output combinations $(Z',C')$ of these learning data, operation data which are changing every moment can also be used. It is also possible to use operation data which were recorded over a certain period of time. Use of operation data which change from time to time is preferable when one or more characteristics of a controlled system change rapidly.

Using the input-output combinations $(Z',C')$ of the above learning data, the inverse system model identification neural network is caused to learn in accordance with the error back propagation learning algorithm described above, so that an inverse system model function $F'(Z')$ is developed.

The controller tuning system 16 tunes the controller 14 by using the inverse system model identified by the inverse system model identification system 15. The controller 14 is tuned such that response characteristics of a model of the combined controlling-controlled system composed in combination of the controller 14 and the processed system 1, said model being formed by the neural network, conform with the corresponding desired response characteristics of the reference model. This tuning operation will next be described.

The controller 14 is represented by the following equation:

$$C'' = F''(Z'') \qquad (60)$$

where $C''$: value of the input variable of the controlled system 1 at the present time t, $Z''$: time-series signals of the desired value r of the output variable of the controlled system 1, and $F''$: controller model function.

The present value $C''$ of the input variable of the controlled system 1 is represented by the following equation:

$$C'' = [x(t)] \qquad (61)$$

where x(t): manipulated variable of the controlled system 1 at the present time t.

On the other hand, the time-series signals $Z''$ of the desired value r of the output variable of the controlled system 1 are given by the following equation:

$$Z'' = [r(t)\,r(t-1)\ldots r(t-L'')]^T \qquad (62)$$

where $r(t-1)$: desired value at the time of $(t-1)^{th}$ sampling, and $L''$: degree.

The controller model function $F''(Z'')$ is constructed by the multilayer (m'' layers in this embodiment) neural network shown in FIG. 2, which was used in the inverse system model. As units which are elements making up the neural network, those similar to the unit shown in FIG. 3 and employed in the inverse system model are used.

The input signals to the neural network for the controller are the time-series signals $Z''$ of the desired value r of the output variable of the controlled system 1. Their correlation is represented by the following equation:

$$\begin{bmatrix} v_1(1) \\ v_2(1) \\ \cdot \\ \cdot \\ \cdot \\ v_{L''+1}(1) \end{bmatrix} = \begin{bmatrix} r(t) \\ r(t-1) \\ \cdot \\ \cdot \\ \cdot \\ r(t-L'') \end{bmatrix} \qquad (63)$$

Further, the last layer (the $m''^{th}$ layer in this embodiment) of the neural network is an output layer. Each output from the units of the last layer is therefore an output signal from the neural network. In the present embodiment, each output signal from the neural network for the controller is the value $C''$ of the input variable of the controlled system 1 at the present time t. Their correlation is defined by the following equation:

$$[V_1(m)] = [x(t)]$$

The controller tuning system 16 develops the controller model function $F''(Z'')$ through learning, whereby a controller model is given to the controller 14. For the development of the controller model, time-series signals of the input variable (the desired value of the controlled variable) of the reference model are employed as learning input data $Z''$, time-series signals of the output variable (desired response of the controlled variable) of the reference model corresponding to the time-series signals of the input variable are inputted to the inverse system model, and the resulting estimated time-series signals of the input variable (manipulated variable) of the controlled system 1 are used as the learning teacher data C''. Using input-output combinations (Z'', C'') of these learning data, the neural network for the controller is caused to learn in accordance with the error back propagation learning algorithm employed in the identification of the inverse system model, and the controller model function F''(Z'') is hence developed.

According to the embodiment described above, a neural network for the identification of an inverse system model is caused to learn by using time-series signals of an output variable of a controlled system as learning input data and time-series data of an input variable of the controlled system as learning teacher data. This embodiment therefore has the advantageous effect that an inverse system model of a controlled system having non-linear characteristics can be easily identified.

This embodiment also has the advantageous effect that time-series signals of an input variable of a controlled system, said signals corresponding to time-series signals of an output variable of a reference model, can be easily obtained, because the time-series signals of the output variable of the reference model are used as inputs to the inverse system model of the controlled system and the time-series signals of the input variable of the controlled system at that time are obtained as outputs from the inverse system model. Further, a neural network for a controller model is caused to learn by using time-series signals of an input variable of the reference model as learning input data and the time-series signals of the input variable of the controlled system, said latter signals corresponding to the time-series signals of the output variable of th reference model, as learning teacher data. This has brought about the advantageous effect that the controlled can be easily controlled to bring the characteristics of the controlled system into conformity with the corresponding characteristics of the reference model even when the controlled system has non-linear characteristics.

A description will next be made of one embodiment of prediction control systems in which the controlled system 1 is controlled based on a predicted value of a desired value r and a predicted value of a controlled variable y.

Figure 32:
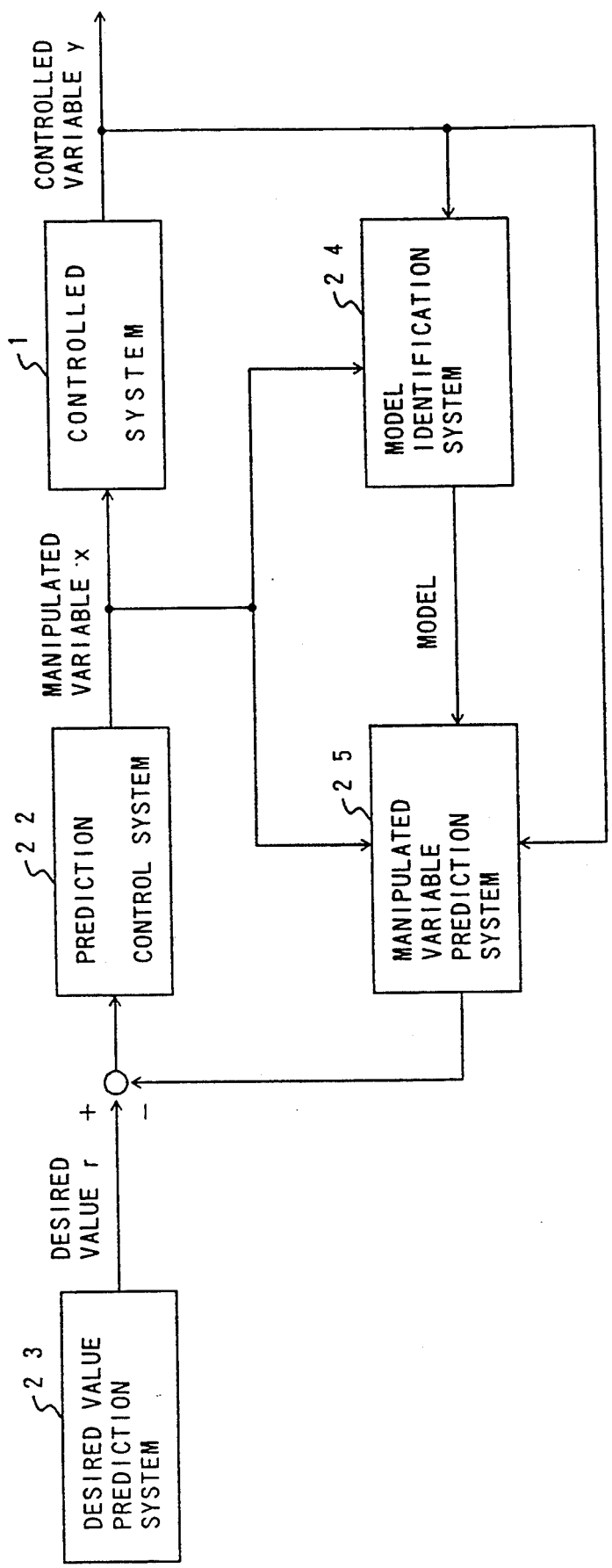
FIG. 32 is a block diagram of a hardware construction for a still further example of the control parameter tuning method according to the invention, in which a controller is constructed of a prediction control system.

FIG. 32 illustrates said one embodiment in which a controller is constructed by a prediction control system.

This embodiment is constructed of a desired value prediction system 23 for predicting a desired value r of a controlled variable y of the controlled system 1, a model identification system 24 for identifying a non-linear regression model of the controlled system 1, a controlled variable prediction system 25 for predicting the controlled variable y by using the non-linear regression model so identified, and a prediction control system 22 for controlling the controlled system 1 on the basis of the predicted value of the desired value r and the predicted value of the controlled variable y.

Figure 33:
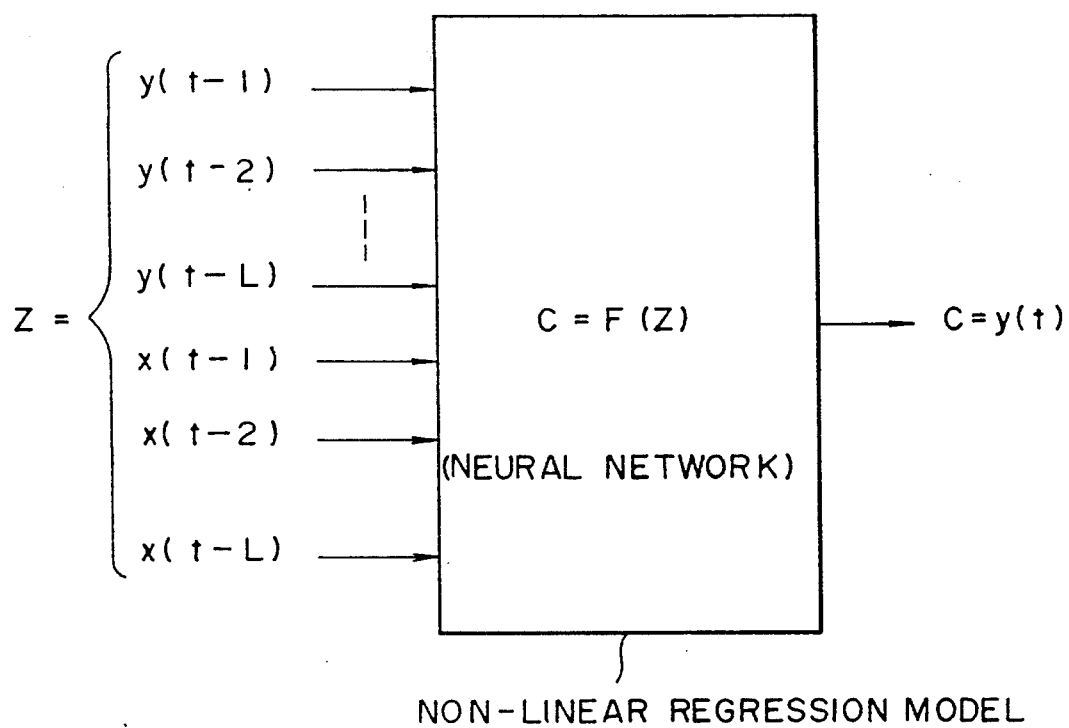
FIG. 33 is a schematic illustration of a non-linear model useful in the practice of the example of FIG. 32.

The model identification system 24 identifies the non-linear regression model of the controlled system 1, namely, a model which is useful in the determination of an estimated value of the output variable of the controlled system 1 on the basis of time-series signals of the input/output variable of the controlled target 1. This non-linear regression model is shown in FIG. 33 and is represented by the following equation:

$$C = F(Z) \tag{64}$$

where

C: controlled variable of the controlled system 1, namely, an estimated value ŷ(t) of the value y(t) of the output variable y at the present time t, Z: time-series signals of an input/output variable, and F: non-linear function.

A further embodiment of the present invention will hereinafter be described, taking a thermal power plant as the controlled system 1.

In the case of a thermal power plant, the value y(t) of the output variable y at the present time t is represented by the following equation when control of the steam temperature is taken by way of example:

$$y(t) = \begin{bmatrix} y_1(t) \\ y_2(t) \\ y_3(t) \end{bmatrix} = \begin{bmatrix} T_{SH}(t) \\ T_{WW}(t) \\ T_{RH}(t) \end{bmatrix} \tag{65}$$

where $T_{SH}(t)$: value of the main steam temperature $T_{SH}$ at the present time t, $T_{WW}(t)$: value of the steam temperature $T_{WW}$ at an outlet of an evaporator at the present time t, and $T_{RH}(t)$: value of the regenerated steam temperature $T_{RH}$ at the present time t.

Further, the time-series signals Z of the input/output variable can be given by the following equation when the steam temperature is controlled:

$$z = \begin{bmatrix} y(t-1) \\ y(t-2) \\ \vdots \\ y(t-L') \\ x(t-1) \\ x(t-2) \\ \vdots \\ x(t-L') \end{bmatrix} \tag{66}$$

$$y(t-i) = \begin{bmatrix} T_{SH}(t-i) \\ T_{WW}(t-i) \\ T_{RH}(t-i) \end{bmatrix} \tag{67}$$

$$x = \begin{bmatrix} x_1(t-i) \\ x_2(t-i) \\ x_3(t-i) \\ x_4(t-i) \end{bmatrix} = \begin{bmatrix} F_F(t-i) \\ F_{SP}(t-i) \\ F_{GR}(t-i) \\ L_D(t-i) \end{bmatrix} \tag{68}$$

where $T_{SH}(t-i)$: value of the main steam temperature $T_{SH}$ at the time of $(t-i)^{th}$ sampling, $T_{WW}(t-i)$: value of the stream temperature $T_{WW}$ at the outlet of the evaporator at the time of $(t-i)^{th}$ sampling, $T_{RH}(t-i)$: value of the regenerated steam temperature $T_{RH}$ at the time of $(t-i)^{th}$ sampling, $F_F(t-i)$: value of the fuel flow rate $F_F$ at the time of $(t-i)^{th}$ sampling, $F_{SP}(t-i)$: value of the spray flow rate $F_{SP}$ at the time of $(t-i)^{th}$ sampling, $F_{GR}(t-i)$: value of the gas recirculation flow rate $F_{GR}$ at the time of $(t-i)^{th}$ sampling, and $L_D(t-i)$: value of the demand for the generator output MW at the time of $(t-i)^{th}$ sampling.

$L'$: degree of the regression model.

Among the input variables x, the demand $L_D$ for the generator output MW acts as a disturbance against the thermal power plant.

The non-linear function $F(Z)$ is constructed, similarly to the embodiments described above, by the multilayer (m layers) neural network depicted in FIG. 2.

In the present embodiment, the input signals to the neural network are the time-series signals Z of the input/output variable of the controlled system 1. In view of equation (65), their correlation can be represented the following equation:

$$\begin{bmatrix} v_{3L'+4L'-3}(1) \\ v_1(1) \\ v_2(1) \\ v_3(1) \\ v_4(1) \\ v_5(1) \\ v_6(1) \\ \vdots \\ \vdots \\ v_{3L'-2}(1) \\ v_{3L'-1}(1) \\ v_{3L'}(1) \\ v_{3L'+1}(1) \\ v_{3L'+2}(1) \\ v_{3L'+3}(1) \\ v_{3L'+4}(1) \\ v_{3L'+5}(1) \\ v_{3L'+6}(1) \\ v_{3L'+7}(1) \\ v_{3L'+8}(1) \\ \vdots \\ \vdots \\ v_{3L'+4L'-3}(1) \\ v_{3L'+4L'-2}(1) \\ v_{3L'+4L'-1}(1) \\ v_{3L'+4L'}(1) \end{bmatrix} = \begin{bmatrix} x_1(t-L') \\ y_1(t-1) \\ y_2(t-1) \\ y_3(t-1) \\ y_1(t-2) \\ y_2(t-2) \\ y_3(t-2) \\ \vdots \\ \vdots \\ y_1(t-L') \\ y_2(t-L') \\ y_3(t-L') \\ x_1(t-1) \\ x_2(t-1) \\ x_3(t-1) \\ x_4(t-1) \\ x_1(t-2) \\ x_2(t-2) \\ x_3(t-2) \\ x_4(t-2) \\ \vdots \\ \vdots \\ x_1(t-L') \\ x_2(t-L') \\ x_3(t-L') \\ x_4(t-L') \end{bmatrix} = \begin{bmatrix} F_F(t-L') \\ T_{SH}(t-1) \\ T_{WW}(t-1) \\ T_{RH}(t-1) \\ T_{SH}(t-2) \\ T_{WW}(t-2) \\ T_{RH}(t-2) \\ \vdots \\ \vdots \\ T_{SH}(t-L') \\ T_{WW}(t-L') \\ T_{RH}(t-L') \\ F_F(t-1) \\ F_{SP}(t-1) \\ F_{GR}(t-1) \\ L_D(t-1) \\ F_F(t-2) \\ F_{SP}(t-2) \\ F_{GR}(t-2) \\ L_D(t-2) \\ \vdots \\ \vdots \\ F_F(t-L') \\ F_{SP}(t-L') \\ F_{GR}(t-L') \\ L_D(t-L') \end{bmatrix} \quad (69)$$

Further, the last layer (the $m^{th}$ layer in this embodiment) of the neural network is an output layer. Each output from the units of the last layer is therefore an output signal from the neural network. In the present embodiment, each output signal from the neural network is an estimated value $\hat{y}(t)$ (C) of the value $y(t)$ of the output variable y of the controlled system at the present time t. In view of equation (65), their correlation can be represented by the following equation:

$$\begin{bmatrix} v_1(m) \\ v_2(m) \\ v_3(m) \end{bmatrix} = \begin{bmatrix} \hat{y}_1(t) \\ \hat{y}_2(t) \\ \hat{y}_3(t) \end{bmatrix} = \begin{bmatrix} \hat{T}_{SH}(t) \\ \hat{T}_{WW}(t) \\ \hat{T}_{RG}(t) \end{bmatrix} \quad (70)$$

The characteristics of the non-linear conversion function $F(Z)$ represented by equation (64) vary as the input-output relationship of the units expressed by equation (6) and (7) vary. Namely, the characteristics of the non-linear conversion function $F(Z)$ vary as the number of layers of the neural network, the number of units in each layer, the weighting factor $w_{ij}(k-1, k)$ for each unit, and/or the function f defining the input-output relationship of each unit change. Accordingly, a non-linear conversion function $F(Z)$ suited for a given objective can be developed by tuning the number of layers, the number of units in each layer, the weighting factor $w_{ij}(k-1, k)$ for each unit, and/or the function f defining the input-output relationship of each unit.

The model identification system 24 identifies a non-linear regression model of the controlled system 1 through learning by means of the learning algorithm described above.

A description will next be made of a method for obtaining learning data in the present embodiment.

As input-output combinations (Z,C) of learning data, operation data of the controlled system 1, namely, time-series data of an input/output variable of the controlled system is employed. For example, time-series data $\{(y(t),x(t)),(y(t-1),x(t-1)), \ldots, (y(t-M),x(t-M))\}$ (M≧L) collected at a sampling frequency $\Delta t$ from the present time t until before $M^{th}$ sampling are stored in advance. These data are then used. Correlation between these time-series data and the learning input-output combinations (Z,C) is expressed by the following equation:

$$Z(t) = \begin{bmatrix} y(t-1) \\ y(t-1) \\ \vdots \\ y(t-L') \\ x(t-1) \\ x(t-2) \\ \vdots \\ x(t-L') \end{bmatrix} \quad (71)$$

$$C(t) = y(t)$$

$$Z(t-1) = \begin{bmatrix} y(t-2) \\ y(t-3) \\ \vdots \\ y(t-L'-1) \\ x(t-2) \\ x(t-3) \\ \vdots \\ x(t-L'-1) \end{bmatrix}$$

$$C(t-1) = y(t-1)$$

$$Z(t-M+L') = \begin{bmatrix} y(t-M+L'-1) \\ y(t-M+L'-2) \\ \cdot \\ \cdot \\ \cdot \\ y(t-M) \\ x(t-M+L'-1) \\ x(t-M+L'-2) \\ \cdot \\ \cdot \\ \cdot \\ x(t-M) \end{bmatrix}$$

$$C(t-M+L') = y(t-M+L')$$

Using the above $(M-L'+1)$ input-output combinations $(Z,C)$ of the learning data, the neural network is allowed to learn in accordance with the back error propagation learning algorithm described previously, whereby a non-linear regression model is identified.

The desired value prediction system 23 predicts a desired value r of a controlled variable y of the controlled system 1. In the case of a thermal power plant by way of example, the desired value can be predicted as a function of the demand $L_D$ for the generator output MW in accordance with the following equation:

$$\begin{bmatrix} \hat{r}(t+1|t) = f(L_D(t)) \\ \hat{r}(t+2|t) = f(L_D(t)) \\ \cdot \\ \cdot \\ \cdot \\ \hat{r}(t+p|t) = f(L_D(t)) \end{bmatrix} \quad (72)$$

where $\hat{r}(t+p|t)$: predicted value of a desired value at the future time of $p^{th}$ sampling, as predicted at the time t.

$$r(t+i|t) = \begin{bmatrix} \hat{r}_1(t+i|t) \\ \hat{r}_2(t+i|t) \\ \hat{r}_3(t+i|t) \end{bmatrix} = \begin{bmatrix} \hat{r}_{TSH}(t+i|t) \\ \hat{r}_{TWW}(t+i|t) \\ \hat{r}_{TRH}(t+i|t) \end{bmatrix}$$

$\hat{r}_{TSH}$: desired value of the main steam temperature, $\hat{r}_{TWW}$: desired value of the steam temperature $T_{WW}$ at the outlet of the evaporator, and $\hat{r}_{TRH}$: desired value of the regenerated steam temperature $T_{RH}$.

The controlled variable prediction system 5 predicts the controlled variable y by using the non-linear regression model identified by the model identification system 4. This prediction is conducted in accordance with the following equation:

$$\hat{Z}(t+1|t) = \begin{bmatrix} y(t) \\ y(t-1) \\ \cdot \\ \cdot \\ \cdot \\ y(t-L'+1) \\ x^*(t-1) \\ x(t-1) \\ x(t-2) \\ \cdot \\ \cdot \\ \cdot \\ x(t-L'+1) \end{bmatrix} \quad (73)$$

$$\hat{C}(t+1|t) = \hat{y}(t+1|t) = F(\hat{Z}(t+1|t))$$

$$\hat{Z}(t+2|t) = \begin{bmatrix} \hat{y}(t+1|t) \\ y(t) \\ y(t-1) \\ \cdot \\ \cdot \\ \cdot \\ y(t-L'+2) \\ x^*(t-1) \\ x^*(t-1) \\ x(t-1) \\ x(t-2) \\ \cdot \\ \cdot \\ \cdot \\ x(t-L'+2) \end{bmatrix}$$

$$\hat{C}(t+2|t) = \hat{y}(t+2|t) = F(\hat{Z}(t+2|t))$$

$$\hat{Z}(t+3|t) = \begin{bmatrix} \hat{y}(t+2|t) \\ \hat{y}(t+1|t) \\ y(t) \\ y(t-1) \\ \cdot \\ \cdot \\ \cdot \\ y(t-L'+3) \\ x^*(t-1) \\ x^*(t-1) \\ x^*(t-1) \\ x(t-1) \\ x(t-2) \\ \cdot \\ \cdot \\ \cdot \\ x(t-L'+3) \end{bmatrix}$$

$$\hat{C}(t+3|t) = \hat{y}(t+3|t) = F(\hat{Z}(t+3|t))$$

$$\hat{Z}(t+p|t) = \begin{bmatrix} \hat{y}(t+p-1|t) \\ \hat{y}(t+p-2|t) \\ \cdot \\ \cdot \\ \cdot \\ \hat{y}(t+p-L'|t) \\ x^*(t-1) \\ x^*(t-1) \\ x^*(t-1) \\ \cdot \\ \cdot \\ \cdot \\ x^*(t-1) \end{bmatrix}$$

$$\hat{C}(t+p|t) = \hat{y}(t+p|t) = F(\hat{Z}(t+p|t))$$

where $\hat{y}(t+p|t)$: predicted value of the controlled variable at the future time of $p^{th}$ sampling, as predicted at the time p, and $$x^*(t-1) = \begin{bmatrix} x_1(t-1) \\ x_2(t-1) \\ x_3(t-1) \\ x_4(t) \end{bmatrix} = \begin{bmatrix} F_F(t-1) \\ F_{SP}(t-1) \\ F_{GR}(t-1) \\ L_D(t) \end{bmatrix}.$$

Namely, the predicting calculation equation given by equation (73) is used to determine the predicted value $\hat{y}(t+p|t)$ of the controlled variable y at the future time of $p^{th}$ sampling when an input is held at the value $x^*(t-1)$ at the time one sampling before the present time t. It is to be noted that, as the demand $L_D$ for the generator output MW, the value $L_D(t)$ at the present time t is used at $x^*(t-1)$.

The prediction control system 22 determined the manipulated variable at the present time t by using the desired value $\hat{r}(t+p|t)$ and controlled variable $\hat{y}(t+p|t)$ predicted by the desired value prediction system 23 and controlled variable prediction system 25, respectively. Calculation of this manipulated variable is performed in accordance with the following equation:

$$\left.\begin{aligned}
x_1(t) &= x_1(t-1) + \\
&\quad + K_{P1}\{\hat{r}_1(t+p|t) - \hat{y}_1(t+p|t)\} - \\
&\quad - (\hat{r}_1(t-1+p|t-1) - \hat{y}_1(t-1+p|t-1)\} \\
&\quad + K_{I1}\{\hat{r}_1(t+p|t) - \hat{y}_1(t+p|t)\} \\
x_2(t) &= x_2(t-1) + \\
&\quad + K_{P2}\{\hat{r}_2(t+p|t) - \hat{y}_2(t+p|t)\} - \\
&\quad - (\hat{r}_2(t-1+p|t-1) - \hat{y}_2(t-1+p|t-1)\} \\
&\quad + K_{I2}\{\hat{r}_2(t+p|t) - \hat{y}_2(t+p|t)\} \\
x_3(t) &= x_3(t-1) + \\
&\quad + K_{P3}\{\hat{r}_3(t+p|t) - \hat{y}_3(t+p|t)\} - \\
&\quad - (\hat{r}_3(t-1+p|t-1) - \hat{y}_3(t-1+p|t-1)\} \\
&\quad + K_{I3}\{\hat{r}_3(t+p|t) - \hat{y}_3(t+p|t)\}
\end{aligned}\right\} \quad (74)$$

wherein $K_{P1}, K_{P2}, K_{P3}$: proportional gains, and $K_{I1}, K_{I2}, K_{I3}$: integral gains.

Further, $x_4(t)$ is determined by the following equation:

$$x_4(t) = L_D(t) \quad (75)$$

The above embodiment was described, focusing on the control of seam temperature. This invention is however not limited to the control of steam temperature but can be applied for the control of various process variables of a thermal power plant.

Figure 34:
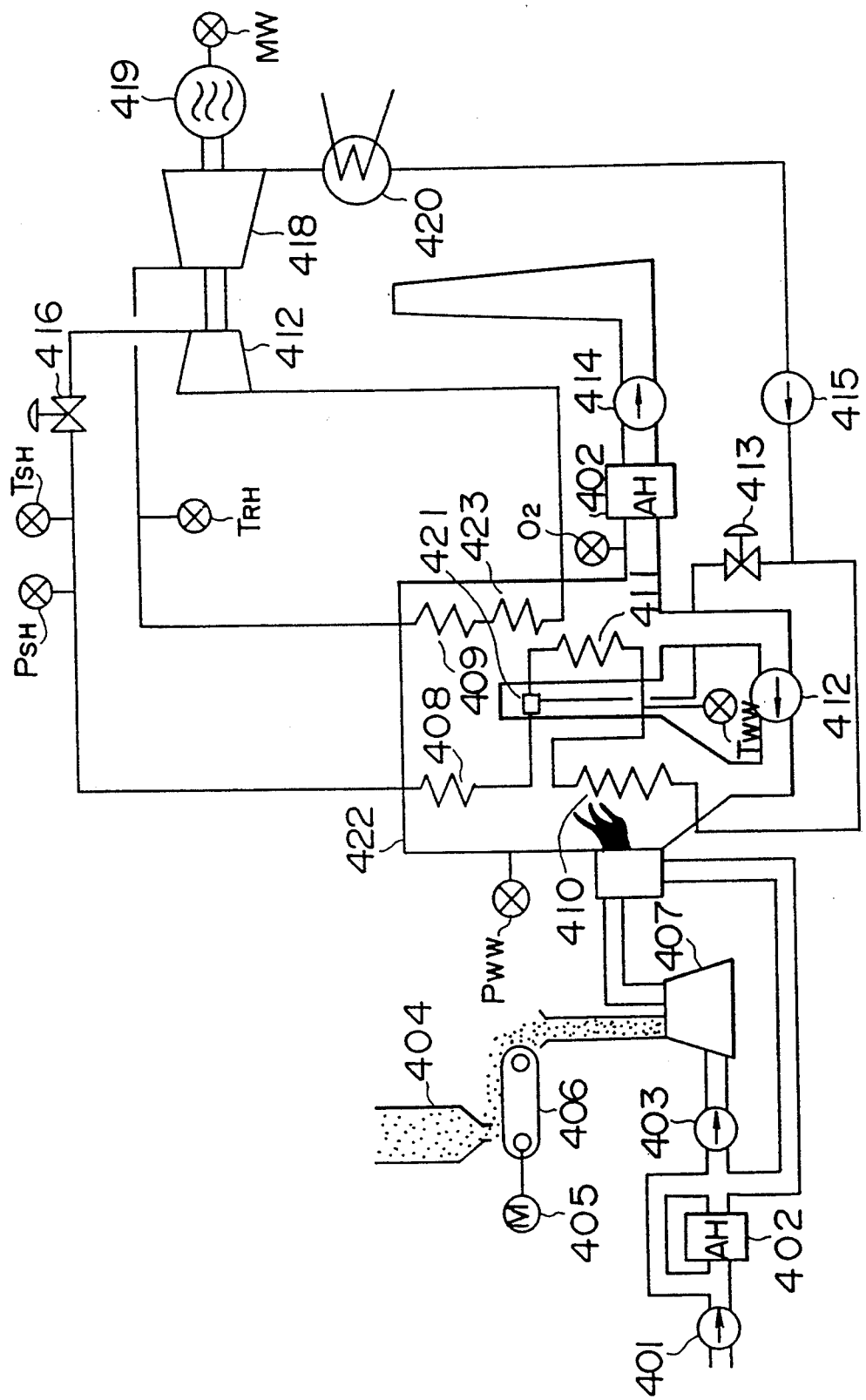
FIG. 34 is a system diagram of a thermal power plant to which the example of FIG. 32 is applied.

Before starting description of a still further embodiment of the present invention, the outline of a thermal power plant will be described. FIG. 34 illustrates the construction of a thermal power plant which has a high-pressure turbine 417 and an intermediate- and low-pressure turbine 418. Exhaust gas from the intermediate- and low-pressure turbine 418 is cooled into water by a condenser 420. This water is converted into superheated steam while being fed successively through a feedwater pump 415, an evaporator 410, a primary superheater 411 and a secondary superheater 408, and is fed to the high-pressure turbine 417 via a main steam governor valve 416. Exhaust gas from the high-pressure turbine 417 is again reheated by a primary reheater 423 and a secondary reheater 409, both, arranged within a boiler 422, and is then fed to the intermediate- and low-pressure turbine 418. As a result, a generator 419 is driven by the high-pressure and intermediate- and low-pressure turbines 417,418 so that power is generated. Incidentally, a spray control valve 413 is provided to feed water to a line which extends between the primary superheater 411 and the secondary superheater 408. Feeding of pulverized coal to the boiler 422 is performed by a coal bunker 404, a coal feeder drive motor 405, a coal feeder 406 and a coal mill 407. A forced draft fan 401, an air preheater 402, an air blower 403, an induced draft fan 414 and a gas recirculation fan 412 are also provided for the feeding of air, for the discharge of combustion gas and for the reutilization of waste heat.

The thermal power plant is constructed as described above. The main steam governor valve, the feedwater pump, the coal feeder drive motor, the forced draft fan, the spray control valve, the gas recirculation fan, the induced draft fan and the like must be suitable manipulated based on a load command $L_C$ from a central load dispatching office and controlled variables of the thermal power plant.

Figure 35:
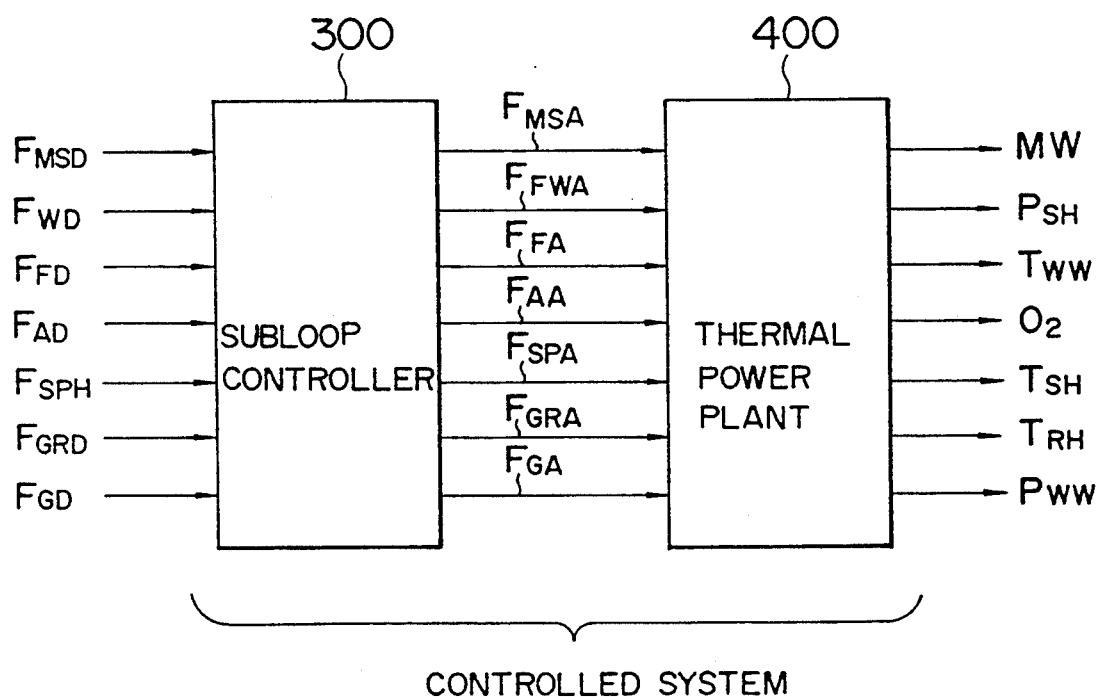
FIG. 35 is a schematic illustration of one embodiment of a prediction control system applicable to a system which has a subloop controller and a thermal power plant to be controlled.
Figure 36:
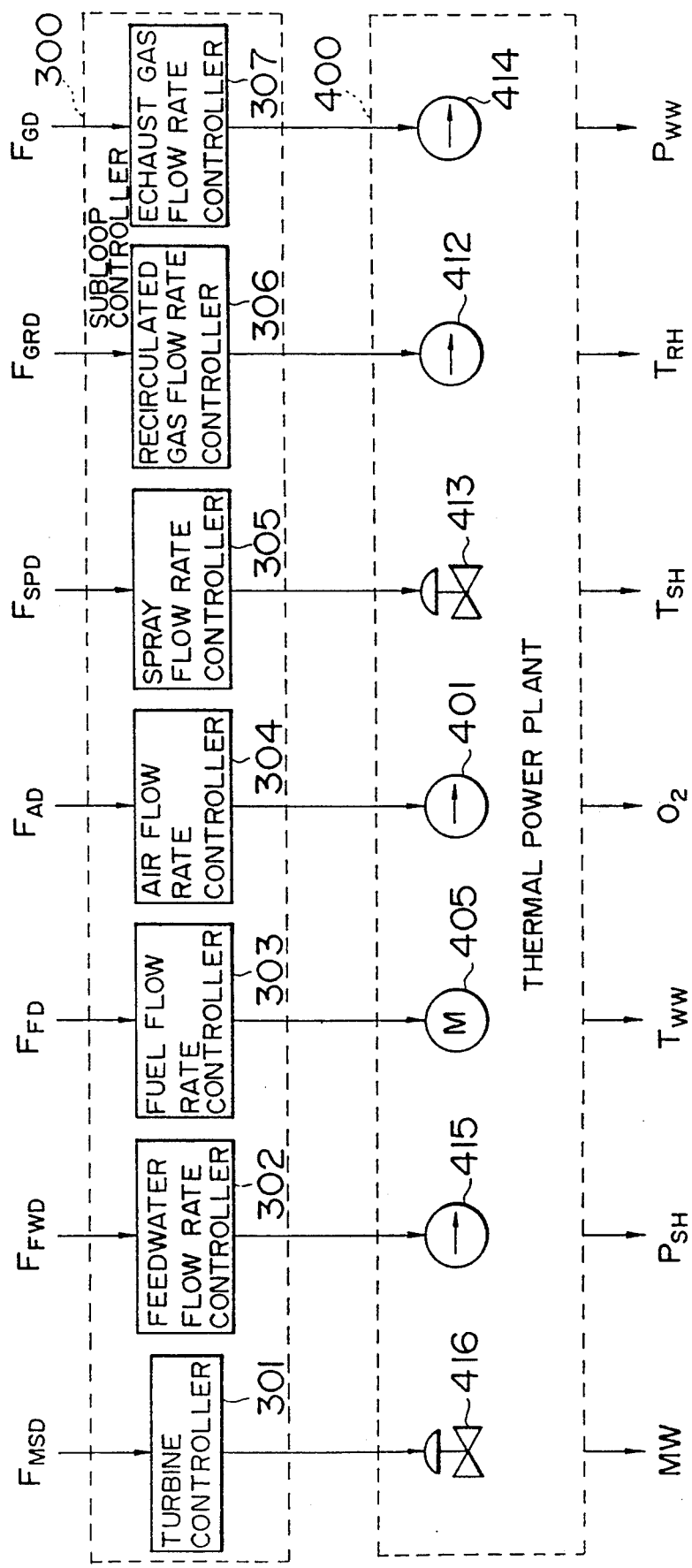
FIG. 36 is a block diagram of the subloop controller and the thermal power plant and a correlation therebetween.

A still further embodiment of the present invention will next be described with reference to FIG. 35, in which a system comprising a subloop controller 300 and a thermal power plant 400 is provided as the system 1 controlled by the prediction control system 22. Namely, the prediction control system 22 determines, as manipulated variables x, turbine steam flow rate demand $F_{MSD}$, feedwater flow rate demand $F_{FWD}$, fuel flow rate demand $F_{FD}$, air flow rate demand $F_{AD}$, spray flow rate demand $F_{SPD}$, recirculation gas flow rate demand $F_{GRD}$ and exhaust gas flow rate demand $F_{GD}$ by prediction control computation similar to equation (74). As shown in FIG. 36, the subloop controller 300 manipulates, in accordance with these demands, the main steam governor valve 416, feedwater pump 415, coal feeder drive motor 405, forced draft fan 401, spray control valve 413, gas recirculation fan 412 and induced draft fan 414 of the thermal power plant 400 via a turbine controller 301, a feedwater flow rate controller 302, a fuel flow rate controller 303, an air flow rate controller 304, a spray flow rate controller 305, a recirculation gas flow rate controller 306 and an exhaust gas flow rate controller 307. As a result, the thermal power plant 400 is controlled such that its controlled variables y, namely, generator output MW, main steam pressure $P_{SH}$, main steam temperature $T_{SH}$, exhaust gas $O_2$ content $O_2$, evaporator outlet steam temperature $T_{WW}$, regenerated steam temperature $T_{RH}$ and furnace draft $P_{WW}$ are brought into conformity with their corresponding desired values.

Figure 37:
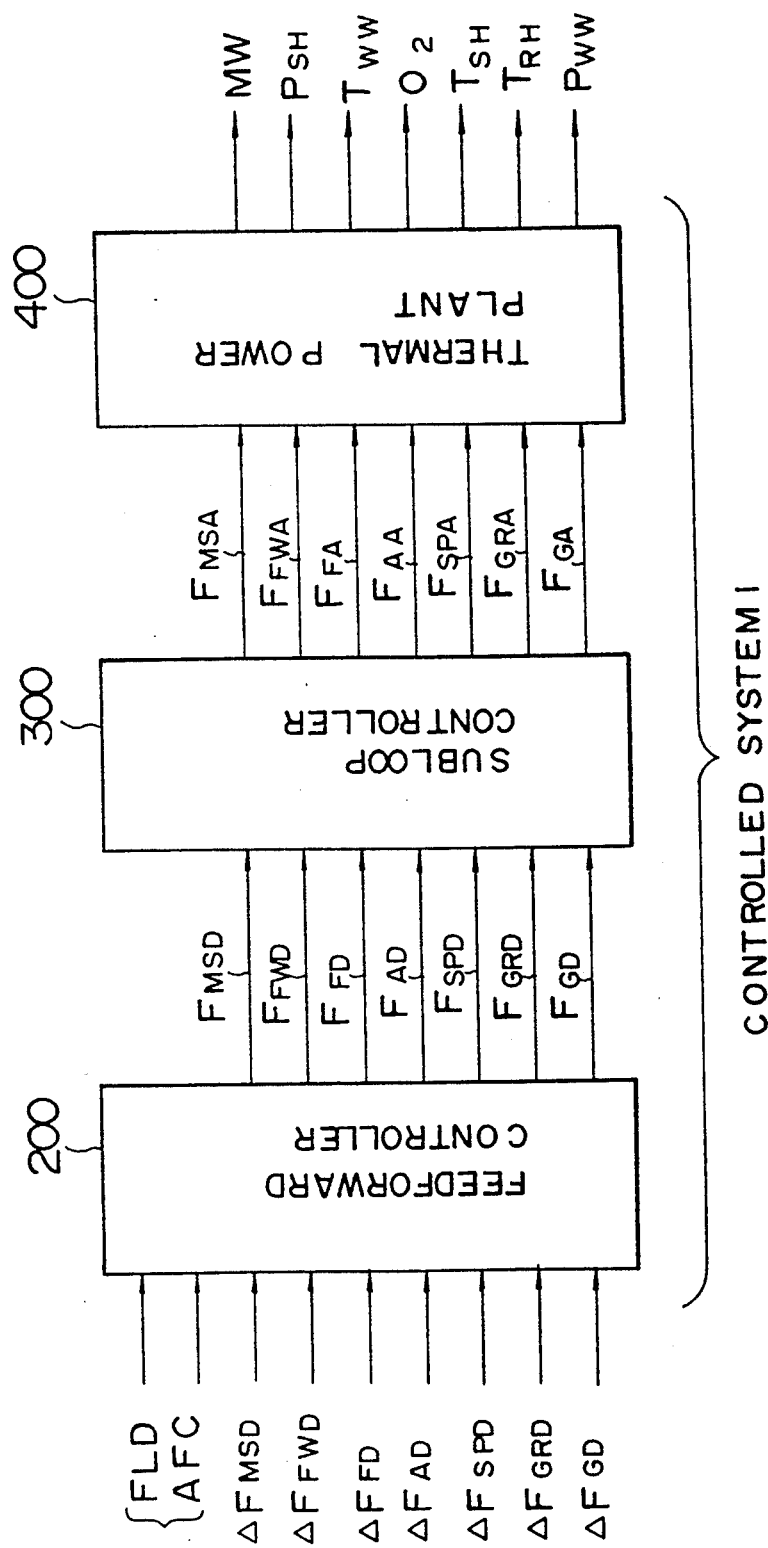
FIG. 37 is a schematic illustration of one embodiment of a prediction control system applicable to a system which has a feedforward controller, a subloop controller and a thermal power plant to be controlled.
Figure 38:
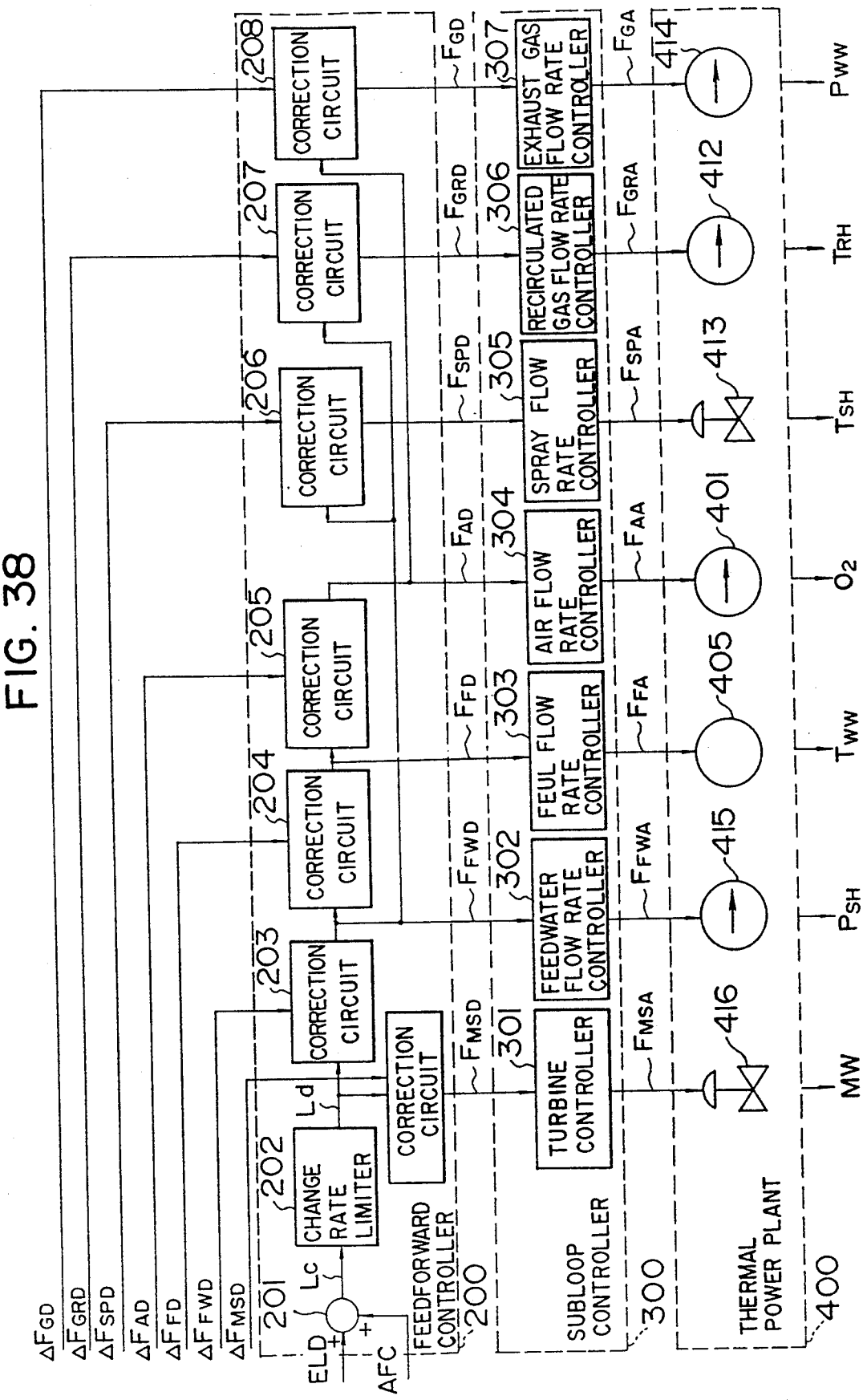
FIG. 38 is a block diagram of the feedforward controller, subloop controller and thermal power plant of FIG. 37 and a correlation thereamong.

Referring next to FIG. 37, a still further embodiment of the present invention will be described. In the drawing, a system which comprises a feedforward controller 200, the subloop controller 300 and the thermal power plant 400 is the system 1 controlled by the prediction control system 22. Namely, the prediction control system 22 determines, as manipulated variables x, turbine steam flow rate demand calibration $\Delta F_{MSD}$, feedwater flow rate demand calibration $\Delta F_{FWD}$, fuel flow rate demand calibration $\Delta F_{FD}$, air flow rate demand calibration $\Delta F_{AD}$, spray flow rate demand calibration $\Delta F_{SPD}$, recirculation gas flow rate demand calibration $\Delta F_{GRD}$ and exhaust gas flow rate demand calibration $\Delta F_{GD}$ in accordance with prediction control computation similar to equation (74). At the feedforward controller 200, as illustrated in FIG. 38, a load command $L_C$ [=ELD-(Economic Load Dispatching)+AFC(Automatic Load Dispatching)] from the central load dispatching office is obtained via an adder 201, and a load demand $L_D$ is determined by processing the load command $L_C$ at a change rate limiter 202. Based on the load demand $L_D$ and the demand calibrations $\Delta F_{MSD}$, $\Delta F_{FWD}$, $\Delta F_{FD}$, $\Delta F_{AD}$, $\Delta F_{SPD}$, $\Delta F_{GRD}$, $\Delta F_{GD}$, the turbine steam flow rate demand $F_{MSD}$, feedwater flow rate demand calibration $\Delta F_{FWD}$, fuel flow rate demand $F_{FD}$, air flow rate demand $F_{AD}$, spray flow rate demand $F_{SPD}$, recirculation gas flow rate demand $F_{GRD}$ and exhaust gas flow rate demand $F_{GD}$ are determined by correction circuits 203–209, respectively in advance. These relationships can be expressed by the following equation:

$$\left. \begin{array}{l} F_{MSD} = f(L_D) + \Delta F_{MSD} \\ F_{FWD} = f(L_D) + \Delta F_{FWD} \\ F_{FD} = f(L_{FWD}) + \Delta F_{FD} \\ F_{AD} = f(F_D) + \Delta F_{AD} \\ F_{SPD} = f(F_{FWD}) + \Delta F_{SPD} \\ F_{GRD} = f(F_{FWD}) + \Delta F_{GRD} \\ F_{GD} = f(F_{AD}) + \Delta F_{GD} \end{array} \right\} \quad (76)$$

On the other hand, the subloop controller 300 manipulates, in accordance with these demands, the main steam governor 416, feedwater pump 415, coal feeder drive motor 405, forced draft fan 401, spray control valve 413, gas recirculation fan 412 and induced draft fan 414 of the thermal power plant 400 via the turbine controller 301, the feedwater flow rate controller 302, the fuel flow rate controller 303, the air flow rate controller 304, the spray flow rate controller 305, the recirculation gas flow rate controller 306 and the exhaust gas flow rate controller 307. As a result, the thermal power plant 400 is controlled such that its controlled variables y, namely, the generator output MW, main steam pressure $P_{SH}$, evaporator outlet steam temperature $T_{WW}$, exhaust gas $O_2$ content $O_2$, main steam temperature $T_{SH}$, regenerated steam temperature $T_{RH}$ and furnace draft $P_{WW}$ are brought into conformity with their corresponding desired values.

Figure 40A:
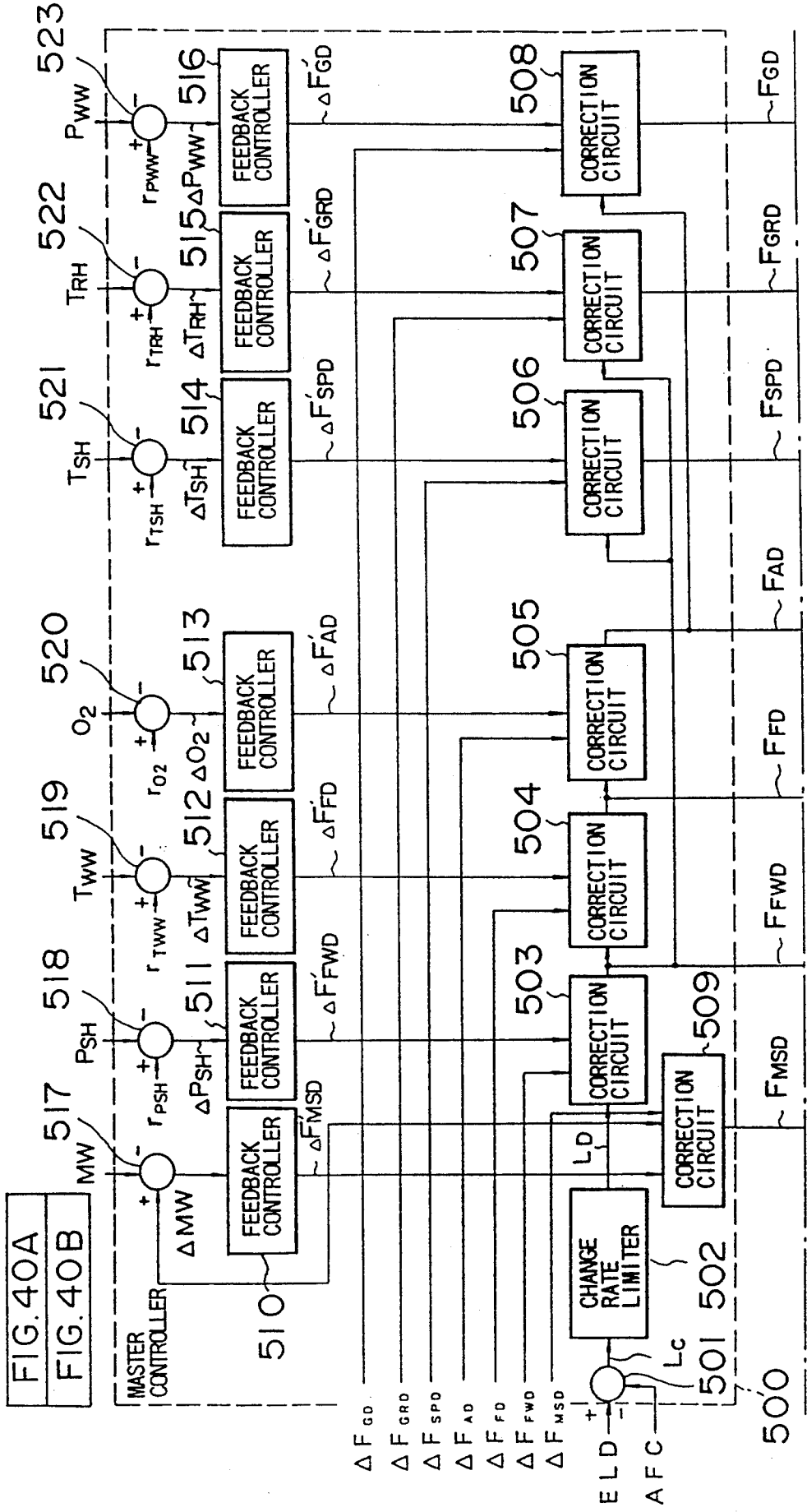
FIGS. 40a and 40b are block diagrams of the construction of the master controller, subloop controller and thermal power plant of FIG. 37 and a correlation thereamong.
Figure 40B:
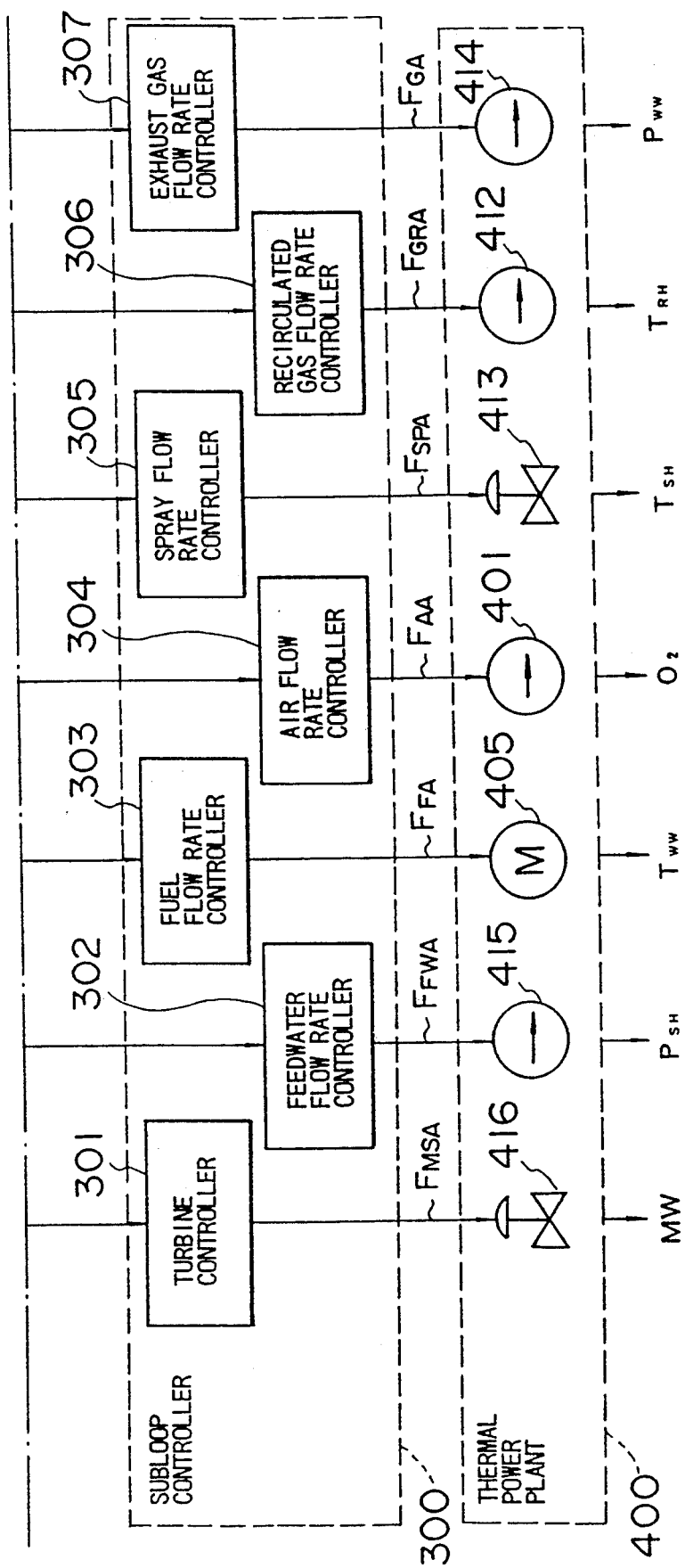

A still further embodiment of the present invention is depicted in FIG. 39, in which a system comprising a master controller 500, the subloop controller 300 and the thermal power plant 400 is the system 1 controlled by the prediction control system 22. Namely, the prediction control system 22 determines, as manipulated variables x, the turbine steam flow rate demand calibration $\Delta F_{MSD}$, feedwater flow rate demand calibration $\Delta F_{FWD}$, fuel flow rate demand calibration $\Delta F_{FD}$, air flow rate demand calibration $\Delta F_{AD}$, spray flow rate demand calibration $\Delta F_{SPD}$, recirculation gas flow rate demand calibration $\Delta F_{GRD}$ and exhaust gas flow rate demand calibration $\Delta F_{GD}$ in accordance with prediction control computation similar to equation (74). At the master controller 500, as illustrated in FIG. 40, a load command $L_C$ (=ELD+AFC) from the central load dispatching office is obtained via an adder 501, and a load demand $L_D$ is determined by processing the load command $L_C$ at a change rate limiter 502. Based on the load demand $L_D$ and the demand calibrations $\Delta F_{MSD}$, $\Delta F_{FWD}$, $\Delta F_{FD}$, $\Delta F_{AD}$, $\Delta F_{SPD}$, $\Delta F_{GRD}$, $\Delta F_{GD}$ from the prediction control system 22, and demand calibrations $\Delta F'_{MSD}$, $\Delta F'_{FWD}$, $\Delta F'_{FD}$, $\Delta F'_{AD}$, $\Delta F'_{SPD}$, $\Delta F'_{GRD}$, $\Delta F'_{GD}$ from feedback controllers 510–516 of controlled variables y, i.e., from the feedback controllers 510–516 for the generator output MW, main steam pressure $P_{SH}$, evaporator outlet steam temperature $T_{WW}$, exhaust gas $O_2$ content $O_2$, main steam temperature $T_{SH}$, regenerated steam temperature $T_{RH}$ and furnace draft $P_{WW}$, the turbine steam flow rate demand $F_{MSD}$, feedwater flow rate demand $F_{FWD}$, fuel flow rate demand $F_{FD}$, air flow rate demand $F_{AD}$, spray flow rate demand $F_{SPD}$, recirculation gas flow rate demand $F_{GRD}$ and exhaust gas flow rate demand $F_{GD}$ are determined by correction circuits 503–509, respectively. These relationships can be expressed by the following equation:

$$\left. \begin{array}{l} F_{MSD} = f(L_D) + \Delta F_{MSD} + \Delta F'_{MSD} \\ F_{FWD} = f(L_D) + \Delta F_{FWD} + \Delta F'_{FSD} \\ F_{FD} = f(L_{FWD}) + \Delta F_{FD} + \Delta F'_{FD} \\ F_{AD} = f(F_D) + \Delta F_{AD} + \Delta F'_{AD} \\ F_{SPD} = f(F_{FWD}) + \Delta F_{SPD} + \Delta F'_{SPD} \\ F_{GRD} = f(F_{FWD}) + \Delta F_{GRD} + \Delta F'_{GRD} \\ F_{GD} = f(F_{AD}) + \Delta F_{GD} + \Delta F'_{GD} \end{array} \right\} \quad (77)$$

where f( ): functions.

On the other hand, the subloop controller 300 manipulates, in accordance with these demands, the main steam governor 416, feedwater pump 415, coal feeder drive motor 405, forced draft fan 401 and induced draft fan 414 of the thermal power plant 400 via the turbine controller 301, the feedwater flow rate controller 302, the fuel flow rate controller 303, the air flow rate controller 304, the spray flow rate controller 305, the recirculation gas flow rate controller 306 and the exhaust gas flow rate controller 307. As a result, the controlled variables y of the thermal power plant 400, namely the generator output MW, main steam pressure $P_{SH}$, evaporator outlet steam temperature $T_{WW}$, exhaust gas $O_2$ content $O_2$, main steam temperature $T_{SH}$, regenerated steam temperature $T_{RH}$ and furnace draft $P_{WW}$ are controlled to give their corresponding desired values, respectively.

In the above embodiment, upon determination of the predicted value $\hat{y}(t+p|t)$ of the controlled quantity y at the future time of $p^{th}$ sampling, the predicted value was obtained by holding the demand $L_D$ of the generator output MW at the value $L_D(t)$ at the present time t. As an alternative, it is also possible to use the predicted values $\hat{L}_D(t+1|t)$, $\hat{L}_D(t+2|t)$, ... $\hat{L}_D(t+p|t)$ of the demand $L_D$ of the generator output MW.

As the predicted values $L_D(t+i|t)$ ($i=1, 2, ..., p$) of the demand $L_D$ of the generator output MW, values predicted at the central load dispatching office can also be used. As a further alternative, predicted values determined using a linear prediction equation or a non-linear prediction equation at the thermal power plant can also be used.

In the above embodiment, the controlled variable y was predicted using the identified non-linear regression model and the manipulated variable was determined based on the results of the prediction. It is however possible, as illustrated in FIG. 41 and FIG. 42, to prepare a linear model by using an identified non-linear regression model and then to determine a more suitable manipulated variable by applying a prediction control or linear optimal control theory to this linear model.

Figure 41:
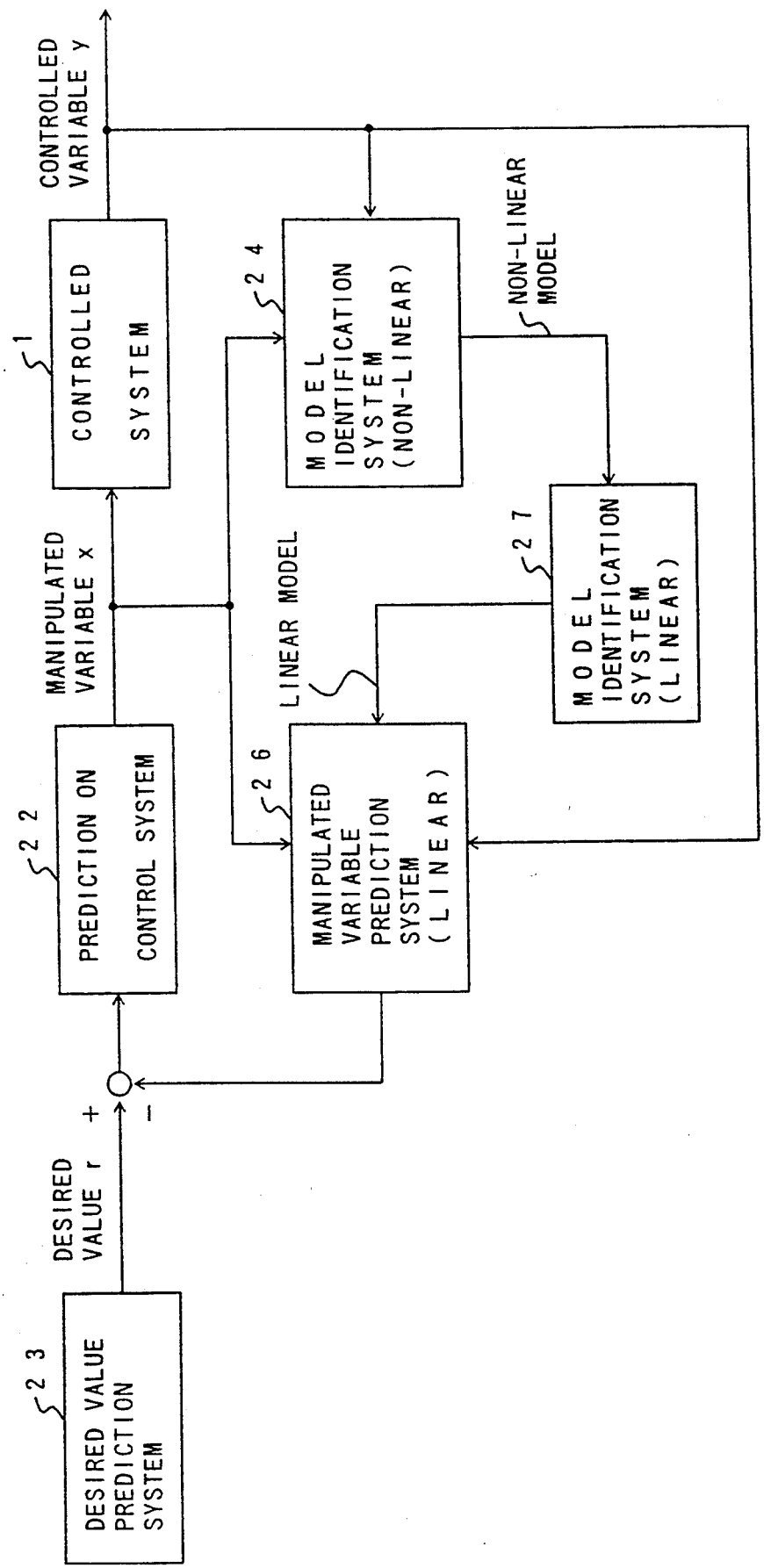
FIG. 41 to FIG. 45 are block diagrams illustrating various application examples of the prediction control system of FIG. 39.

In a still further embodiment of FIG. 41, a non-linear model for a controlled system is identified at the non-linear model identification system 24, a linear model is identified by the linear model identification system 27 on the basis of the non-linear model, and a controlled variable of the controlled system is then predicted by the controlled variable prediction system 26 on the basis of the linear model. Using the predicted controlled value, a manipulated variable is thereafter determined in a similar manner to the embodiment illustrated in FIG. 32.

Figure 42:
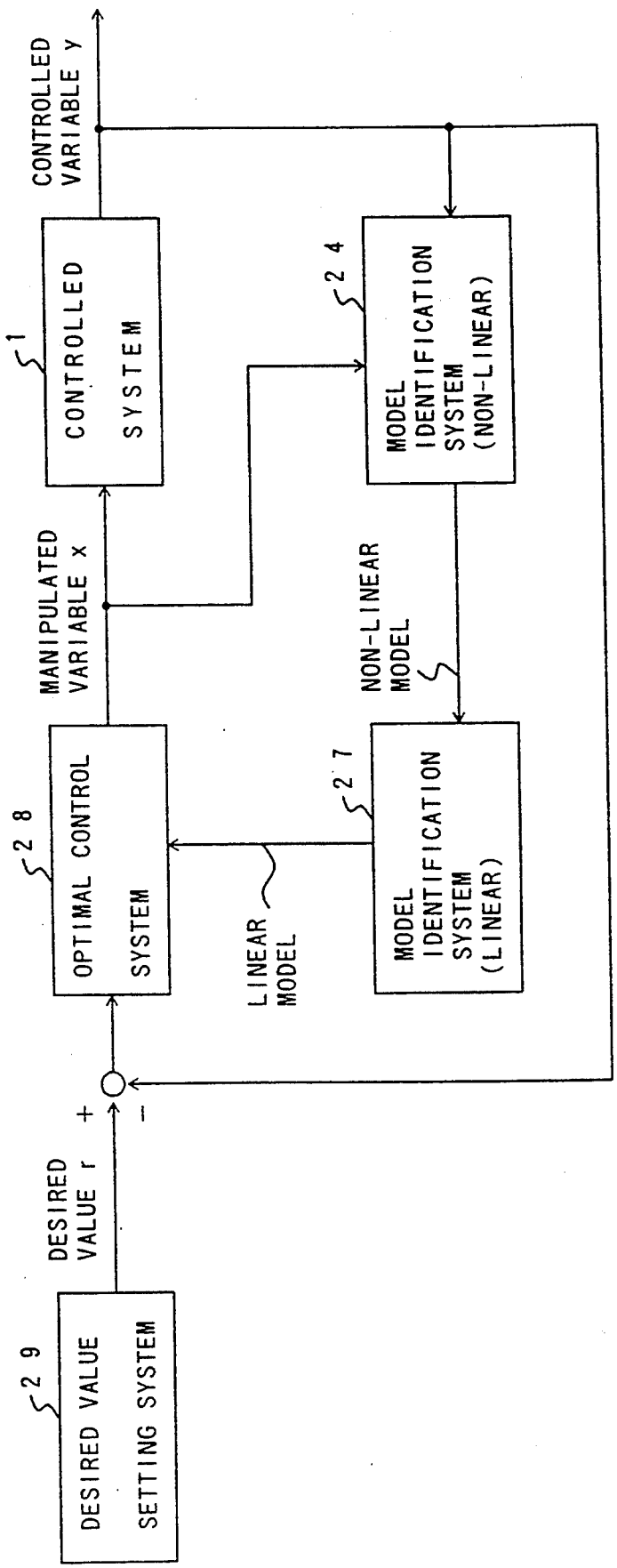

In a still further embodiment shown in FIG. 42, using a linear model identified by the non-linear model identification system 24 and linear model identification system 27, a manipulated variable x is determined by an optimal control system 28 from the difference between a desired value r and a corresponding controlled variable y.

Figure 43:
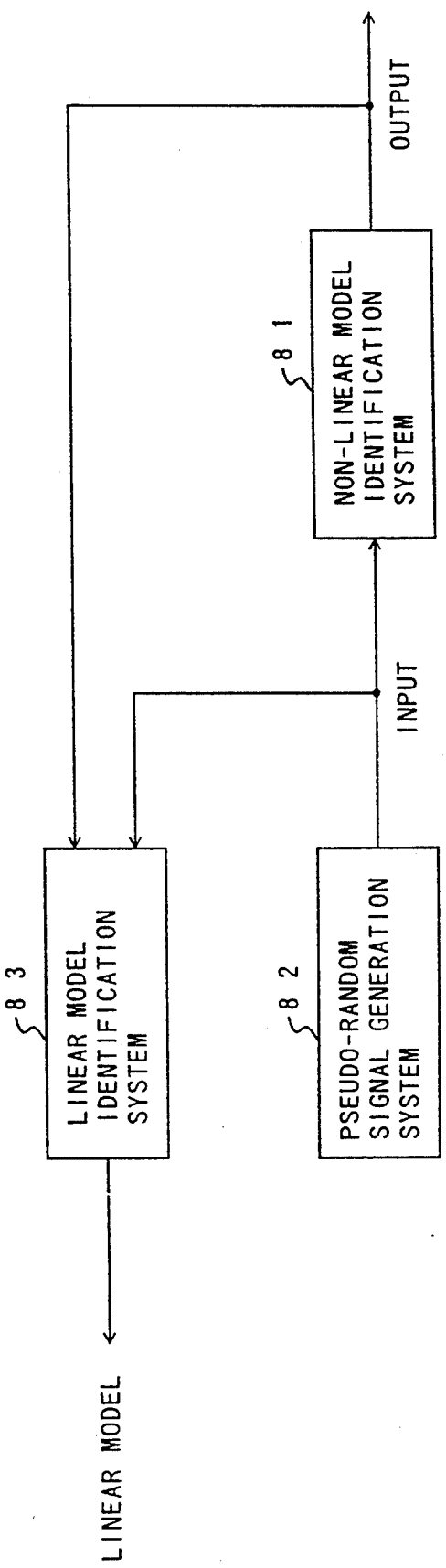

Incidentally, upon preparation of a linear model, a system such as that shown in FIG. 43 can be used. Namely, using a pseudo-random signal generation system 82, an input variable of a non-linear regression model of a non-linear model identification system 81 is caused to vary along the passage of time by simulation. At a linear model identification system 83, a linear model is identified, corresponding to a load level, from time-dependent variations of a corresponding output variable and the time-dependent variations of the input variable by an identification method such as least square or Kalman filter.

Figure 44:
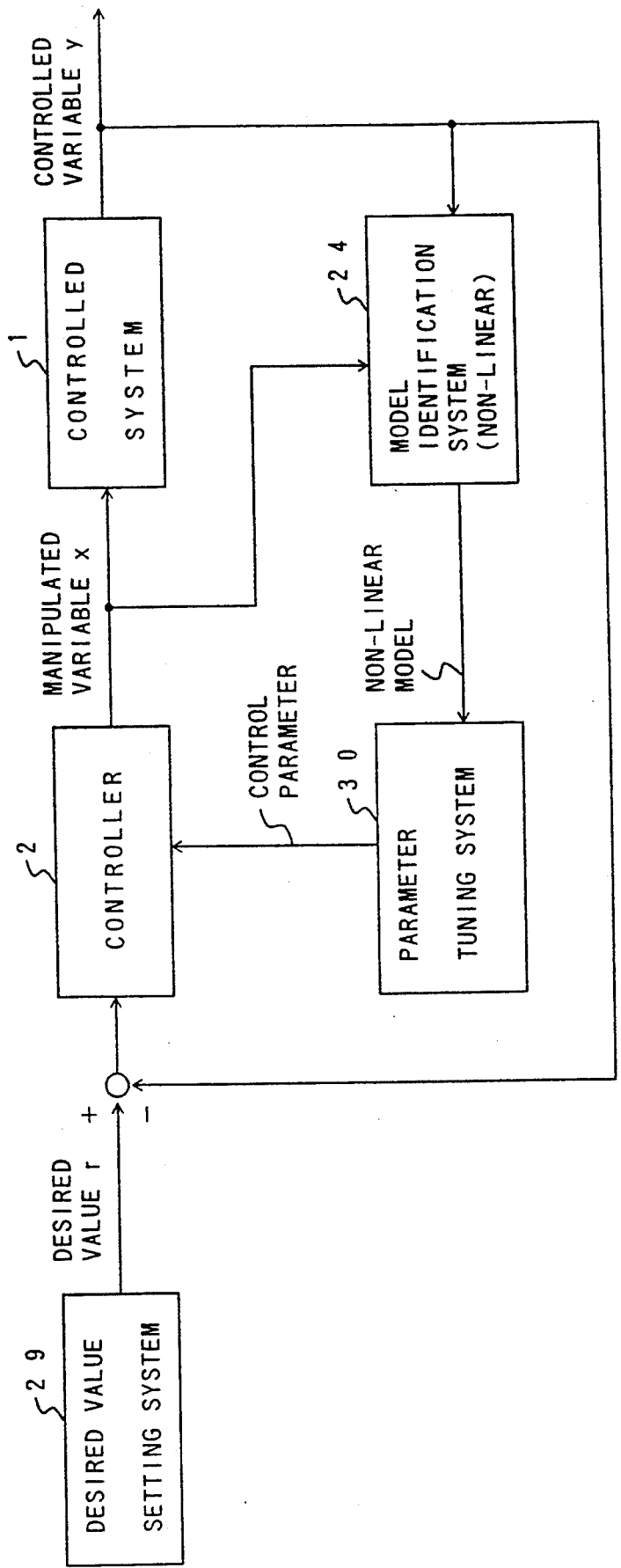

In the above embodiment, the controlled variable y was predicted using the identified non-linear regression model and the manipulated variable was determined based on the results of the prediction. As an alternative, as is illustrated in FIG. 44, a control parameter of the controller 2 can be tuned by a control parameter tuning system 30, using a non-linear regression model identified at the model identification system 24.

Figure 45:
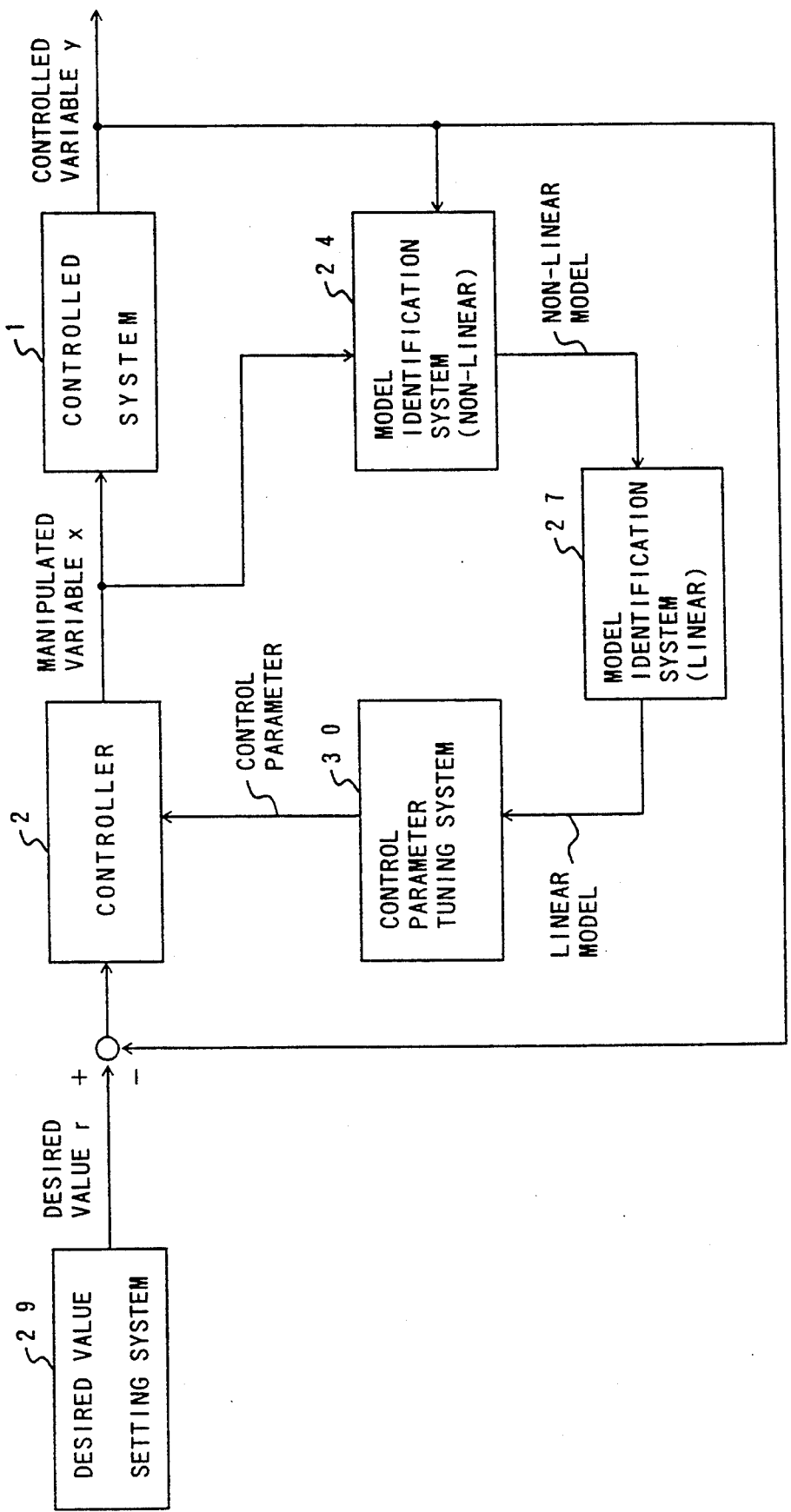

Further, as is illustrated in FIG. 45, it is also possible to prepare a linear model at a linear model identification system 27 from a non-linear regression model identified by the non-linear model identification system 24 and then to tune the control parameter of the controller 2 by the control parameter tuning system 30 while using the linear model.

Here, the control parameter tuning system 30 can be constructed, for example, such that it has the functions of both the tuning rule learning system 4 and the parameter turning system 3, both, described above with reference to FIG. 1. In this case, as the controlled system model of the simulator 41 in the tuning rule learning system 4 shown in FIG. 18, a linear model identified by the model identification system 27 can be used.

In the above embodiment, the operation data of the controlled system are stored in advance. Using the operation data as learning data, the neural network was caused to learn so as to identify a model. It is also possible to use operation data of a controlled system, said operation data varying every moment and, using the data, to cause an associated neural network to learn on-line and real time so as to identify a model.

According to the present invention, a non-linear regression model capable of outputting an estimated value of an output variable of a controlled system can be realized by a non-linear conversion function of a neural network, i.e., by inputting time-series signals of an input/output variable of the controlled system and then subjecting these signals to non-linear conversion. This invention has therefore brought about the advantage that characteristics of the controlled system, said characteristics varying depending on the output level, namely, non-linear characteristics can be simulated, an optimal manipulated variable can be determined responsive to each variation in the characteristics of the controlled system and the controllability of the system can hence be improved.

In addition, since the neural network is caused to learn using operation data of the controlled system as learning data, the present invention has also brought about the advantage that the non-linear regression model of the controlled system can be identified on-line, thereby making it possible to cope with characteristic variations of the controlled system which may occur along the passage of time or by disturbances or the like.

We claim:

1. A method for controlling a controlled system by a controller so as to bring a controlled variable into conformity with a desired value, said method comprising the steps of:

receiving information which contains characteristics of at least one of input/output variables for a combined controlling-controlled system, said combined controlling-controlled system comprising in combination a controller and a controlled system, and input/output variables for the controlled system;

inputting the information with the characteristics contained therein to a neural network for learning in advance a correlation between the information containing the characteristics and a control parameter and determining a control parameter for the controller;

tuning the control parameter based on said input/output variables for the controlled system; and outputting a tuned control parameter to the controller.

2. The control method of claim 1, wherein the information containing the characteristics of the input/output variable is obtained by the determination of a time response on at least one characteristic of each of models of the controller and controlled system through simulation making use of the models; and the neural network is caused to learn by obtaining a control parameter capable of providing optimal control results conforming with the characteristic of each of the models and then using the information, which contains the characteristics of the input/output variable, as learning input data and the control parameter as learning teacher data.

3. The control method of claim 1, wherein the information containing the characteristics of the input/output variable is obtained from time responses of good characteristics out of time responses from the controlled system and is then stored; and the neural network is caused to learn by storing control parameters for the controller, said control parameters corresponding to the time responses of the good characteristics, and using the information as learning input data and the parameters as learning teacher data.

4. A control system having a controller for controlling a controlled system such that a controlled variable is brought into conformity with a desired value, comprising:

a tuning system for the controller, wherein said tuning system comprises:

a neural network having a plurality of mutually-connectable units and capable of obtaining an output signal corresponding to an input signal in accordance with the state of connection among the units, a means for receiving information which contains characteristics of at least one of input/output variables for a combined controlling-controlled system, comprising in combination the controller and the controlled system, and input/output variables for the controlled system, and a means for inputting the information with the characteristics contained therein to the neural network to output a control parameter for the controller; and a parameter tuning system for tuning the control parameter based on said input/output variables and outputting a tuned control parameter to the controller.

5. The control system of claim 4, wherein the neural network has beforehand stored the state of connection among the units so that the control parameter can be obtained as an output signal upon when the information with the characteristics contained therein is inputted.

6. The control system of claim 4, further comprising:
a tuning rule learning system for causing the neural network, which is adapted to tune the control parameter of the controller, to learn a tuning rule, wherein said tuning rule learning system comprises:

a means for obtaining the information, which contains the characteristics of the input/output variable, by developing models of the controller and controlled system and then determining a time response on at least one characteristic of each of the models;

a means for determining a control parameter capable of providing optimal control results conforming with the characteristic of each of the models; and a means for causing the neural network to learn by using the information with the characteristics of the input/output variable and the control parameter as learning input data and learning teacher data, respectively.

7. The control system of claim 6, wherein the parameter tuning system performs on-line tuning for the controller and the tuning rule learning system performs on-line setting of the tuning rule for the parameter tuning system.

8. The control system of claim 4, wherein the information-receiving means has a function such that the information-receiving means can receive and store information which contains characteristics on an actual input/output variable of at least one of the combined controlling-controlled system and the controlled system.

9. The control system of claim 8, further comprising:
a means for storing, as learning teacher data, control parameters corresponding to time responses of good characteristics received upon tuning of the controller; and a means for causing the neural network to learn by using the learning teacher data and data out of the information with the characteristics on the actual input/output variable, the latter data corresponding to the learning teacher data.

10. The control system of claim 4, wherein the controlled system is a plant having a boiler for burning fuel to generate steam; the controller controls the feed amount of the fuel to the boiler to generate steam of a desired temperature, and the controller performs control computation in accordance with a preset control parameter with respect to the difference between the desired temperature of the steam and an actual steam temperature (controlled variable), thereby outputting a fuel feed quantity demand (manipulated variable); the control parameter tuning system estimates the control parameter by using information, which contains characteristics of the steam temperature and fuel feed quantity demand, and sets the thus-estimated control parameter in the controller; and the boiler has a means for controlling the feed quantity of the fuel on the basis of the fuel feed quantity demand.

11. The control system of claim 10, further comprising a tuning rule learning system for determining a turning rule for the control parameter tuning system, said learning system having a neural network.

12. The control system having a controller for controlling a controlled system such that a controlled variable is brought into conformity with a desired value, comprising:

a tuning system for the controller, wherein said tuning system comprises:

a neural network having a plurality of mutually-connectable units and capable of obtaining an output signal corresponding to an input signal in accordance with the state of connection among the units, means for receiving information which contains characteristics of at least one of input/output variables for a combined controlling-controlled system, said combined controlling-controlled system comprising in combination a controller and a controlled system, and input/output variables for the controlled system, and means for inputting the information with the characteristics contained therein to the neural network to output a control parameter for the controller;

a tuning rule learning system for causing the neural network, which is adapted to tune the control parameter of the controller, to learn a tuning rule, wherein said tuning rule learning system comprises:

a second neural network different form the first-mentioned neural network, means for developing models of the controller and controlled system, means for determining a time response on at least one characteristic of each of the models to obtain the information with the characteristics of the input/output variable contained therein, means for determining a control parameter capable of providing optimal control results conforming with the characteristics of each of the models, and means for causing the second neural network to learn by using the information with the characteristics of the input/output variable and the control parameter as learning input data and learning teacher data, respectively; and wherein the results of the learning by the second neural network are transferred to the first neural network and are used therein.

13. A method for controlling a controlled system by a controller so as to bring a controlled variable into conformity with a desired value, comprising the steps of:

receiving information which contains characteristics of at least one of input/output variables for the controlled system;

inputting the information to a neural network;

identifying a model of the controlled system by using a learning function of the neural network; and determining a manipulated variable by using the model, whereby the controlled system is controlled;

wherein the neural network is caused to learn by using time-series signals of an output variable and time-series signals of an input variable as the information with the characteristics of the input/output variable of the controlled system, the time-series signals of the output variable as learning input data and the time-series signals of the input variable as learning teacher data, whereby a reverse system model of the controlled system is identified;

wherein an output variable of a reference model of a control system, which comprises in combination the controlled system and a controller for controlling the controlled system is inputted to the neural network with the reverse system model identified therein and the controller is tuned to bring time-series signals of an output variable of the controller into conformity with the time-series signals of the input variable of the controlled system;

wherein an additional neural network different from the neural network with the reverse system model identified therein is used as the controller.

14. A method for predictively controlling a controlled system to bring a controlled variable into conformity with a desired value, said method comprising the steps of:

receiving input/output variables of said controlled system as input signals for a neural network, to make the neural network learn the output variable of the controlled system as teacher data, so that a model is identified which is to output an estimated value of the output variable of the controlled system in the near future when the signals of the input/output variables of the controlled system are inputted;

inputting the input/output variables of the controlled system at the present time into said model, to make said model predict and output the estimated value of the output variable of the controlled system in the near future;

determining one or more manipulated variables by tuning said estimated value based on the input/output variables of the controlled system and said desired value; and outputting said one or more manipulated variables to the controlled system.

15. A method according to claim 14, wherein the input/output variables of the controlled system include the manipulated variables and the controlled variable.

16. A method according to claim 14, wherein operation data of the controlled system is stored and the manipulated variables and the controlled variable contained in said operation data stored in the past are inputted into the neural network for learning as the input/output variables and the output variable, thereby identifying said model.

17. A method according to claim 14, wherein operation data of the controlled system at present time is received and the manipulated variables and the controlled variable contained in said operation data are inputted to the neural network model for learning as the input/output variables and the output variable, thereby identifying said model.

18. A method according to claim 14, wherein a signal indicating a load level of the controlled system is used as the input/output variable of the controlled system.

19. A method according to claim 14, wherein time-series signals are used as the input/output variables of the controlled system.

20. A method for predictively controlling a controlled system having nonlinear characteristics, to bring a controlled variable into conformity with a desired value, said method comprising the steps of:

receiving input/output variables of the controlled system as input signals for a neural network, to make the neural network learn the output variable of the controlled system as teacher data, so that a nonlinear model is identified which is to output the output variable of the controlled system in the near future wherein signals of the input/output variables of the controlled system are inputted;

developing a linear model using said nonlinear model; and inputting the input/output variables of the controlled system at the present time into said linear model, to make said model predict and output an estimated value of the output variable of the controlled system in the near future, and determining one or more manipulated variables based upon said estimated value and said desired value thereby controlling the controller system.

21. A method according to claim 20, wherein said linear model is developed such that the input variable to the nonlinear model is time-changed by signals corresponding to a disturbance with respect to the controlled system, so that said linear model is identified at a load level based on the time change of the output variable and the time change of the input variable at that time.

22. A control system having a predictive control system for predictively controlling a controlled system by determining one or more manipulated variables based on a deviation between a controlled variable and a desired variable, said control system comprising:

a model identification system having a neural network, which receives the manipulated variables and the controlled variable of the controlled system as input signals for a neural network, to make the neural network learn the controlled variable of the controlled system as teacher data, so that a model is identified which is to output an estimated value of the controlled variable of the controlled system in the near future, when signals of the input/output variable of the controlled system are inputted; and a controlled variable predictive system which inputs the manipulated variables and the controlled variable of the controlled system at the present time, into the neural network which identifies the model, to predict the controlled variable of the controlled system in the near future to output the estimated value of the controlled variable.

23. A control system having a predictive control system for predictively controlling a controlled system having nonlinear characteristics, by determining one or more manipulated variables based on a deviation between a controlled variable and desired variable, said control system comprising:

a nonlinear model identification system having a neural network, which receives the input/output variable of the controlled system as input signal for a neural network, to make the neural network learn the output variable of the controlled system as teacher data, so that a nonlinear model is identified which is to output the output variable of the controlled system when signals of the input/output variables of the controlled system are inputted;

a linear model identification system for developing a linear model using said nonlinear model; and a controlled variable predictive system which receives the manipulated variables and the controlled variable of the controlled system at the present time using the neural network which identifies the model, to predict the controlled variable of the controlled system in the near future to output an estimated value of the controlled variable.

* * * * *